US012504711B2

(12) United States Patent
Yabuki et al.

(10) Patent No.: US 12,504,711 B2
(45) **Date of Patent: *Dec. 23, 2025**

(54) DRUM CARTRIDGE AND IMAGE FORMING APPARATUS

(71) Applicant: BROTHER KOGYO KABUSHIKI KAISHA, Nagoya (JP)

(72) Inventors: Tomoyasu Yabuki, Nagoya (JP); Takashi Suzuki, Nagoya (JP); Tadao Kyotani, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,163

(22) Filed: Oct. 17, 2023

(65) Prior Publication Data

US 2024/0118656 A1 Apr. 11, 2024

Related U.S. Application Data

(63) Continuation of application No. 17/099,999, filed on Nov. 17, 2020, now Pat. No. 11,829,099, which is a (Continued)

(30) Foreign Application Priority Data

Dec. 27, 2017 (JP) ................................ 2017-252305

(51) Int. Cl.

| | |
|---|---|
| ***G03G 21/18*** | (2006.01) |
| ***G03G 15/20*** | (2006.01) |
| ***G03G 21/16*** | (2006.01) |

(52) U.S. Cl.

CPC ..... *G03G 21/1814* (2013.01); *G03G 15/2032* (2013.01); *G03G 15/2042* (2013.01); (Continued)

(58) Field of Classification Search

CPC ........... G03G 21/1814; G03G 21/1652; G03G 21/1878; G03G 15/2032; G03G 15/2042; G03G 15/2053

See application file for complete search history.

(56) References Cited

U.S. PATENT DOCUMENTS

2002/0015597 A1 2/2002 Okada et al.
2002/0021906 A1 2/2002 Yoshizaki et al.
(Continued)

FOREIGN PATENT DOCUMENTS

CN 1335542 A 2/2002
CN 107065486 A 8/2017
(Continued)

OTHER PUBLICATIONS

International Preliminary Report on Patentability issued in corresponding International Patent Application No. PCT/JP2018/039518, Jun. 30, 2020.

(Continued)

*Primary Examiner* — Stephanie E Bloss
*Assistant Examiner* — Michael A Harrison
(74) *Attorney, Agent, or Firm* — Merchant & Gould P.C.

(57) ABSTRACT

A drum cartridge includes a frame on which a toner cartridge is attachable, a photosensitive drum, and a drum memory. The drum cartridge relays information stored in the toner memory to the image forming apparatus when the toner cartridge is attached to the frame.

10 Claims, 22 Drawing Sheets

Related U.S. Application Data continuation of application No. 16/165,572, filed on Oct. 19, 2018, now Pat. No. 10,845,754.

(52) U.S. Cl.
CPC ..... *G03G 15/2053* (2013.01); *G03G 21/1652* (2013.01); *G03G 21/1878* (2013.01)

(56) References Cited

U.S. PATENT DOCUMENTS

| | | | | |
|---|---|---|---|---|
| 2002/0027676 | A1* | 3/2002 | Okunishi | G03G 21/1889 358/1.16 |
| 2004/0022556 | A1 | 2/2004 | Nomura | |
| 2007/0230999 | A1 | 10/2007 | Shimomura | |
| 2008/0159772 | A1 | 7/2008 | Koishi et al. | |
| 2008/0199204 | A1 | 8/2008 | Ishii et al. | |
| 2008/0240774 | A1 | 10/2008 | Fukamachi et al. | |
| 2009/0297170 | A1 | 12/2009 | Yokochi | |
| 2010/0135693 | A1 | 6/2010 | Okabe et al. | |
| 2011/0129252 | A1 | 6/2011 | Oda et al. | |
| 2013/0108282 | A1 | 5/2013 | Sonoda et al. | |
| 2013/0223869 | A1 | 8/2013 | Oda | |
| 2015/0015907 | A1 | 1/2015 | Karino et al. | |
| 2016/0349699 | A1 | 12/2016 | Miyamoto et al. | |
| 2017/0230540 | A1 | 8/2017 | Sasaki | |
| 2019/0079425 | A1 | 3/2019 | Lin | |
| 2019/0196394 | A1 | 6/2019 | Yabuki et al. | |

FOREIGN PATENT DOCUMENTS

| | | | |
|---|---|---|---|
| CN | 111527454 | A | 8/2020 |
| EP | 3 663 862 | A1 | 10/2020 |
| JP | 4-138765 | A | 5/1992 |
| JP | 11-194682 | A | 7/1999 |
| JP | 2001-109337 | A | 4/2001 |
| JP | 2001-249589 | A | 9/2001 |
| JP | 2003-280313 | A | 10/2003 |
| JP | 2003-280321 | A | 10/2003 |
| JP | 2003-280491 | A | 10/2003 |
| JP | 2004-147088 | A | 5/2004 |
| JP | 2006-11134 | A | 1/2006 |
| JP | 2006-119553 | A | 5/2006 |
| JP | 2007-271895 | A | 10/2007 |
| JP | 2008-165023 | A | 7/2008 |
| JP | 2008-203566 | A | 9/2008 |
| JP | 2008-249801 | A | 10/2008 |
| JP | 2008-249802 | A | 10/2008 |
| JP | 2008-281802 | A | 11/2008 |
| JP | 2010-085797 | A | 4/2010 |
| JP | 2010-128336 | A | 6/2010 |
| JP | 2010-175619 | A | 8/2010 |
| JP | 2010-217261 | A | 9/2010 |
| JP | 2011-118119 | A | 6/2011 |
| JP | 2012-063573 | A | 3/2012 |
| JP | 2013-73191 | A | 4/2013 |
| JP | 2013-174723 | A | 9/2013 |
| JP | 2016-224221 | A | 12/2016 |
| JP | 2017-196842 | A | 11/2017 |
| WO | 2012/149873 | A1 | 11/2012 |

OTHER PUBLICATIONS

Extended European Search Report issued in corresponding European Patent Application No. 18896895.2, Jul. 5, 2021.
Office Action issued in corresponding Japanese Patent Application No. 2017-252305, mailed Oct. 19, 2021.
Office Action issued in corresponding Japanese Patent Application No. 2017-252305, mailed Feb. 15, 2022.
Office Action issued in corresponding Chinese Patent Application No. 201880083889.0, mailed Apr. 15, 2022.
Decision of Refusal issued in corresponding Japanese Patent Application No. 2017-252305, mailed Jul. 5, 2022.
Office Action issued in related Chinese application 201880083889.0, Nov. 2, 2022.
Office Action issued in corresponding European Patent Application No. 18896895.2, Mar. 29, 2023.
Office Action issued in corresponding Chinese Patent Application No. 201880083889.0, Mar. 28, 2023.
Office Action (Decision of Refusal) issued in corresponding Chinese Patent Application No. 201880083889.0, Jun. 27, 2023.

* cited by examiner

DRUM CARTRIDGE AND IMAGE FORMING APPARATUS

CROSS-REFERENCE TO RELATED APPLICATION

This application is a continuation of U.S. patent application Ser. No. 17/099,999, filed Nov. 17, 2020, which is a continuation of U.S. patent application Ser. No. 16/165,572, filed Oct. 19, 2018, now U.S. Pat. No. 10,845,754, which claims priority from Japanese Patent Application No. 2017-252305, filed on Dec. 27, 2017. The content of the aforementioned applications is incorporated herein by reference in their entirety.

TECHNICAL FIELD

Aspects of the present disclosure relate to a drum cartridge and an image forming apparatus.

BACKGROUND

Electrophotographic image forming apparatuses known in the art include laser printers and light-emitting diode (LED) printers. An image forming apparatus includes a drum cartridge. The drum cartridge includes a plurality of photosensitive drums. The drum cartridge is configured to hold a plurality of toner cartridges in a removable manner. When a toner cartridge is attached to the drum cartridge, a developing roller of the toner cartridge contacts the corresponding photosensitive drum of the drum cartridge.

SUMMARY

A known toner cartridge includes a toner memory, which stores various sets of information about the toner cartridge. A recent image forming apparatus handles much information about a drum cartridge in addition to the toner cartridges. The drum cartridge may thus include a drum memory.

However, an image forming apparatus including a toner cartridge with a toner memory and a drum cartridge with a drum memory will have terminals for electrically connecting to the toner memory and terminals for electrically connecting to the drum memory, thus increasing the number of terminals of the image forming apparatus.

One or more aspects of the present disclosure are directed to a structure including fewer terminals and a drum cartridge with a drum memory.

First aspect of the present disclosure provides a drum cartridge attachable to an image forming apparatus. The drum cartridge includes a frame to which a toner cartridge including a toner memory is attachable, a photosensitive drum, a drum memory storing information regarding the drum cartridge. The drum cartridge relays information stored in the toner memory to the image forming apparatus when the toner cartridge is attached to the frame.

Second aspect of the present disclosure provides a drum cartridge includes a frame having a toner cartridge holder, a photosensitive drum held by the frame, a drum memory storing information regarding the drum cartridge and a toner terminal. The toner terminal exchanges information with a toner cartridge attached to the frame.

Third aspect of the present disclosure provides a drum cartridge includes a frame having a toner cartridge holder, a photosensitive drum held by the frame, a drum memory storing information regarding the drum cartridge, a toner voltage terminal, a toner signal terminal, a body voltage terminal, a first body signal terminal connected to the drum memory and a second body signal terminal connected to the toner data terminal.

DETAILED DESCRIPTION

Embodiments of the present disclosure will now be described with reference to the drawings.

A first direction herein refers to the direction along the axis of rotation of a photosensitive drum. A second direction herein refers to the direction in which a plurality of photosensitive drums are arranged. The first direction and the second direction intersect with each other (at right angles in some embodiments).

1. First Embodiment

1-1. Structure of Image Forming Apparatus

Figure 1:
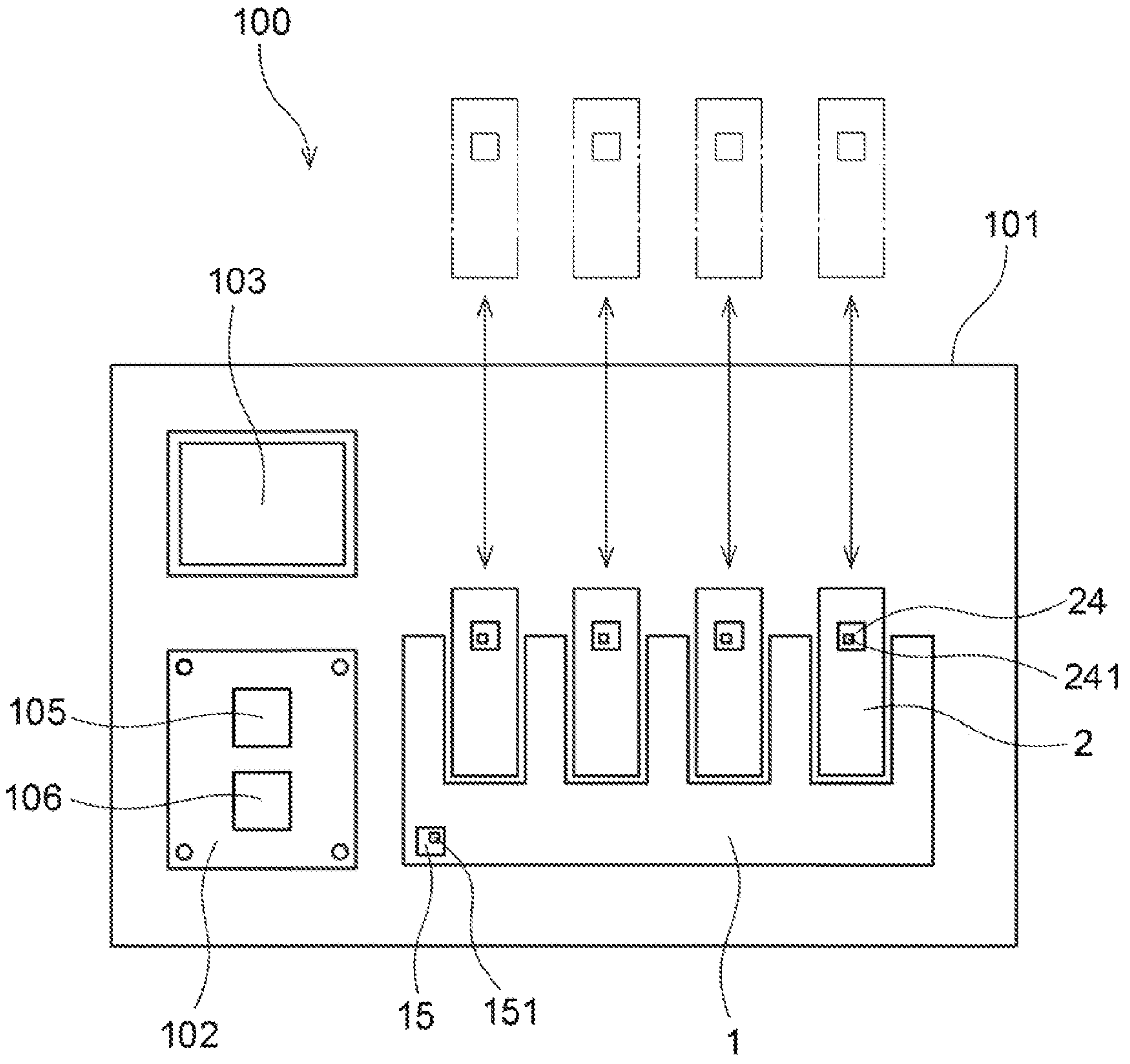
FIG. 1 is a conceptual diagram of an image forming apparatus.

FIG. 1 is a conceptual diagram of an image forming apparatus 100. The image forming apparatus 100 is an electrophotographic printer. The image forming apparatus 100 may be a laser printer or a light-emitting diode (LED) printer. As shown in FIG. 1, the image forming apparatus 100 includes a body casing 101, a controller 102, a display 103, a drum cartridge 1, and a plurality of toner cartridges 2.

The toner cartridges 2 are individually attachable to the drum cartridge 1. The drum cartridge 1 attaching the toner cartridges 2 is attachable to the body casing 101. The toner cartridges 2 each contain toner (developer) of a different color (e.g., cyan, magenta, yellow, or black). The image forming apparatus 100 forms an image on the recording surface of a print sheet with toner fed from the toner cartridges 2. The drum cartridge 1 in the present embodiment holds four toner cartridges 2. In some embodiments, the drum cartridge 1 may hold one to three, or five or more toner cartridges 2.

The drum cartridge 1 includes a drum circuit board 15 and a drum memory 151. The drum memory 151 is a readable and writable storage medium. Each toner cartridge 2 includes a toner circuit board 24 and a toner memory 241. The toner memory 241 is a readable and writable storage medium.

The controller 102 is contained in the body casing 101 of the image forming apparatus 100. The controller 102 includes, for example, a circuit board, a processor 105, such as a central processing unit (CPU), and a body memory 106, which is a storage medium. The controller 102 uses the processor 105 operating in accordance with programs to implement various processes in the image forming apparatus 100. More specifically, the controller 102 performs a first reading process for reading information from the body memory 106 and an operation process for operating the image forming apparatus 100 based on the information read in the first reading process.

When the toner cartridges 2 are attached to the drum cartridge 1, the toner circuit board 24 in each toner cartridge 2 is electrically connected to the drum circuit board 15. When the drum cartridge 1 attaching the toner cartridges 2 is attached to the body casing 101 of the image forming apparatus 100, the controller 102 contained in the body casing 101 is electrically connected to the drum circuit board 15. In other words, the toner circuit board 24 in each toner cartridge 2 is electrically connected to the controller 102 through the drum circuit board 15.

The display 103 is a liquid crystal display or an organic electroluminescent display. In response to an instruction from the controller 102, the display 103 displays various sets of information about the operation of the image forming apparatus 100.

1-2. Structure of Drum Cartridge

Figure 2:
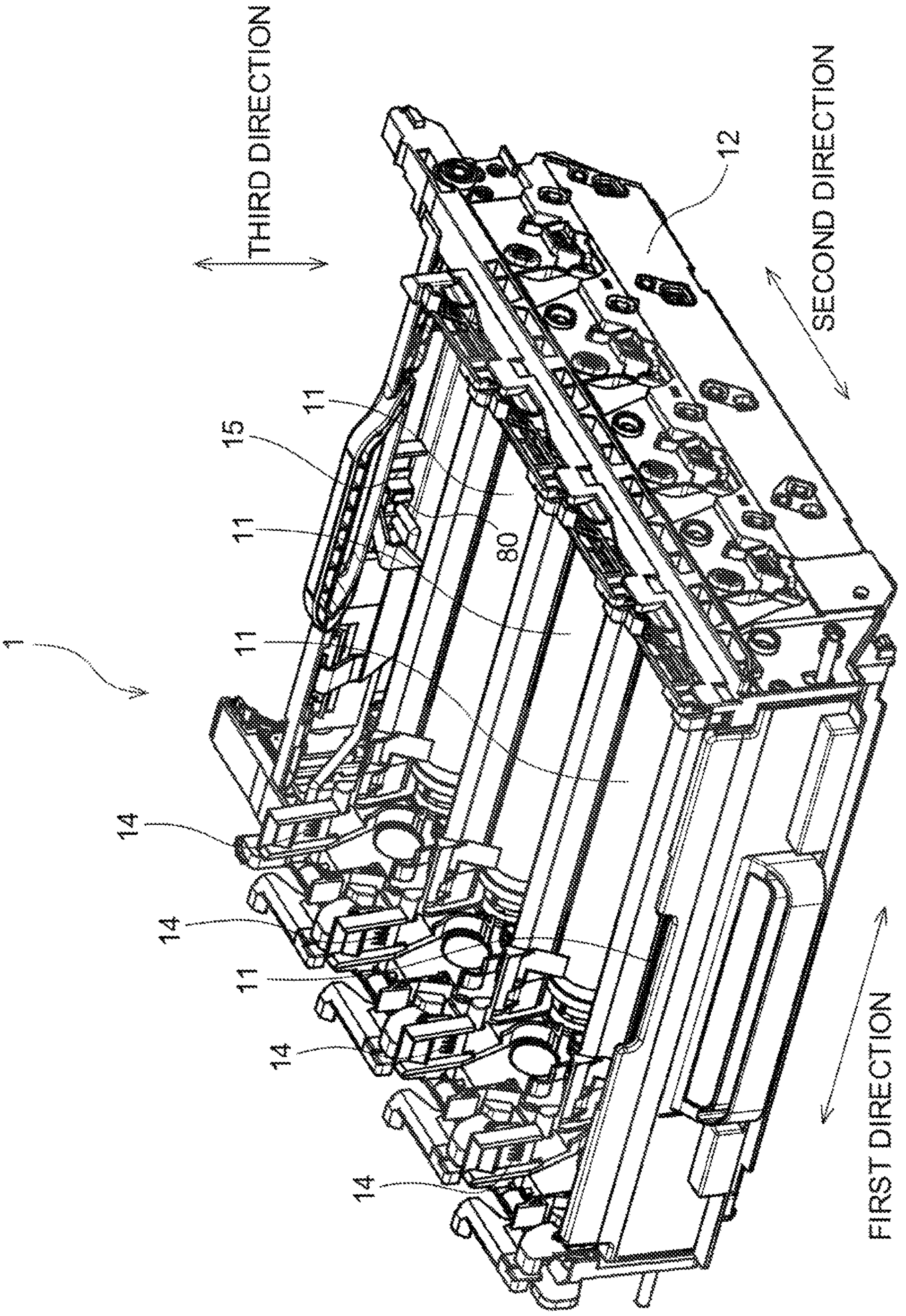
FIG. 2 is a perspective view of a drum cartridge.
Figure 3:
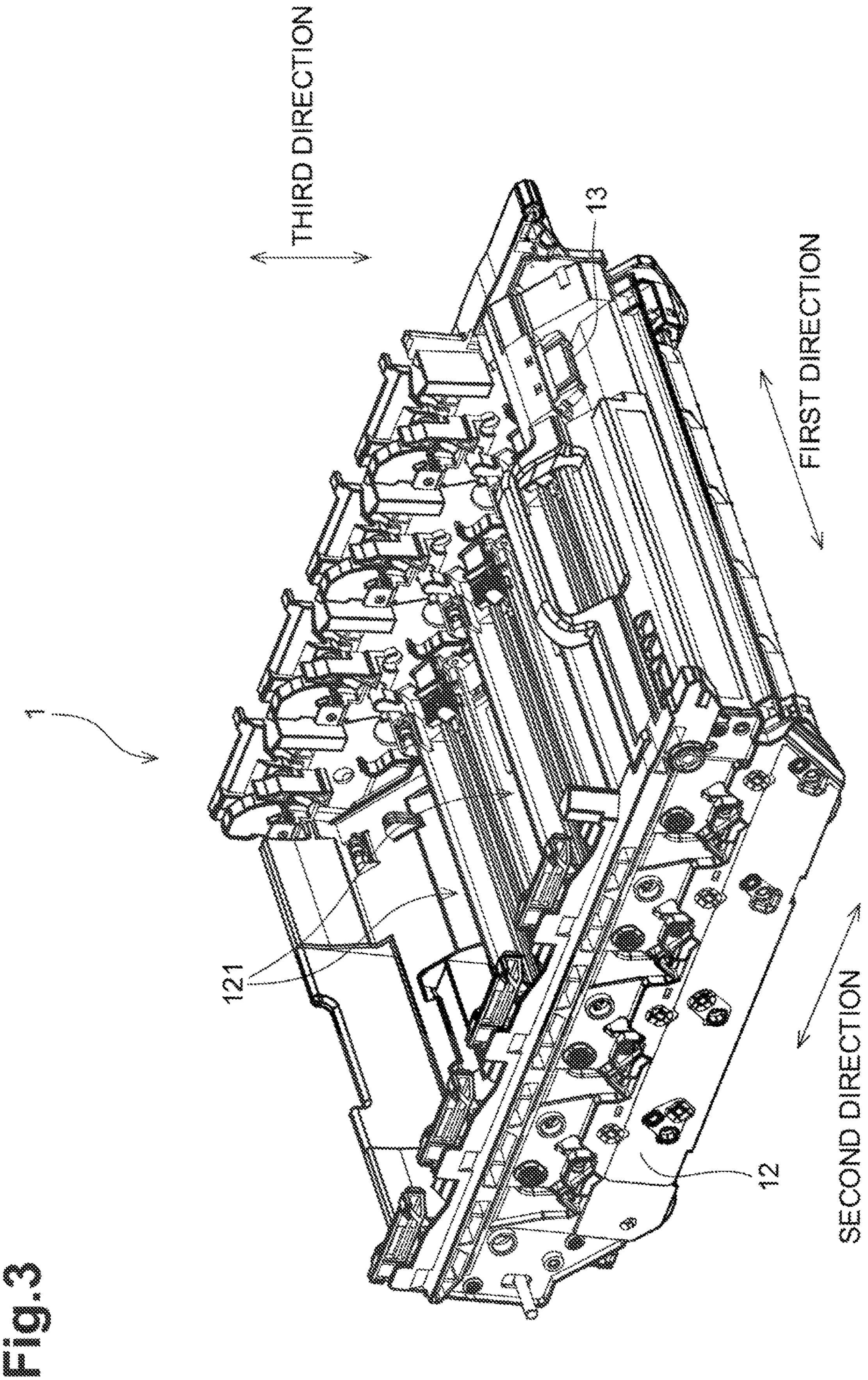
FIG. 3 is a perspective view of the drum cartridge.

The structure of the drum cartridge 1 will now be described. FIGS. 2 and 3 are perspective views of the drum cartridge 1.

As shown in FIGS. 2 and 3, the drum cartridge 1 includes a plurality of photosensitive drums 11, a frame 12, a first electric terminal unit 13, a plurality of second electric terminal units 14, and the drum circuit board 15. The drum cartridge 1 in the present embodiment includes four photosensitive drums 11 and four second electric terminal units 14.

The photosensitive drums 11 transfers toner fed from the toner cartridges 2 to a print sheet. The photosensitive drums 11 are arranged at intervals in the second direction. Each photosensitive drum 11 is cylindrical and extends in the first direction. Each photosensitive drum has a peripheral surface. The peripheral surface of the photosensitive drum 11 is coated with a photosensitive material. Each photosensitive drum 11 is rotatable about an axis of rotation extending in the first direction.

The frame 12 holds the plurality of photosensitive drums 11. The frame 12 includes a plurality of toner cartridge holders 121, which are arranged at intervals in the second direction. The toner cartridges 2 are attached to the toner cartridge holders 121. The frame 12 can thus hold the plurality of toner cartridges 2. When a toner cartridge 2 is attached to a toner cartridge holder 121, the peripheral surface of the corresponding photosensitive drum 11 contacts the peripheral surface of a developing roller 22 of the toner cartridge 2 (described later).

Figure 4:
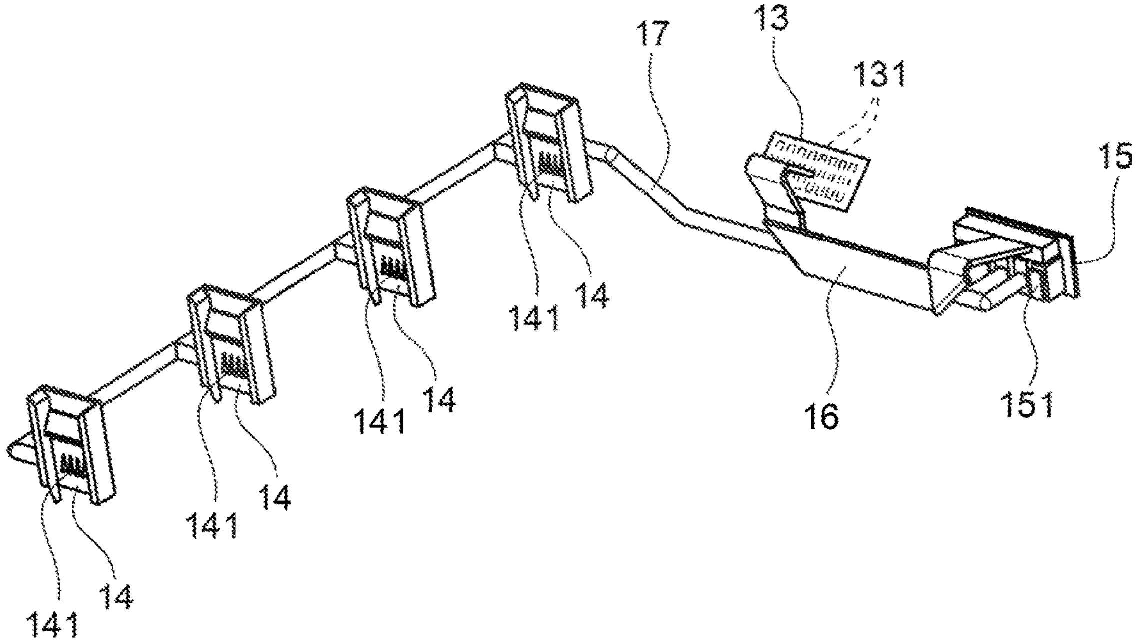
FIG. 4 is a perspective view of a first electric terminal unit, second electric terminal units, and harnesses connecting such electric terminals.

FIG. 4 is a perspective view of the first electric terminal unit 13, the second electric terminal units 14, the drum circuit board 15, and harnesses 16 and 17 connecting these components.

The first electric terminal unit 13 is electrically connected to a terminal in the body casing 101 when the drum cartridge 1 is attached to the body casing 101 of the image forming apparatus 100. The first electric terminal unit 13 is fixed to, for example, the surface of the frame 12. The first electric terminal unit 13 may be either immovable or slightly movable relative to the frame 12. The first electric terminal unit 13 includes a plurality of first terminals 131. Each first terminal 131 is an uncovered conductor. The first terminals 131 are electrically connected to a plurality of body terminals 31 (described later) on the drum circuit board 15.

When a toner cartridge 2 is attached to a toner cartridge holder 121, the second electric terminal units 14 are electrically connected to terminals 242 on the toner circuit board 24 (described later). Each toner cartridge holder 121 has a second electric terminal unit 14 at an end of the toner cartridge holder 121 in the first direction. Each second electric terminal unit 14 is fixed to, for example, the surface of the frame 12. The second electric terminal unit 14 may be either immovable or slightly movable relative to the frame 12. Each second electric terminal unit 14 includes a plurality of second terminals 141. Each second terminal 141 is an uncovered conductor. The second terminals 141 are electrically connected to a plurality of toner terminals 32 (described later) on the drum circuit board 15.

The drum circuit board 15 is electrically connected to the first electric terminal unit 13 and the second electric terminal units 14. The drum circuit board 15 is fixed to, for example, the surface of the frame 12. As shown in FIG. 4, the drum circuit board 15 and the first electric terminal unit 13 are electrically connected to each other with the first harness 16. The drum circuit board 15 and the second electric terminal units 14 are also electrically connected to each other with the second harness 17. The first harness 16 and the second harness 17 are, for example, wire harnesses including a plurality of conducting wires.

As shown in FIG. 4, the drum cartridge 1 includes the drum memory 151 as a storage medium. The drum memory 151 is located at the drum circuit board 15. The drum memory 151 stores various sets of information about the drum cartridge 1. For example, the drum memory 151 stores at least one of information for identifying the drum cartridge 1 and information indicating the characteristics of the drum cartridge 1. The information for identifying the drum cartridge 1 includes, for example, at least one of the manufacturing serial number of the drum cartridge 1 and the identification code indicating that the drum cartridge 1 is a genuine product. The information indicating the characteristics of the drum cartridge 1 includes, for example, at least one of models compatible with the drum cartridge 1, the specifications of the drum cartridge 1, the service life of each photosensitive drum 11, the charging characteristics of each photosensitive drum 11, information indicating whether the drum cartridge 1 is new, the rotation count of each photosensitive drum 11, the charging time of each photosensitive drum 11, the number of printed pages, and the error history. The drum memory 151 may not be located at the drum circuit board 15. The drum memory 151 may specifically be located at the surface of the frame 12.

The drum memory 151 includes a first storage area for storing information in an unrewritable manner and a second storage area for storing information in a rewritable manner. The first storage area is configured to store, for example, at least one of the manufacturing serial number, the identification code, the compatible models, the specifications, the service life of each photosensitive drum 11, and the charging characteristics of each photosensitive drum 11 described above. The second storage area is configured to store, for example, the use conditions of the drum cartridge 1. The use conditions of the drum cartridge 1 include at least one of information indicating whether the drum cartridge 1 is new, the rotation count of each photosensitive drum 11, the charging time of each photosensitive drum 11, the number of printed pages, and the error history described above.

The drum memory 151 is configured to store information about the toner cartridges 2. For example, the drum memory 151 is configured to store the unique identification information for each toner cartridge 2 attached to the drum cartridge 1. The unique identification information is, for example, read from the toner memory 241 (described later), and written into the drum memory 151 in the drum circuit board 15. The unique identification information stored in this manner can be used to determine whether each toner cartridge 2 attached to the drum cartridge 1 is attached before or is attached for the first time. In some embodiments, the drum memory 151 may not store information about the toner cartridges 2.

The drum memory 151 is configured to store the use history information about the toner cartridges 2 attached to the drum cartridge 1. The use history information about the toner cartridges 2 includes at least one of the rotation count of each developing roller 22, the amount of toner used, and the error history of the toner cartridges 2. The use history information about the toner cartridges 2 stored in the drum memory 151 can be used to analyze any abnormality by simply checking the drum memory 151 without searching the toner memory 241 of each toner cartridge 2. In some embodiments, the drum memory 151 may not store the use history information about the toner cartridges 2 attached to the drum cartridge 1.

1-3. Structure of Toner Cartridge

The structure of the toner cartridge 2 will now be described. The structure of the toner cartridge 2 attached to the drum cartridge 1 will be described using the first direction and the second direction.

Figure 5:
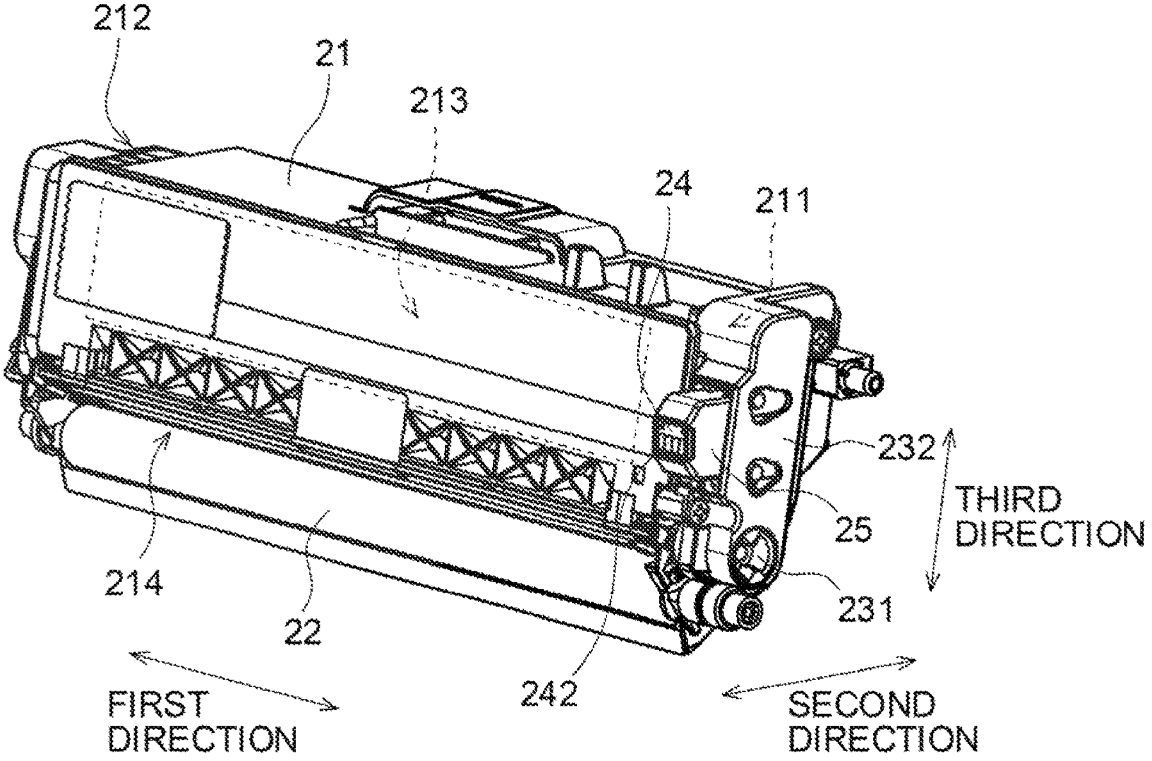
FIG. 5 is a perspective view of a toner cartridge.

FIG. 5 is a perspective view of the toner cartridge 2. As shown in FIG. 5, the toner cartridge 2 includes a casing 21, a developing roller 22, a plurality of gears, a coupling 231, a gear cover 232, a toner circuit board 24, and a toner memory 241.

The casing 21 is a housing for containing toner. The casing 21 extends between a first outer surface 211 and a second outer surface 212 in the first direction. The casing 21 has an internal chamber 213. The toner is contained in the chamber 213. The casing 21 also has an opening 214 located in an end of the casing 21 in a third direction intersecting with the first direction and the second direction.

The developing roller 22 is a roller rotatable about the rotational shaft extending in the first direction. The developing roller 22 is located in the opening 214 of the casing 21. More specifically, the developing roller 22 is located at the end of the casing 21 in the third direction. When the toner cartridge 2 is attached to the drum cartridge 1, the peripheral surface of the developing roller 22 contacts the peripheral surface of the photosensitive drum 11.

The toner is fed from the chamber 213 to the peripheral surface of the photosensitive drum 11 through the developing roller 22. The toner retained on the peripheral surface of the developing roller 22 moves from the developing roller 22 to the photosensitive drum 11 in accordance with an electrostatic latent image formed on the peripheral surface of the photosensitive drum 11. The electrostatic latent image thus appears on the peripheral surface of the photosensitive drum 11.

The gears, the coupling 231, and the gear cover 232 are located at the first outer surface 211 of the casing 21. The gear cover 232 is, for example, screwed onto the first outer surface 211 of the casing 21. At least some of the gears are located between the first outer surface 211 of the casing 21 and the gear cover 232. The coupling 231 is exposed from the gear cover 232. When the drum cartridge 1 attaching the toner cartridges 2 is attached to the image forming apparatus 100, a drive shaft of the image forming apparatus 100 is connected to the coupling 231. The rotation of the drive shaft is transferred to the developing roller 22 and other components through the coupling 231 and the gears.

The toner circuit board 24 is held by a holder 25. The holder 25 is located between the first outer surface 211 of the casing 21 and the gear cover 232 in the first direction. In some embodiments, the holder 25 may be located differently in the toner cartridge 2. The holder 25 may be movable relative to the casing 21 and the gear cover 232 in the second direction.

The toner circuit board 24 includes a plurality of terminals 242. Each terminal 242 is an uncovered conductor. When a toner cartridge 2 is attached to a toner cartridge holder 121 of the drum cartridge 1, the terminals 242 of the toner circuit board 24 contact the second terminals 141 of the second electric terminal unit 14. In the present embodiment, the toner circuit board 24 has four terminals 242. The second electric terminal unit 14 has four second terminals 141.

Figure 6:
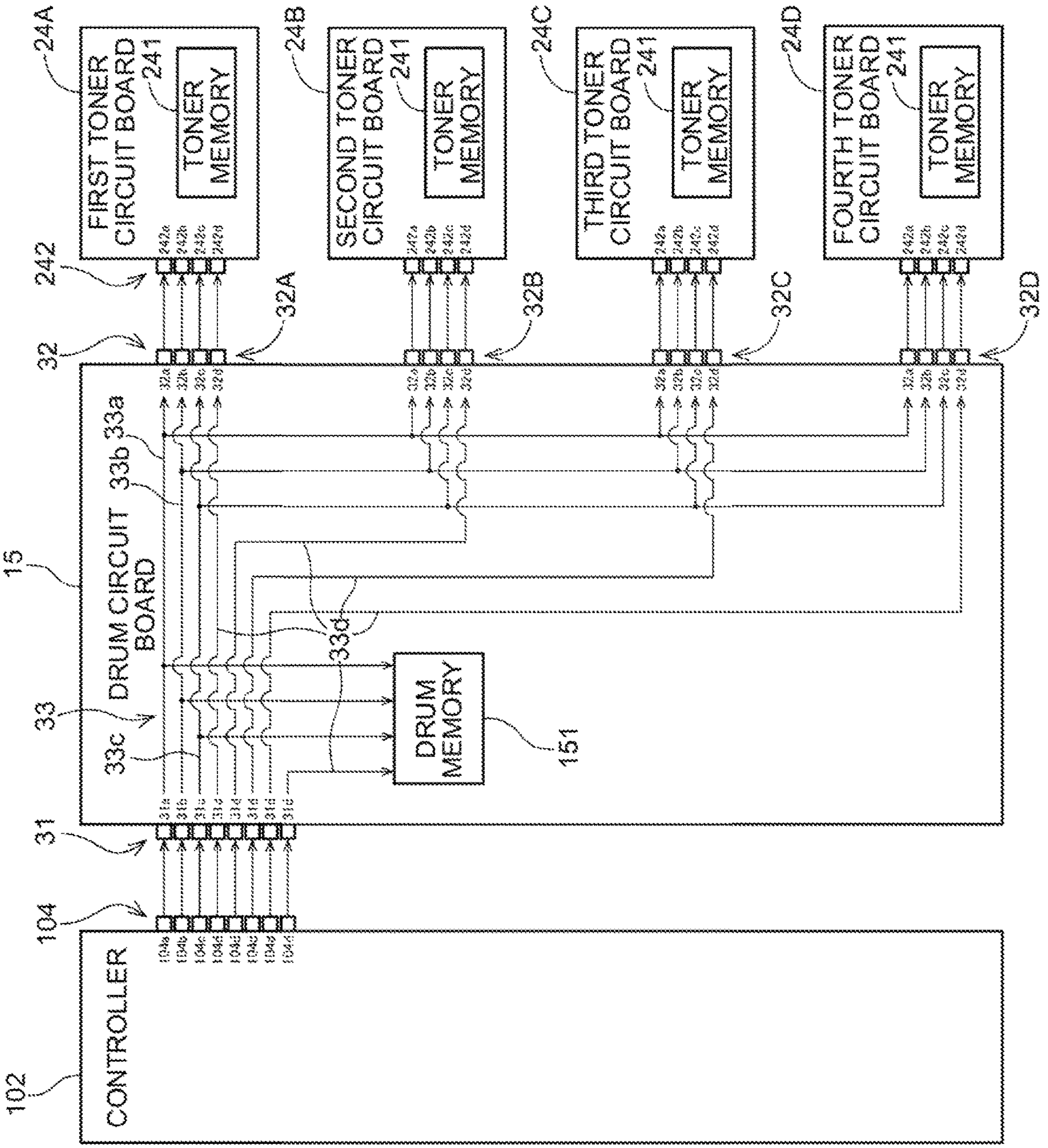
FIG. 6 is a block diagram showing electrical connection between a controller, a drum circuit board, and four toner circuit boards.

The toner cartridge 2 also includes the toner memory 241 as a storage medium (not shown in FIG. 5, and refer to FIG. 6). The toner memory 241 is located at the toner circuit board 24. The toner memory 241 stores various sets of information about the toner cartridge 2. For example, the toner memory 241 stores at least one of information for identifying the toner cartridge 2 and information indicating the characteristics of the toner cartridge 2. The information for identifying the toner cartridge 2 includes, for example, at least one of the manufacturing serial number of the toner cartridge 2 and the identification code indicating that the toner cartridge 2 is a genuine product. The information indicating the characteristics of the toner cartridge 2 includes, for example, at least one of models compatible with the toner cartridge 2, the specifications of the toner cartridge 2, the capacity for toner, the service life of the developing roller 22, information indicating whether the toner cartridge 2 is new, the rotation count of the developing roller 22, the number of printed pages, and the error history. The toner memory 241 may not be located at the toner circuit board 24. The toner memory 241 may specifically be located at the casing 21.

1-4. Drum Circuit Board

The structure of the drum circuit board 15 will now be described in more detail. FIG. 6 is a block diagram showing electrical connection between the controller 102, the drum circuit board 15, and the toner circuit boards 24. As shown in FIG. 6, the drum circuit board 15 includes the body terminals 31, the toner terminals 32, and relay lines 33.

1-4-1. Body Terminal

The body terminals 31 are electrically connected to terminals 104 on the controller 102 through the first electric terminal unit 13 described above in the image forming apparatus 100 having the drum cartridge 1 attached to the body casing 101. This electrically connects the drum circuit board 15 and the controller 102. The body terminals 31 include a body voltage terminal 31*a*, a body grounding terminal 31*b*, a body clock terminal 31*c*, and body signal terminals 31*d*. As shown in FIG. 6, the drum circuit board 15 in the present embodiment includes a plurality of, or specifically eight body terminals 31. More specifically, the body terminals 31 include a single body voltage terminal 31*a*, a single body grounding terminal 31*b*, a single body clock terminal 31*c*, and five body signal terminals 31*d*. The controller 102 includes a plurality of, or specifically eight terminals 104.

When the drum cartridge 1 is attached to the body casing 101 of the image forming apparatus 100, the body voltage terminal 31*a* is electrically connected to a voltage terminal 104*a* of the terminals 104 of the controller 102, providing a power supply voltage from the controller 102 to the drum circuit board 15.

When the drum cartridge 1 is attached to the body casing 101 of the image forming apparatus 100, the body grounding terminal 31*b* is electrically connected to a grounding terminal 104*b* of the terminals 104 of the controller 102, providing a grounding voltage from the controller 102 to the drum circuit board 15.

When the drum cartridge 1 is attached to the body casing 101 of the image forming apparatus 100, the body clock terminal 31*c* is electrically connected to a clock terminal 104*c* of the terminals 104 of the controller 102, providing a clock signal from the controller 102 to the drum circuit board 15 at fixed time intervals.

When the drum cartridge 1 is attached to the body casing 101 of the image forming apparatus 100, the body signal terminals 31*d* are electrically connected to signal terminals 104*d* of the terminals 104 on the controller 102, allowing exchange of signals carrying various sets of information between the controller 102 and the drum circuit board 15. In the present embodiment, serial communication is performed to transmit and receive information. In the present embodiment, the body terminals 31 include five body signal terminals 31*d*, and the controller 102 includes five signal terminals 104*d*. When the drum cartridge 1 is attached to the body casing 101 of the image forming apparatus 100, each of the body signal terminals 31*d* is electrically connected to the corresponding signal terminal 104*d*.

1-4-2. Toner Terminal

When the toner cartridges 2 is attached to the frame 12 of the drum cartridge 1, the toner terminals 32 are electrically connected to the toner circuit boards 24 of the toner cartridges 2 through the second electric terminal units 14 described above. This electrically connects the drum circuit board 15 and the toner circuit boards 24. As shown in FIG. 6, the drum circuit board 15 in the present embodiment includes sixteen toner terminals 32.

The four toner cartridges 2 attached to the drum cartridge 1 are herein referred to as a first toner cartridge 2A, a second toner cartridge 2B, a third toner cartridge 2C, and a fourth toner cartridge 2D. The toner circuit board 24 of the first toner cartridge 2A is referred to as a first toner circuit board 24A. The toner circuit board 24 of the second toner cartridge 2B is referred to as a second toner circuit board 24B. The toner circuit board 24 of the third toner cartridge 2C is referred to as a third toner circuit board 24C. The toner circuit board 24 of the fourth toner cartridge 2D is referred to as a fourth toner circuit board 24D.

The toner terminals 32 include a first group 32A of four toner terminals, a second group 32B of four toner terminals, a third group 32C of four toner terminals, and a fourth group 32D of four toner terminals.

When the first toner cartridge 2A is attached to the frame 12 of the drum cartridge 1, the toner terminals 32 of the first group 32A are electrically connected to the first toner circuit board 24A. When the second toner cartridge 2B is attached to the frame 12 of the drum cartridge 1, the toner terminals 32 of the second group 32B are electrically connected to the second toner circuit board 24B. When the third toner cartridge 2C is attached to the frame 12 of the drum cartridge 1, the toner terminals 32 of the third group 32C are electrically connected to the third toner circuit board 24C. When the fourth toner cartridge 2D is attached to the frame 12 of the drum cartridge 1, the toner terminals 32 of the fourth group 32D are electrically connected to the fourth toner circuit board 24D.

The toner terminals 32 in each group include a toner voltage terminal 32*a*, a toner grounding terminal 32*b*, a toner clock terminal 32*c*, and a toner signal terminal 32*d*.

The toner voltage terminals 32*a* are electrically connected to the body voltage terminal 31*a* through a voltage relay line 33*a* (described later). When the toner cartridges 2 is attached to the frame 12 of the drum cartridge 1, the toner voltage terminals 32*a* are electrically connected to voltage terminals 242*a* of the terminals 242 of the toner circuit boards 24, providing a power supply voltage from the controller 102 to the toner circuit boards 24 through the drum circuit board 15.

The toner grounding terminals 32*b* are electrically connected to the body grounding terminal 31*b* through a grounding relay line 33*b* (described later). When the toner cartridges 2 are attached to the frame 12 of the drum cartridge 1, the toner grounding terminals 32*b* are electrically connected to grounding terminals 242*b* of the terminals 242 on the toner circuit boards 24, providing a grounding voltage from the controller 102 to the toner circuit boards 24 through the drum circuit board 15.

The toner clock terminals 32*c* are electrically connected to the body clock terminal 31*c* through a clock relay line 33*c* (described later). When the toner cartridges 2 is attached to the frame 12 of the drum cartridge 1, the toner clock terminals 32*c* are electrically connected to clock terminals 242*c* of the terminals 242 of the toner circuit boards 24, providing a clock signal from the controller 102 to the toner circuit boards 24 through the drum circuit board 15 at fixed time intervals.

The toner signal terminals 32*d* are each electrically connected to one of the body signal terminals 31*d* through a signal relay line 33*d* (described later). Each of the toner signal terminal 32*d* of the first group 32A, the toner signal terminal 32*d* of the second group 32B, the toner signal terminal 32*d* of the third group 32C, and the toner signal terminal 32*d* of the fourth group 32D is electrically connected to a different one of the body signal terminals 31*d*. When the toner cartridges 2 are attached to the frame 12 of the drum cartridge 1, the toner signal terminals 32*d* are electrically connected to signal terminals 242*d* of the terminals 242 of the toner circuit boards 24, allowing exchange of signals carrying various sets of information between the controller 102 and the toner circuit boards 24 through the drum circuit board 15.

1-4-3. Relay Line

The relay lines 33 include the voltage relay line 33*a*, the grounding relay line 33*b*, the clock relay line 33*c*, and the signal relay lines 33*d*. As shown in FIG. 6, the drum circuit board 15 includes a plurality of, or specifically eight relay lines 33. More specifically, the relay lines 33 include a single voltage relay line 33*a*, a single grounding relay line 33*b*, a single clock relay line 33*c*, and five signal relay lines 33*d*.

The voltage relay line 33*a* has one end electrically connected to the body voltage terminal 31*a*, and the other end split in five ends. More specifically, the voltage relay line 33*a* has the other ends including a first end, a second end, a third end, a fourth end, and a fifth end. The first end of the voltage relay line 33*a* is electrically connected to the toner voltage terminal 32*a* of the first group 32A. The second end is electrically connected to the toner voltage terminal 32*a* of the second group 32B. The third end is electrically connected to the toner voltage terminal 32*a* of the third group 32C. The fourth end is electrically connected to the toner voltage terminal 32*a* of the fourth group 32D. The fifth end is electrically connected to the drum memory 151. Thus, the drum circuit board 15 provides the power supply voltage received through the body voltage terminal 31*a* to the four toner voltage terminals 32*a* and the drum memory 151. The common body voltage terminal 31*a* reduces the number of body terminals 31.

The grounding relay line 33*b* has one end electrically connected to the body grounding terminal 31*b*, and the other end split in five ends. More specifically, the grounding relay line 33*b* has the other ends including a first end, a second end, a third end, a fourth end, and a fifth end. The first end of the grounding relay line 33*b* is electrically connected to the toner grounding terminal 32*b* of the first group 32A. The second end is electrically connected to the toner grounding terminal 32*b* of the second group 32B. The third end is electrically connected to the toner grounding terminal 32*b* of the third group 32C. The fourth end is electrically connected to the toner grounding terminal 32*b* of the fourth group 32D. The fifth end is electrically connected to the drum memory 151. Thus, the drum circuit board 15 provides the grounding voltage received through the body grounding terminal 31*b* to the four toner grounding terminals 32*b* and the drum memory 151. The common body grounding terminal 31*b* reduces the number of body terminals 31.

The clock relay line 33*c* has one end electrically connected to the body clock terminal 31*c*, and the other end split in five ends. More specifically, the clock relay line 33*c* has the other ends including a first end, a second end, a third end, a fourth end, and a fifth end. The first end of the clock relay line 33*c* is electrically connected to the toner clock terminal 32*c* of the first group 32A. The second end is electrically connected to the toner clock terminal 32*c* of the second group 32B. The third end is electrically connected to the toner clock terminal 32*c* of the third group 32C. The fourth end is electrically connected to the toner clock terminal 32*c* of the fourth group 32D. The fifth end is electrically connected to the drum memory 151. Thus, the drum circuit board 15 provides the clock signals received through the body clock terminal 31*c* to the four toner clock terminals 32*c* and the drum memory 151. The common body clock terminal 31*c* reduces the number of body terminals 31.

The relay lines 33 include five signal relay lines 33*d*. Each signal relay line 33*d* has one end electrically connected to the corresponding body signal terminal 31*d*, and the other end that is either a first or and a second end. The first end of the signal relay line 33*d* is electrically connected to the corresponding toner signal terminal 32*d*. The second end of the signal relay line 33*d* is electrically connected to the drum memory 151. Four of the signal relay lines 33*d* each have the first end, whereas one signal relay line 33*d* has one second end. More specifically, four body signal terminals 31*d* are connected to the four toner signal terminals 32*d* in a one-to-one manner through the four signal relay lines 33*d* each having the first end, whereas the single body signal terminal 31*d* is connected to the drum memory 151 in a one-to-one manner through the single signal relay line 33*d* having the second end.

1-4-4. Information Relay Through Drum Circuit Board

As described above, when the drum cartridge 1 holding toner cartridges 2 is attached to the body casing 101 of the image forming apparatus 100, the controller 102 is electrically connected to the toner circuit boards 24 through the drum circuit board 15. The drum circuit board 15 thus allows information relay between the controller 102 and the toner circuit boards 24. For example, the drum circuit board 15 can obtain information stored in a toner memory 241 through the second harness 17 and a toner terminal 32, and output the obtained information to the controller 102 through the corresponding body terminal 31 and the first harness 16. The drum circuit board 15 can also obtain information transmitted from the controller 102 through the first harness 16 and a body terminal 31, and output the obtained information to a toner circuit board 24 through the corresponding toner terminal 32 and the second harness 17.

As in second to ninth embodiments described later, the drum cartridge 1 may include a multiplexer 34, a transistor array 35, and a CPU 37. The drum circuit board 15 may relay information between the controller 102 and the toner circuit boards 24 through the multiplexer 34, the transistor array 35, and the CPU 37.

The drum circuit board 15 that interfaces between the controller 102 and the toner circuit boards 24 can have fewer terminals than when the drum circuit board 15 and the toner circuit boards 24 are directly connected to the controller 102. As shown in FIG. 6, for example, the single body voltage terminal 31*a* can provide the power supply voltage to the drum memory 151 in the drum circuit board 15 and the toner memories 241 in the toner circuit boards 24. As shown in FIG. 6, the single body grounding terminal 31*b* can provide the grounding voltage to the drum memory 151 of the drum circuit board 15 and the toner memories 241 of the toner circuit boards 24. As shown in FIG. 6, the single body clock terminal 31*c* can provide the clock signal to the drum memory 151 in the drum circuit board 15 and the toner memories 241 in the toner circuit boards 24. The controller 102 thus has fewer terminals 104.

In particular, when a plurality of toner circuit boards 24 are used as in the present embodiment, the drum circuit board 15 that interfaces between the controller 102 and the toner circuit boards 24 can have fewer terminals. As shown in FIG. 6, for example, the single body voltage terminal 31*a* can provide the power supply voltage to the toner circuit boards 24. As shown in FIG. 6, the single body grounding terminal 31*b* can provide the grounding voltage to the toner circuit boards 24. As shown in FIG. 6, the single body clock terminal 31*c* can provide the clock signal to the toner circuit boards 24. The controller 102 thus has still fewer terminals 104.

1-5. Processing after Drum Cartridge Attaching

Figure 7:
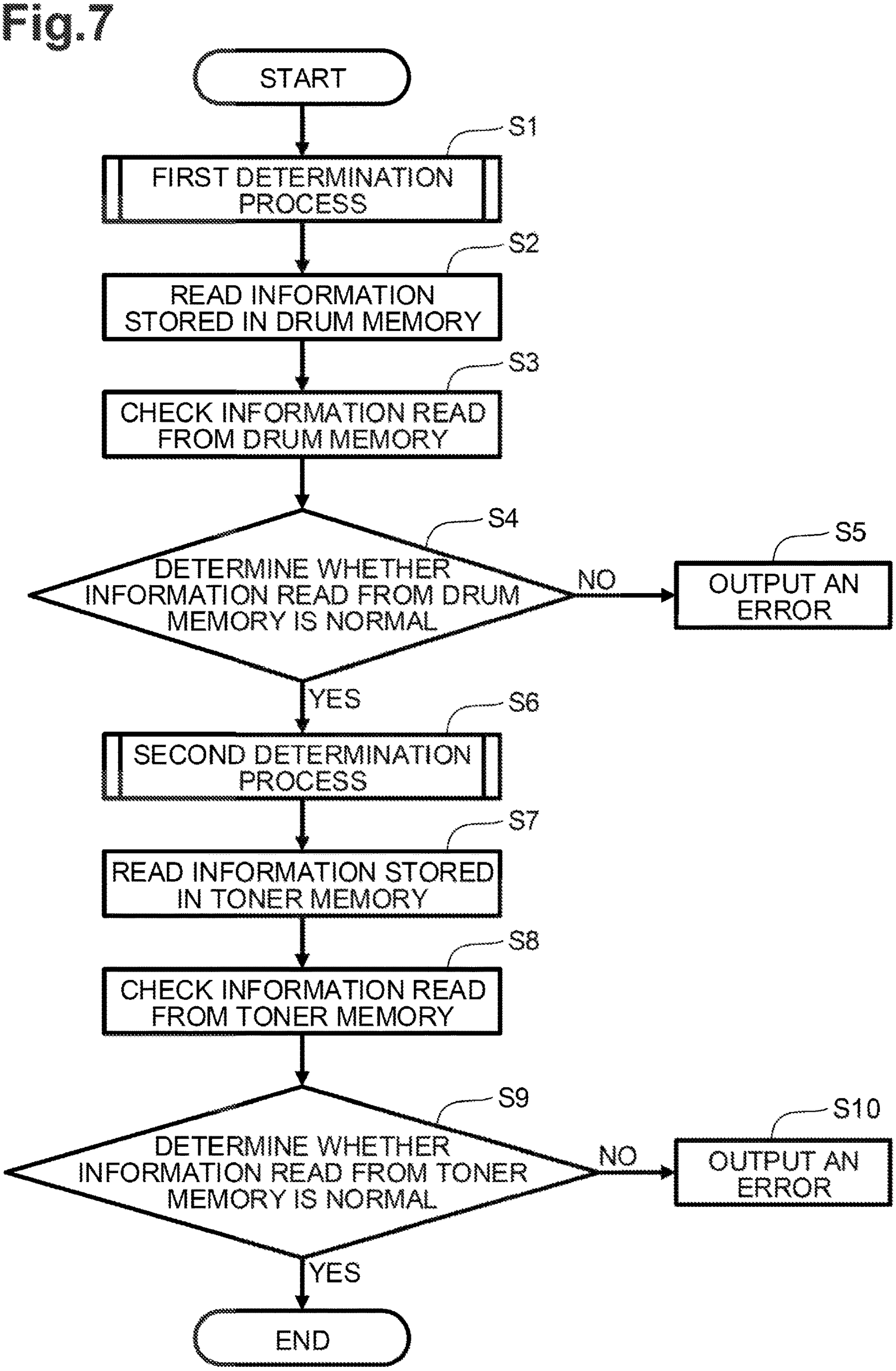
FIG. 7 is a flowchart showing the processing after the drum cartridge is attached.

The processing performed by the controller 102 after the drum cartridge 1 is attached to the body casing 101 of the image forming apparatus 100 will now be described. FIG. 7 is a flowchart showing the processing performed by the controller 102.

When the drum cartridge 1 is attached to the body casing 101 of the image forming apparatus 100 and the front cover of the body casing 101 is closed, the controller 102 performs a first determination process (step S1). The first determination process determines whether the controller 102 can communicate with the drum memory 151, and authenticates the drum memory.

Figure 8:
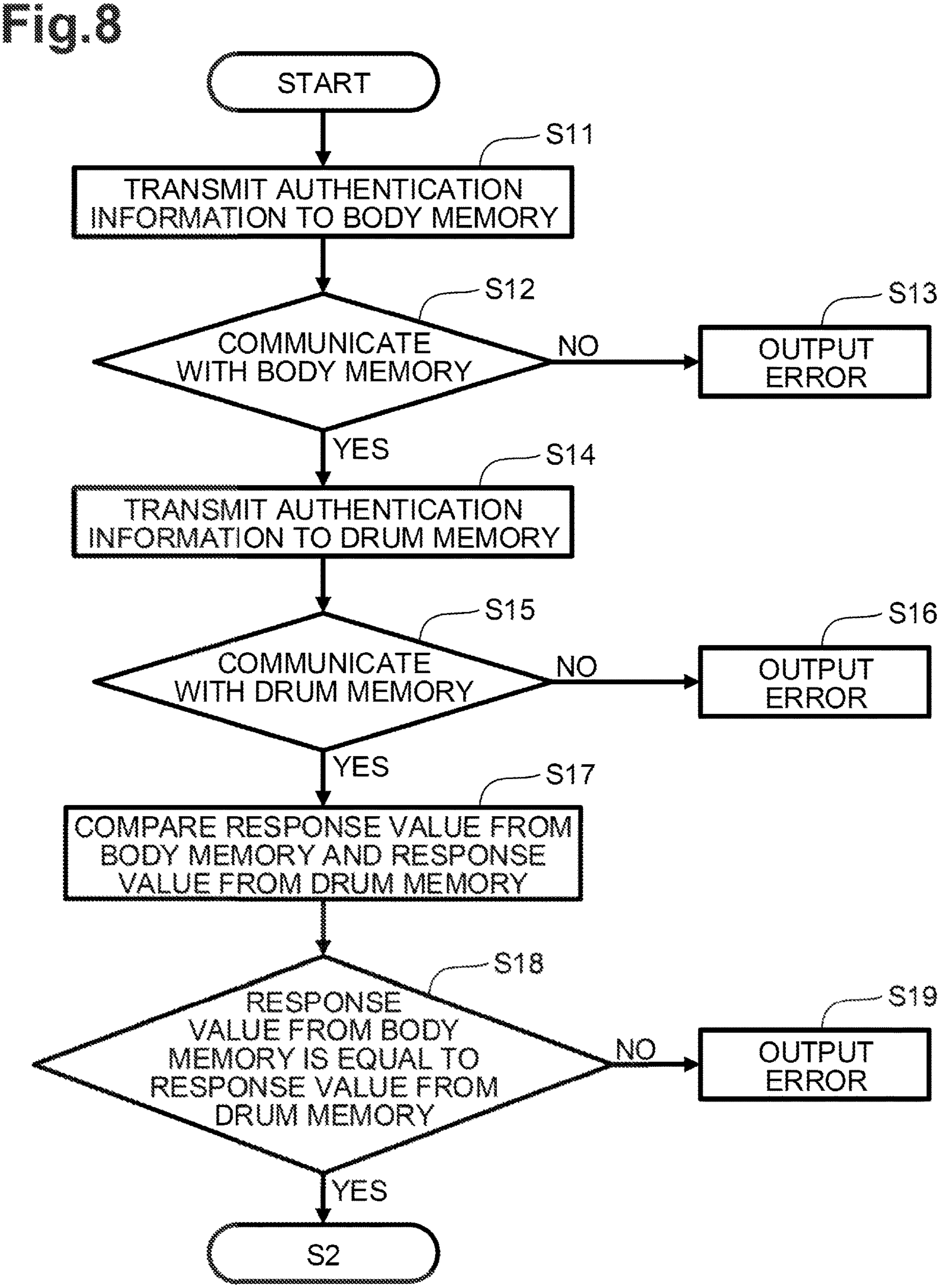
FIG. 8 is a flowchart showing a first determination process.

FIG. 8 is a flowchart showing the first determination process in detail. In the first determination process, the processor 105 in the controller 102 first transmits authentication information (second drum authentication information) to the body memory 106 (step S11) (third transmission process). For example, the processor 105 reads authentication information (second drum authentication information) stored in a storage area in the body memory 106. The processor 105 then transmits the read authentication information (second drum authentication information) to another area in the body memory 106. The processor 105 stores the authentication information (second drum authentication information) in this area in the body memory 106. The processor 105 receives a response value (third response value) from the body memory 106.

When the processor 105 receives no response value from the body memory 106, the processor 105 cannot communicate with the body memory 106 (no in step S12). The processor 105 then outputs an error (step S13). More specifically, for example, the processor 105 reads body communication error message information stored in the body memory 106. The processor 105 displays the read body communication error message information on the display 103.

When the processor 105 receives a response value from the body memory 106, the processor 105 can communicate with the body memory 106 (yes in step S12). The processor 105 then transmits authentication information (first drum authentication information) to the drum memory 151 (step S14) (first transmission process). For example, the processor 105 reads authentication information stored in the body memory 106. The processor 105 then transmits the read authentication information to the drum memory 151. The processor 105 stores the authentication information in the drum memory 151. The processor 105 receives a response value (first response value) from the drum memory 151 (first reception process).

When the processor 105 receives no response value from the drum memory 151, the processor 105 cannot communicate with the drum memory 151 (no in step S15). The processor 105 then outputs an error (step S16) (first error output process). More specifically, for example, the processor 105 reads drum communication error message information stored in the body memory 106. The processor 105 displays the read drum communication error message information on the display 103.

When the processor 105 receives a response value from the drum memory 151, the processor 105 can communicate with the drum memory 151 (yes in step S15). The processor 105 then compares the response value from the body memory 106 (third response value) and the response value from the drum memory 151 (first response value) (step S17) (first comparison process). More specifically, the processor 105 determines whether the response value from the body memory 106 (third response value) is equal to the response value from the drum memory 151 (first response value).

When the response value from the body memory 106 (third response value) is not equal to the response value from the drum memory 151 (first response value) (no in step S18), the authentication of the drum memory 151 in the first determination process fails. The processor 105 then outputs an error (step S19) (first error output process). More specifically, for example, the processor 105 reads drum authentication error message information stored in the body memory 106. The processor 105 displays the read drum authentication error message information on the display 103.

When the response value from the body memory 106 (third response value) is equal to the response value from the drum memory 151 (first response value) (yes in step S18), the authentication of the drum memory 151 in the first determination process succeeds. The processor 105 then advances to the processing in step S2.

The controller 102 may store a first predetermined value in the body memory 106. In step S17 (first comparison process), the processor 105 may compare the response value from the drum memory 151 (first response value) and the first predetermined value. More specifically, the processor 105 may determine whether the response value from the drum memory 151 (first response value) is equal to the first predetermined value.

When the response value from the drum memory 151 is not equal to the first predetermined value, the authentication of the drum memory 151 fails. The processor 105 thus outputs an error. When the response value from the drum memory 151 is equal to the first predetermined value, the authentication of the drum memory 151 succeeds. The processor 105 thus advances to the processing in step S2.

Referring again to FIG. 7, when the authentication of the drum memory 151 succeeds, the processor 105 reads information stored in the drum memory 151 (step S2). The information read in this step includes, for example, at least one of the manufacturing serial number of the drum cartridge 1, the identification code indicating that the drum cartridge 1 is a genuine product, models compatible with the drum cartridge 1, the specifications of the drum cartridge 1, the service life of each photosensitive drum 11, the charging characteristics of each photosensitive drum 11, information indicating whether the drum cartridge 1 is new, the rotation count of each photosensitive drum 11, the charging time of each photosensitive drum 11, the number of printed pages, and the error history described above.

The processor 105 then determines whether the information read from the drum memory 151 is normal (step S3). More specifically, the processor 105 determines whether the information read from the drum memory 151 satisfies a predetermined condition.

When the information read from the drum memory 151 is not normal, the information fails to satisfy the predetermined condition (no in step S4). The processor 105 then outputs an error (step S5). More specifically, for example, the processor 105 reads drum error message information stored in the body memory 106. The processor 105 displays the read drum error message information on the display 103.

When the information read from the drum memory 151 is normal, the information satisfies the predetermined condition (yes in step S4). The processor 105 then performs a second determination process (step S6). The second determination process determines whether the controller 102 can communicate with the toner memory 241, and authenticates the toner memory 241.

Figure 9:
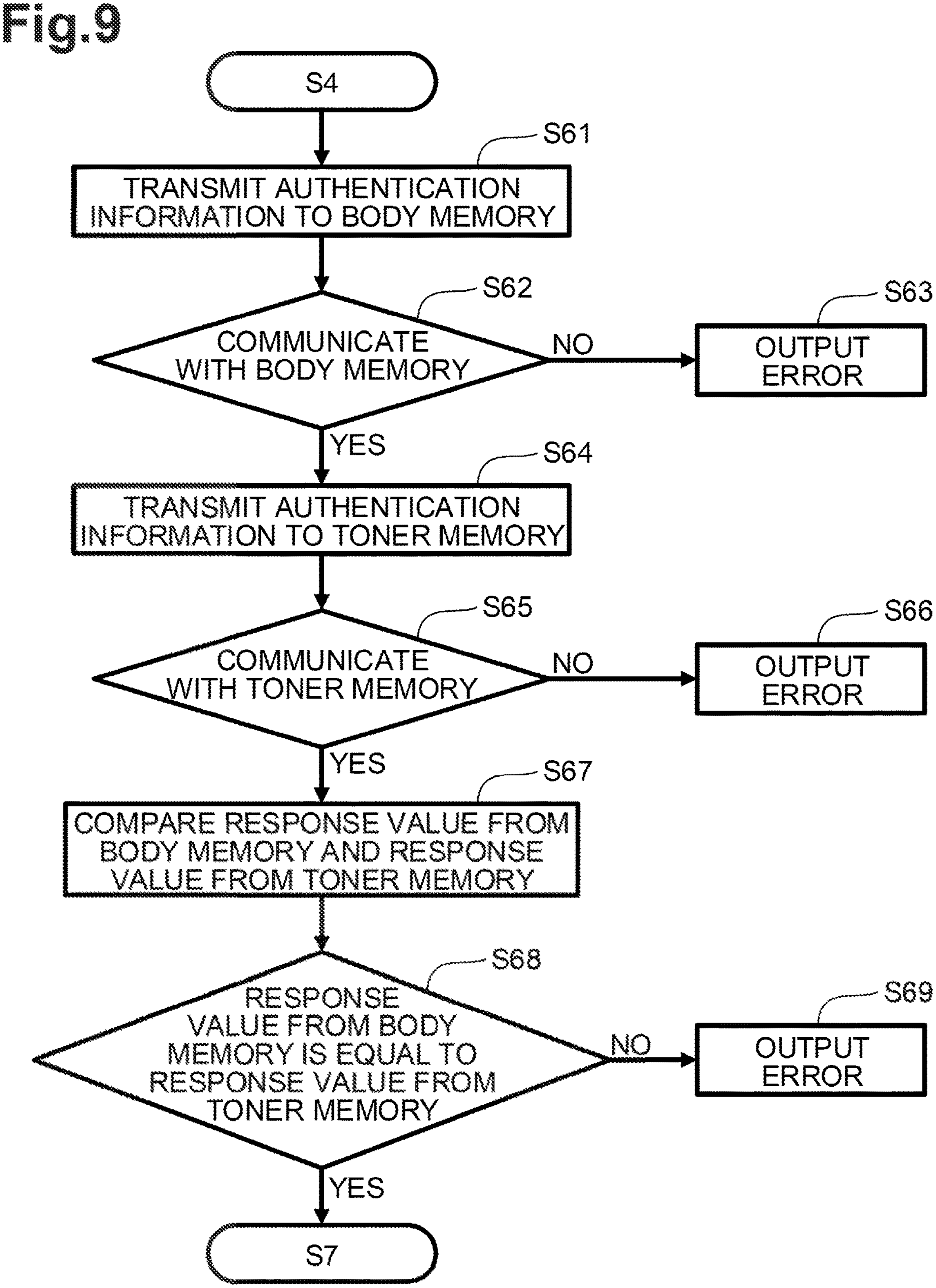
FIG. 9 is a flowchart showing a second determination process.

FIG. 9 is a flowchart showing the second determination process in detail. In the second determination process, the processor 105 in the controller 102 first transmits authentication information (second toner authentication information) to the body memory 106 (step S61) (fourth transmission process). For example, the processor 105 transmits authentication information stored in a storage area in the body memory 106 to another area in the body memory 106. The processor 105 stores the authentication information in this area in the body memory 106. The processor 105 receives a response value from the body memory 106 (fourth response value).

When the processor 105 receives no response value from the body memory 106, the processor 105 cannot communicate with the body memory 106 (no in step S62). The processor 105 then outputs an error (step S63). More specifically, for example, the processor 105 reads body communication error message information stored in the body memory 106. The processor 105 displays the read body communication error message information on the display 103.

When the processor 105 receives a response value from the body memory 106, the processor 105 can communicate with the body memory 106 (yes in step S62). The processor 105 then transmits authentication information (first toner authentication information) to the toner memory 241 (step S64) (second transmission process). For example, the processor 105 reads authentication information stored in the body memory 106 and transmits the read authentication information to the toner memory 241. The processor 105 stores the authentication information in the toner memory 241. The processor 105 receives a response value (second response value) from the toner memory 241 (second reception process).

When the processor 105 receives no response value from the drum memory 151, the processor 105 cannot communicate with the toner memory 241 (no in step S65). The processor 105 then outputs an error (step S66) (second error output process). More specifically, for example, the processor 105 reads toner communication error message information stored in the body memory 106. The processor 105 displays the read toner communication error message information on the display 103.

When the processor 105 receives a response value from the drum memory 151, the processor 105 can communicate with the toner memory 241 (yes in step S65). The processor 105 then compares the response value from the body memory 106 (fourth response value) and the response value from the toner memory 241 (second response value) (step S67) (second comparison process). More specifically, the processor 105 determines whether the response value from the body memory 106 (fourth response value) is equal to the response value from the toner memory 241 (second response value).

When the response value from the body memory 106 is not equal to the response value from the toner memory 241 (no in step S68), the authentication of the toner memory 241 in the second determination process fails. The processor 105 then outputs an error (step S69) (second error output process). More specifically, for example, the processor 105 reads toner authentication error message information stored in the body memory 106. The processor 105 displays the read toner authentication error message information on the display 103. An error message appears on the display 103.

When the response value from the body memory 106 is equal to the response value from the toner memory 241 (yes in step S68), the authentication of the toner memory 241 in the second determination process succeeds. The processor 105 then advances to the processing in step S7.

The controller 102 may store a second predetermined value in the body memory 106. In step S67 (second comparison process), the processor 105 may compare the response value from the toner memory 241 (second response value) and the second predetermined value. More specifically, the processor 105 may determine whether the response value from the toner memory 241 (second response value) is equal to the second predetermined value.

When the response value from the toner memory 241 is not equal to the second predetermined value, the authentication of the toner memory 241 fails. The processor 105 thus outputs an error. When the response value from the toner memory 241 is equal to the second predetermined value, the authentication of the toner memory 241 succeeds. The processor 105 thus advances to the processing in step S7.

Referring again to FIG. 7, when the authentication of the toner memory 241 succeeds, the processor 105 reads information stored in the toner memory 241 (step S7). The information read in this step includes, for example, at least one of the manufacturing serial number of the toner cartridge 2, the identification code indicating that the toner cartridge 2 is a genuine product, models compatible with the toner cartridge 2, the specifications of the toner cartridge 2, the capacity for toner, the service life of the developing roller 22, information indicating whether the toner cartridge 2 is new, the rotation count of the developing roller 22, the number of printed pages, and the error history described above.

The processor 105 then determines whether the information read from the toner memory 241 is normal (step S8). More specifically, the processor 105 determines whether the information read from the toner memory 241 satisfies a predetermined condition.

When the information read from the toner memory 241 is not normal, the information fails to satisfy the predetermined condition (no in step S9). The processor 105 then outputs an error (step S10). More specifically, for example, the processor 105 reads toner error message information stored in the body memory 106. The processor 105 displays the read toner error message information on the display 103.

When the information read from the toner memory 241 is normal, the information satisfies the predetermined condition (yes in step S9). The processor 105 then enters a standby mode to wait for a print instruction.

The processing in steps S6 to S10 is performed for each of the toner memories 241 in the toner cartridges 2.

As described above, after the drum cartridge 1 is attached to the body casing 101, the image forming apparatus 100 first performs the first determination process for the drum memory 151 (step S1), and then the second determination process for the toner memory 241 (step S2). The image forming apparatus 100 can thus efficiently perform the first determination process for the drum memory 151 and the second determination process for the toner memory 241.

In the image forming apparatus 100, the controller 102 and the toner circuit boards 24 are connected through the drum circuit board 15. If the second determination process is performed before the first determination process, it cannot be determined whether an error from the second determination process results from a failure in communication between the controller 102 and the drum circuit board 15 or from a failure in communication between the drum circuit board 15 and the toner circuit board 24. In this case, the first determination process is to be subsequently performed to isolate the error. In the present embodiment, the first determination process precedes the second determination process. An error from the first determination process will cause an error in the second determination process. In this case, the second determination process may not be performed. This eliminates unneeded determination, and improves the efficiency of the first determination process and the second determination process.

The processor 105 outputs an error in the first determination process in step S16 or S19 (first error) with priority over an error in the second determination process in step S66 or S19 (second error). More specifically, for example, the processor 105 displays a first error message on the display 103 before a second error message. The user of the image forming apparatus 100 can thus handle a failure in communication with the drum circuit board 15 before handling a failure in communication with the toner circuit board 24. This enables efficient handling of errors.

More specifically, if a second error is output with priority over a first error, it cannot be determined whether the second error results from a failure in communication between the controller 102 and the drum circuit board 15 or from a failure in communication between the drum circuit board 15 and the toner circuit boards 24. Thus, the user would handle such errors inefficiently. For a first error that is output with priority over a second error as described above, the error is determined to result from a failure in communication between the controller 102 and the drum circuit board 15. For a second error that is output after no first error is output, the error is determined to result from a failure in communication between the drum circuit board 15 and the toner circuit boards 24. The user of the image forming apparatus 100 can thus appropriately determine the part to be examined.

In the above example, the processor 105 performs the first determination process (step S1) before the second determination process (step S6). In some embodiments, the processor 105 may perform the first determination process and the second determination process in parallel, and output a first error with priority over a second error. More specifically, the processor 105 may output a first error to the display before a second error as in the above example. In other embodiments, the processor 105 may output a first error and a second error at the same time but with the first error in a more emphasized manner than the second error. For example, the processor 105 may display a first error with a larger or bolder symbol than a second error.

In the above example, the controller 102 transmits authentication information and then receives response information in the first determination process and the second determination process. In other words, the controller 102 performs authentication through two-way communication in the first determination process and the second determination process. In some embodiments, the first determination process and the second determination process may be performed through one-way communication.

1-6. Writing Body Information into Drum Memory

Figure 10:
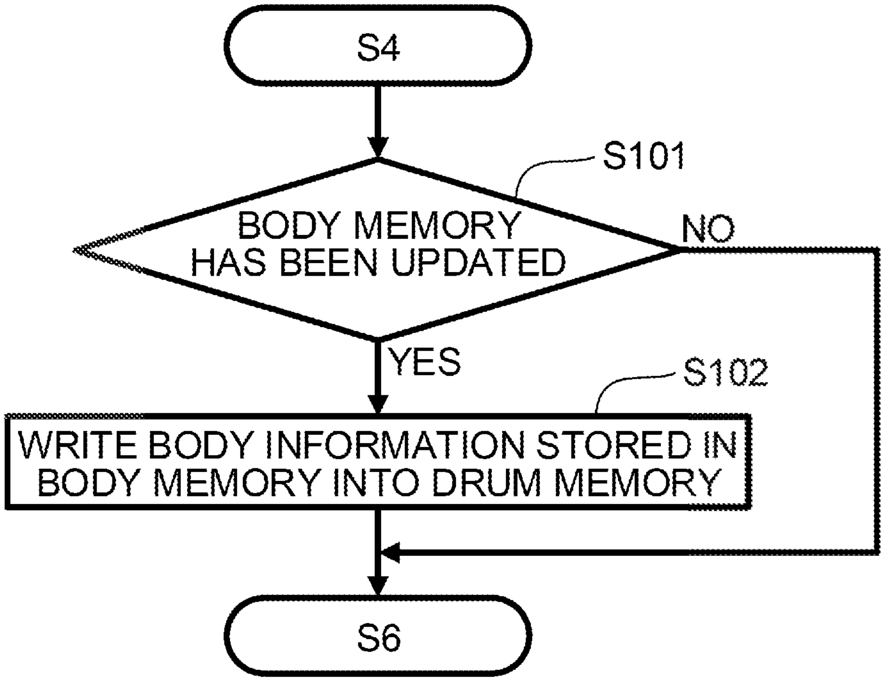
FIG. 10 is a flowchart showing the processing for writing body information into a drum memory.

FIG. 10 is a flowchart showing example processing additional to the processing in FIG. 7. In the example shown in FIG. 10, when the information read from the drum memory 151 is normal in step S4, the processor 105 first determines whether information stored in the body memory 106 (referred to as body information) is updated (step S101). When the body information is not updated (no in step S101), the processing directly advances to the processing in step S6.

When the body information is updated (yes in step S101), the processor 105 writes the body information stored in the body memory 106 into the drum memory 151 (step S102). More specifically, the processor 105 performs a reading process for reading the body information from the body memory 106 and a writing process for writing the read body information into the drum memory 151.

The body information includes, for example, at least one of information for identifying the image forming apparatus 100 and information indicating the characteristics of the image forming apparatus 100. The information for identifying the image forming apparatus 100 includes, for example, the manufacturing serial number of the image forming apparatus 100. The information indicating the characteristics of the image forming apparatus 100 includes, for example, at least one of the model code of the image forming apparatus 100, the specifications of the image forming apparatus 100, the characteristics of components in the image forming apparatus 100, the use history of the image forming apparatus 100, and the error history of the image forming apparatus 100.

In this manner, the information about the image forming apparatus 100 is partially stored in the drum memory 151. The information stored in the drum memory 151 can be used to determine the state of the image forming apparatus 100. For any abnormality in the image forming apparatus 100, the manufacturer may simply recall the drum memory 151 instead of recalling the image forming apparatus 100, and analyze the abnormality based on the body information stored in the drum memory 151.

1-7. Writing Toner Information into Drum Memory

Figure 11:
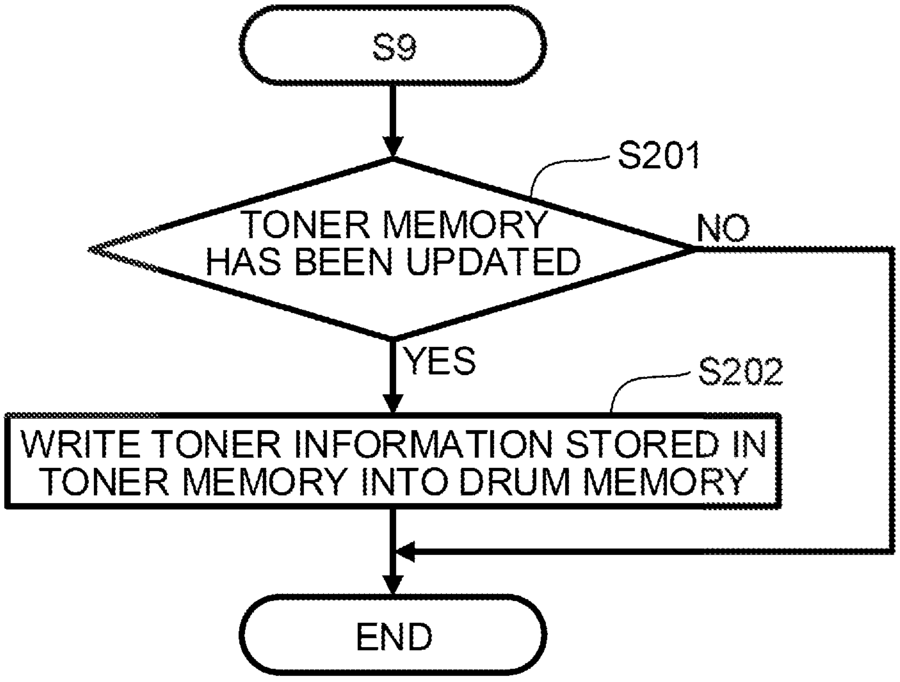
FIG. 11 is a flowchart showing the processing for writing toner information into the drum memory.

FIG. 11 is a flowchart showing example processing additional to the processing in FIG. 7. In the example shown in FIG. 11, when the information read from the toner memory 241 is normal in step S9, the processor 105 first determines whether information stored in the toner memory 241 (referred to as toner information) is updated (step S201). When the toner information is not updated (no in step S201), the processor 105 directly enters the standby mode to wait for a print instruction.

When the toner information is updated (yes in step S201), the processor 105 writes the toner information stored in the toner memory 241 into the drum memory 151 (step S202). More specifically, the processor 105 performs a reading process for reading the toner information from the toner memory 241 and a writing process for writing the read toner information into the drum memory 151.

In step S201, each of the toner memories 241 in the four toner cartridges 2 is checked for any update of the toner information. When any update for toner information update is found for at least one single toner memory 241, the processing in step S202 is performed. The toner information in all the toner memories 241 for which updates are found is written into the drum memory 151.

The toner information includes, for example, at least one of the manufacturing serial number of the toner cartridge 2, the identification code indicating that the toner cartridge 2 is a genuine product, models compatible with the toner cartridge 2, the specifications of the toner cartridge 2, the capacity for toner, the service life of the developing roller 22, information indicating whether the toner cartridge 2 is new, the rotation count of the developing roller 22, the number of printed pages, and the error history described above.

In this manner, the information about the toner cartridges 2 is partially stored in the drum memory 151. The information stored in the drum memory 151 can be used to obtain information about the toner cartridges 2 stored in the drum cartridge 1. For any abnormality in any part of the drum cartridge 1 or any of the four toner cartridges 2, the manufacturer may simply recall the drum memory 151 instead of recalling all the drum cartridge 1 and the four toner cartridges 2, and analyze the abnormality based on the toner information stored in the drum memory 151.

Additionally, when a toner cartridge 2 is attached to the drum cartridge 1, the information stored in the drum memory 151 may be used to determine whether the toner cartridge 2 is attached before.

1-8. Drum Rotation Count Update Process

As described above, the drum memory 151 is configured to store the rotation count of each photosensitive drum 11. The rotation count of a photosensitive drum 11 is the cumulative total of the number of rotations after the photosensitive drum 11 starts being used. The rotation count of each photosensitive drum 11 stored in the drum memory 151 is updated when the print process is performed in the image forming apparatus 100. A process for updating the rotation count of each photosensitive drum 11 will now be described with reference to the flowchart in FIG. 12.

The image forming apparatus 100 includes a sensor (not shown) that senses the rotations of the photosensitive drums 11. The sensor outputs a detection signal per rotation of a photosensitive drum 11. In the print process, the processor 105 in the controller 102 first reads the rotation count of the photosensitive drum 11 from the drum memory 151. The processor 105 then checks for a detection signal (step S301). When receiving no detection signal (no in step S301), the processor 105 continues to check for a detection signal. For every rotation of the photosensitive drum 11, the sensor outputs a detection signal (yes in step S301). In response to the signal, the processor 105 increments the rotation count of the photosensitive drum 11 by one (step S302).

The processor 105 then determines whether the difference between the rotation count read from the drum memory 151 (rotation count updated last time) and the incremented rotation count has reached a predetermined count (step S303). The predetermined count may be stored in the body memory 106. The processor 105 repeats the processing in steps S301 to S303 until the difference between the rotation count updated last time and the incremented rotation count reaches the predetermined count (no in step S303).

When the difference between the rotation count updated last time and the incremented rotation count reaches the predetermined count (yes in step S303), the processor 105 writes this incremented rotation count into the drum memory 151. More specifically, the processor 105 updates the rotation count of the photosensitive drum 11 stored in the drum memory 151 (step S304).

The processor 105 performs the processing in steps S301 to S304 for each of the four photosensitive drums 11.

The rotation count of the photosensitive drum 11 stored in the drum memory 151 may be updated periodically in this manner. This eliminates the management of the rotation count information about the photosensitive drums 11 in the body memory 106 of the image forming apparatus 100. When different drum cartridges 1 are exchanged and used in different image forming apparatuses 100, the rotation count of each photosensitive drum 11 is appropriately managed for each of the drum cartridges 1. The revolution count of the photosensitive drum 11 stored in the drum memory 151 can be used to appropriately determine the service life of the photosensitive drum 11.

Figure 12:
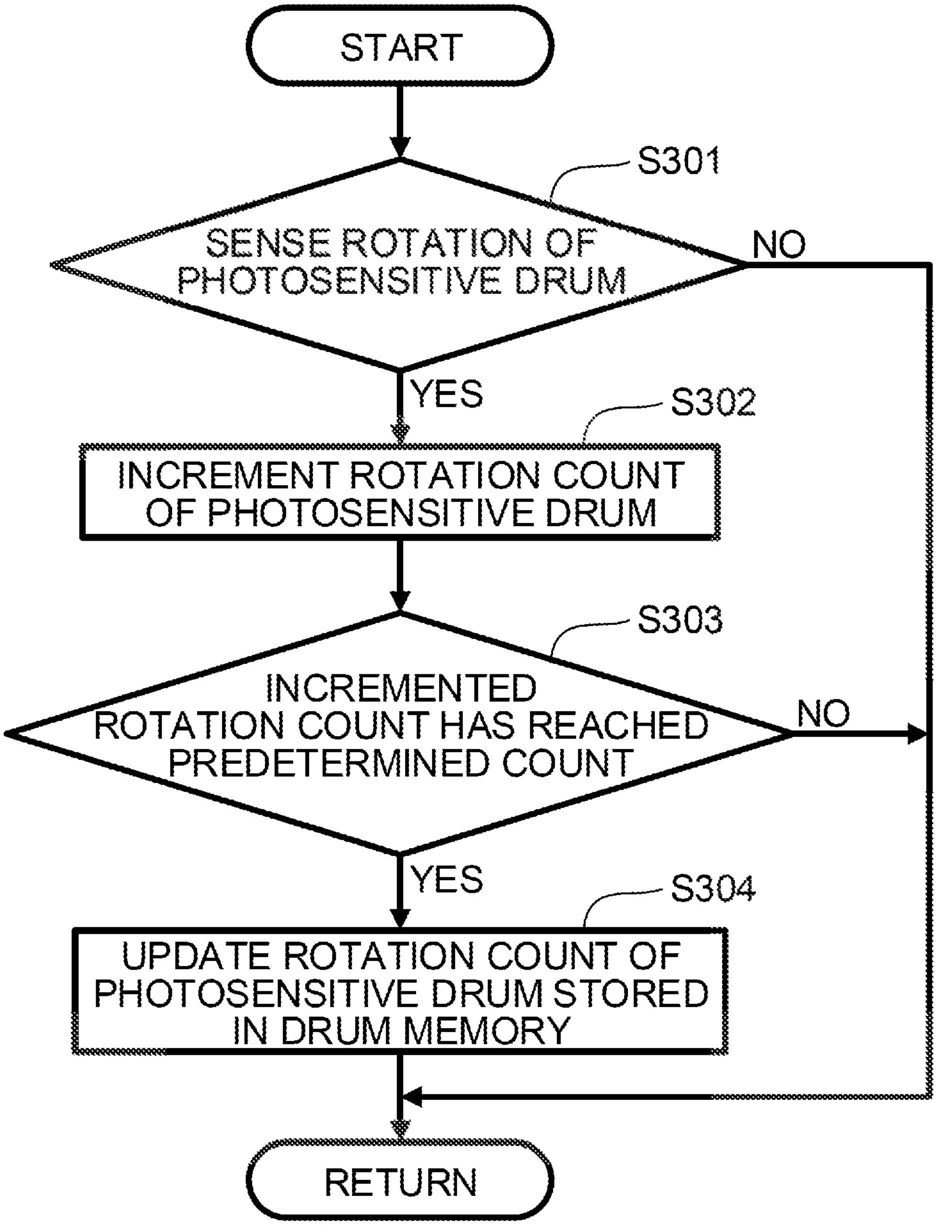
FIG. 12 is a flowchart showing the processing for updating the rotation count of photosensitive drums.

In the example shown in FIG. 12, the rotation count of the photosensitive drum 11 stored in the drum memory 151 is updated per predetermined number of rotations, instead of being updated per rotation. This reduces the processing load on the processor 105, and thus reduces delay in the print process.

1-9. Charging Time Update Process

As described above, the drum memory 151 is configured to store the charging time of each photosensitive drum 11. The charging time of a photosensitive drum 11 is the cumulative total of the time taken by a charger from when the photosensitive drum 11 starts being used to when the photosensitive drum 11 is charged completely (not shown). The charging time of the photosensitive drum 11 stored in the drum memory 151 is updated when the print process is performed in the image forming apparatus 100. The processing for updating the charging time of each photosensitive drum 11 will now be described with reference to the flowchart in FIG. 13.

In the print process, the processor 105 in the controller 102 first reads the charging time of the photosensitive drum 11 from the drum memory 151. The processor 105 then checks whether the photosensitive drum 11 is being charged (step S401). When the drum memory 151 is not being charged (no in step S401), the processor 105 continues to monitor the charging state of the photosensitive drum 11. When the photosensitive drum 11 starts being charged (yes in step S401), the processor 105 measures the charging time of the photosensitive drum 11 (step S402). The processor 105 increments the charging time read from the drum memory 151 by the measured charging time.

The processor 105 determines whether the difference between the charging time read from the drum memory 151 (charging time updated last time) and the incremented charging time has reached a predetermined time (step S403). The predetermined time may be stored in the body memory 106. The processor 105 repeats the processing in steps S401 to S403 until the difference between the charging time updated last time and the incremented charging time reaches the predetermined time (no in step S403).

When the difference between the charging time updated last time and the incremented charging time reaches the predetermined time (yes in step S403), the processor 105 writes this incremented charging time into the drum memory 151. More specifically, the processor 105 updates the charging time of the photosensitive drum 11 stored in the drum memory 151 (step S404).

The processor 105 performs the processing in steps S401 to S404 for each of the four photosensitive drums 11.

The charging time of the photosensitive drum 11 stored in the drum memory 151 may be updated periodically in this manner. This eliminates the management of the charging time information about the photosensitive drums 11 in the body memory 106 of the image forming apparatus 100. When different drum cartridges 1 are exchanged and used in different image forming apparatuses 100, the charging time of each photosensitive drum 11 is appropriately managed for each of the drum cartridges 1. The charging time of the photosensitive drum 11 stored in the drum memory 151 can be used to appropriately determine the service life of the photosensitive drum 11.

Figure 13:
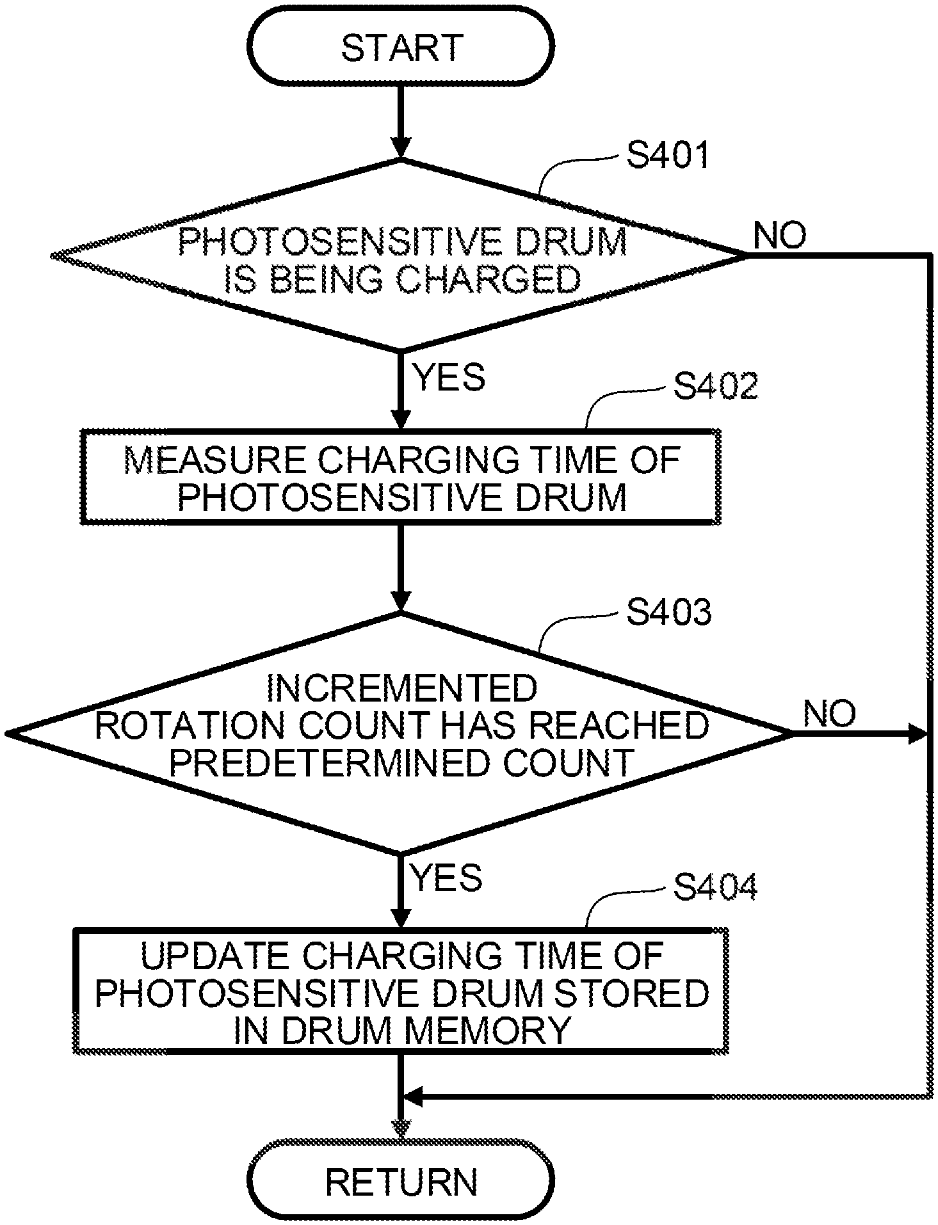
FIG. 13 is a flowchart showing the processing for updating the charging time for the photosensitive drums.

In the example shown in FIG. 13, the charging time of the photosensitive drum 11 stored in the drum memory 151 is updated at fixed intervals of time, instead of being updated continuously. This reduces the processing load on the processor 105, and thus reduces delay in the print process.

1-10. Processing at Error Occurrence

Figure 14:
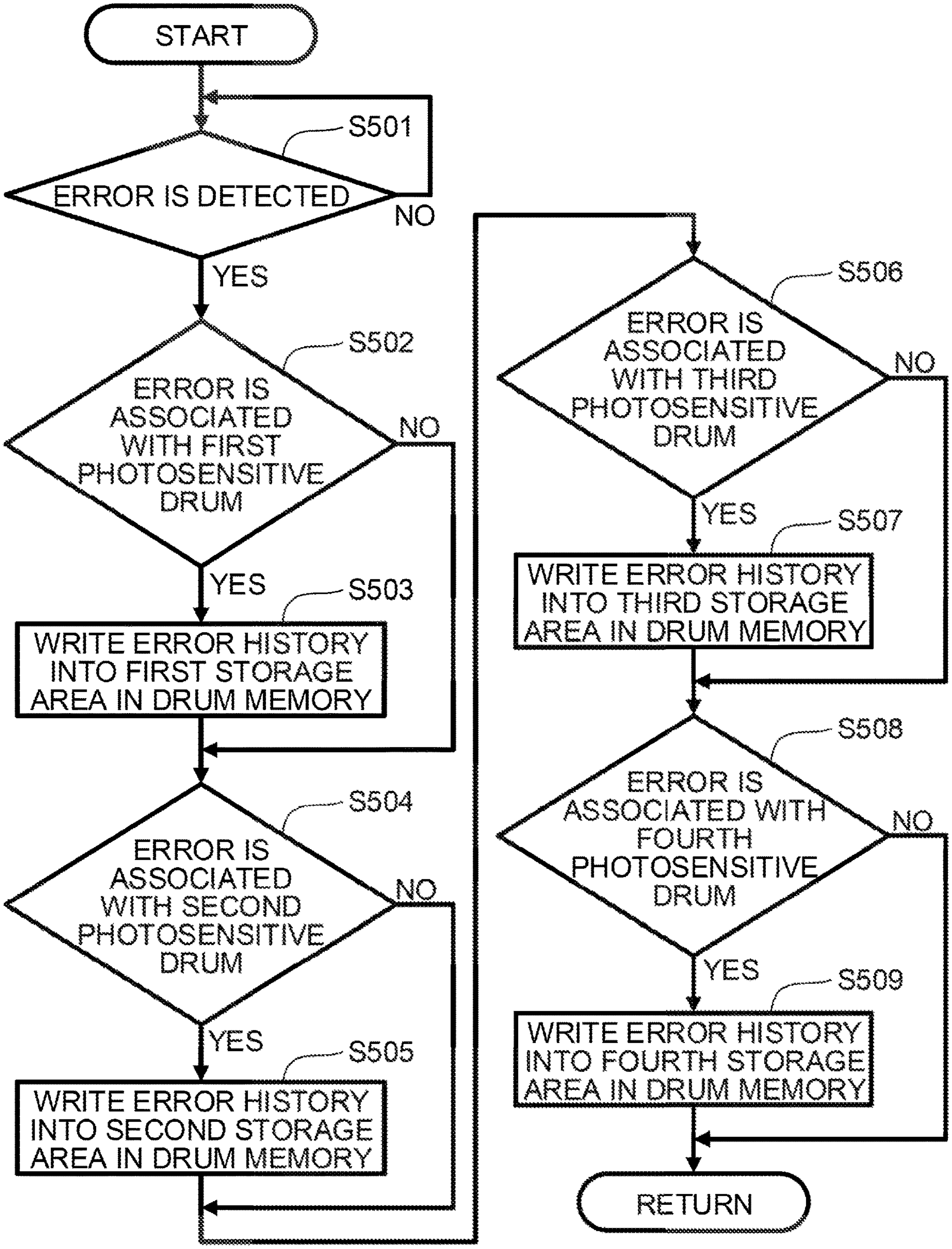
FIG. 14 is a flowchart showing the processing for writing an error history into the drum memory.

As described above, the drum memory 151 is configured to store the error history. The error history is written into the drum memory 151 when an error is detected in the drum cartridge 1. The processing for writing the error history into the drum memory 151 will now be described with reference to the flowchart in FIG. 14.

In the exampled below, the four photosensitive drums 11 in the drum cartridge 1 are referred to as a first photosensitive drum 11A, a second photosensitive drum 11B, a third photosensitive drum 11C, and a fourth photosensitive drum 11D.

In this print process, the processor 105 in the controller 102 continuously checks for an error (step S501). An error is detected by a sensor in the body casing 101 of the image forming apparatus 100. When no error is detected (no in step S501), the processor 105 continues to check for an error.

When an error is detected (yes in step S501), the processor 105 first determines whether the error is associated with the first photosensitive drum 11A (step S502). This determination is based on, for example, whether the sensor that has detected the error is associated with the first photosensitive drum 11A. When the error is associated with the first photosensitive drum 11A (yes in step S502), the processor 105 writes the error history into the first storage area in the drum memory 151 (step S503). The error history includes, for example, at least one of the error occurrence time and the error type.

When the error is not associated with the first photosensitive drum 11A (no in step S502), the processor 105 determines whether the error is associated with the second photosensitive drum 11B (step S504). This determination is based on, for example, whether the sensor that has detected the error is provided for the second photosensitive drum 11B. When the error is associated with the second photosensitive drum 11B (yes in step S504), the processor 105 writes the error history into the second storage area in the drum memory 151 different from the first storage area (step S505). The error history includes, for example, at least one of the error occurrence time and the error type.

When the error is not associated with the second photosensitive drum 11B (no in step S504), the processor 105 determines whether the error is associated with the third photosensitive drum 11C (step S506). This determination is based on, for example, whether the sensor that has detected the error is provided for the third photosensitive drum 11C. When the error is associated with the third photosensitive drum 11C (yes in step S506), the processor 105 writes the error history into a third storage in the drum memory 151 different from the first storage area and the second storage area (step S507). The error history includes, for example, at least one of the error occurrence time and the error type.

When the error is not associated with the third photosensitive drum 11C (no in step S506), the processor 105 determines whether the error is associated with the fourth photosensitive drum 11D (step S508). This determination is based on, for example, whether the sensor that has detected the error is provided for the fourth photosensitive drum 11D. When the error is associated with the fourth photosensitive drum 11D (yes in step S508), the processor 105 writes the error history into fourth storage in the drum memory 151 different from the first storage area to the third storage (step S509). The error history includes, for example, at least one of the error occurrence time and the error type.

2. Second Embodiment

Figure 15:
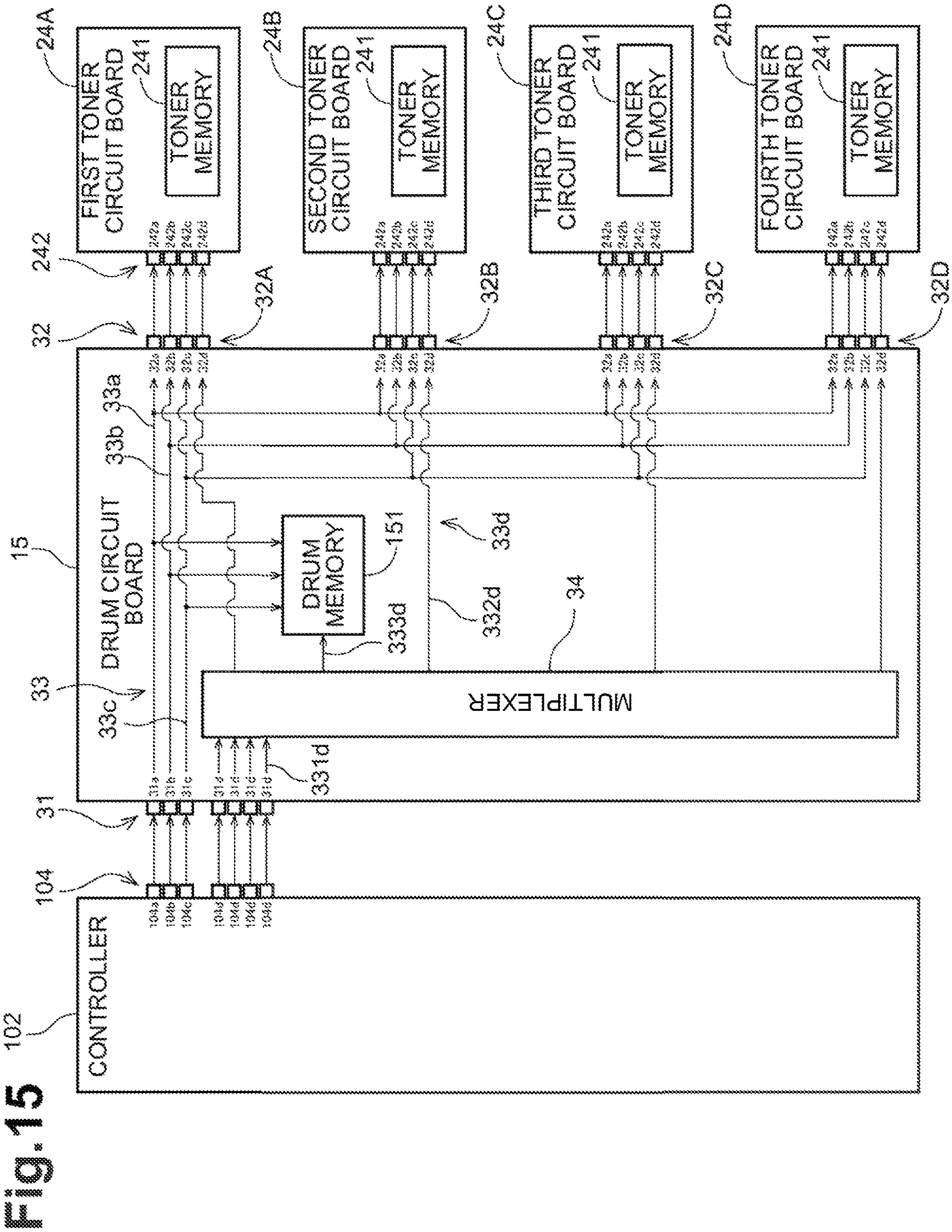
FIG. 15 is a block diagram showing electrical connection between a controller, a drum circuit board, and toner circuit boards according to a second embodiment.

FIG. 15 is a block diagram showing electrical connection between a controller 102, a drum circuit board 15, and four toner circuit boards 24 according to a second embodiment. In the example shown in FIG. 15, the drum cartridge 1 includes the drum circuit board 15, a drum memory 151, and a multiplexer 34. The drum circuit board 15 includes body terminals 31, toner terminals 32, and relay lines 33. The drum memory 151 and the multiplexer 34 are located at the drum circuit board 15. The drum memory 151 and the multiplexer 34 may not be located at the drum circuit board 15. The drum memory 151 may specifically be located at the surface of the frame 12.

2-1. Body Terminal

The body terminals 31 are electrically connected to terminals 104 on the controller 102 through the first electric terminal unit 13 described above in the image forming apparatus 100 having the drum cartridge 1 attached to the body casing 101. This electrically connects the drum circuit board 15 and the controller 102. As shown in FIG. 15, the drum circuit board 15 in the present embodiment includes a plurality of, or specifically seven body terminals 31. More specifically, the body terminals 31 include a single body voltage terminal 31*a*, a single body grounding terminal 31*b*, a single body clock terminal 31*c*, and four body signal terminals 31*d*.

When the drum cartridge 1 is attached to the body casing 101 of the image forming apparatus 100, the body voltage terminal 31*a* is electrically connected to a voltage terminal 104*a* of terminals 104 on the controller 102, providing a power supply voltage from the controller 102 to the drum circuit board 15.

When the drum cartridge 1 is attached to the body casing 101 of the image forming apparatus 100, the body grounding terminal 31*b* is electrically connected to a grounding terminal 104*b* of the terminals 104 on the controller 102, providing a grounding voltage from the controller 102 to the drum circuit board 15.

When the drum cartridge 1 is attached to the body casing 101 of the image forming apparatus 100, the body clock terminal 31*c* is electrically connected to a clock terminal 104*c* of the terminals 104 on the controller 102, providing a clock signal from the controller 102 to the drum circuit board 15 at fixed time intervals.

When the drum cartridge 1 is attached to the body casing 101 of the image forming apparatus 100, the body signal terminals 31*d* are electrically connected to signal terminals 104*d* of the terminals 104 on the controller 102, allowing exchange of signals carrying various sets of information between the controller 102 and the drum circuit board 15.

2-2. Toner Terminal

When the toner cartridges 2 are attached to the frame 12 of the drum cartridge 1, the toner terminals 32 are electrically connected to the toner circuit boards 24 in the toner cartridges 2 through the second electric terminal units 14 described above. This electrically connects the drum circuit board 15 and the toner circuit boards 24. As shown in FIG. 15, the drum circuit board 15 in the present embodiment includes a plurality of, or specifically sixteen toner terminals 32.

The toner terminals 32 include a first group 32A of four toner terminals 32, a second group 32B of four toner terminals 32, a third group 32C of four toner terminals 32, and a fourth group 32D of four toner terminals 32.

When the first toner cartridge 2A is attached to the frame 12 of the drum cartridge 1, the toner terminals 32 of the first group 32A are electrically connected to the first toner circuit board 24A. When the second toner cartridge 2B is attached to the frame 12 of the drum cartridge 1, the toner terminals 32 of the second group 32B are electrically connected to the second toner circuit board 24B. When the third toner cartridge 2C is attached to the frame 12 of the drum cartridge 1, the toner terminals 32 of the third group 32C are electrically connected to the third toner circuit board 24C. When the fourth toner cartridge 2D is attached to the frame 12 of the drum cartridge 1, the toner terminals 32 of the fourth group 32D are electrically connected to the fourth toner circuit board 24D.

The toner terminals 32 in each group include a toner voltage terminal 32*a*, a toner grounding terminal 32*b*, a toner clock terminal 32*c*, and a toner signal terminal 32*d*.

The toner voltage terminals 32*a* are electrically connected to the body voltage terminal 31*a* through a voltage relay line 33*a* (described later). When the toner cartridges 2 are attached to the frame 12 of the drum cartridge 1, the toner voltage terminals 32*a* are electrically connected to voltage terminals 242*a* of the terminals 242 of the toner circuit boards 24, providing a power supply voltage from the controller 102 to the toner circuit boards 24 through the drum circuit board 15.

The toner grounding terminals 32*b* are electrically connected to the body grounding terminal 31*b* through a grounding relay line 33*b* (described later). When the toner cartridges 2 are attached to the frame 12 of the drum cartridge 1, the toner grounding terminals 32*b* are electrically connected to grounding terminals 242*b* of the terminals 242 of the toner circuit boards 24, providing a grounding voltage from the controller 102 to the toner circuit boards 24 through the drum circuit board 15.

The toner clock terminals 32*c* are electrically connected to the body clock terminal 31*c* through a clock relay line 33*c* (described later). When the toner cartridges 2 are attached to the frame 12 of the drum cartridge 1, the toner clock terminals 32*c* are electrically connected to clock terminals 242*c* of the terminals 242 on the toner circuit boards 24, providing a clock signal from the controller 102 to the toner circuit boards 24 through the drum circuit board 15 at fixed time intervals.

The toner signal terminals 32*d* are electrically connected to the multiplexer 34 through signal relay lines 33*d* (described later). When the toner cartridges 2 is attached to the frame 12 of the drum cartridge 1, the toner signal terminals 32*d* are electrically connected to signal terminals 242*d* of the terminals 242 on the toner circuit boards 24.

2-3. Relay Line

As shown in FIG. 15, the relay lines 33 in the present embodiment include the voltage relay line 33*a*, the grounding relay line 33*b*, the clock relay line 33*c*, and the signal relay lines 33*d*. More specifically, the relay lines 33 include a single voltage relay line 33*a*, a single grounding relay line 33*b*, a single clock relay line 33*c*, and a plurality of signal relay lines 33*d*.

The voltage relay line 33*a* has one end electrically connected to the body voltage terminal 31*a*, and the other end split in five ends. More specifically, the voltage relay line 33*a* has the other ends including a first end, a second end, a third end, a fourth end, and a fifth end. The first end of the voltage relay line 33*a* is electrically connected to the toner voltage terminal 32*a* of the first group 32A. The second end is electrically connected to the toner voltage terminal 32*a* of the second group 32B. The third end is electrically connected to the toner voltage terminal 32*a* of the third group 32C. The fourth end is electrically connected to the toner voltage terminal 32*a* of the fourth group 32D. The fifth end is electrically connected to the drum memory 151. Thus, the drum circuit board 15 provides the power supply voltage received through the body voltage terminal 31*a* to the four toner voltage terminals 32*a* and the drum memory 151. The common body voltage terminal 31*a* reduces the number of body terminals 31.

The grounding relay line 33*b* has one end electrically connected to the body grounding terminal 31*b*, and the other end split in five ends. More specifically, the grounding relay line 33*b* has the other ends including a first end, a second end, a third end, a fourth end, and a fifth end. The first end of the grounding relay line 33*b* is electrically connected to the toner grounding terminal 32*b* of the first group 32A. The second end is electrically connected to the toner grounding terminal 32*b* of the second group 32B. The third end is electrically connected to the toner grounding terminal 32*b* of the third group 32C. The fourth end is electrically connected to the toner grounding terminal 32*b* of the fourth group 32D. The fifth end is electrically connected to the drum memory 151. Thus, the drum circuit board 15 provides the grounding voltage received through the body grounding terminal 31*b* to the four toner grounding terminals 32*b* and the drum memory 151. The common body grounding terminal 31*b* reduces the number of body terminals 31.

The clock relay line 33*c* has one end electrically connected to the body clock terminal 31*c*, and the other end split in five ends. More specifically, the clock relay line 33*c* has the other ends including a first end, a second end, a third end, a fourth end, and a fifth end. The first end of the clock relay line 33*c* is electrically connected to the toner clock terminal 32*c* of the first group 32A. The second end is electrically connected to the toner clock terminal 32*c* of the second group 32B. The third end is electrically connected to the toner clock terminal 32*c* of the third group 32C. The fourth end is electrically connected to the toner clock terminal 32*c* of the fourth group 32D. The fifth end is electrically connected to the drum memory 151. Thus, the drum circuit board 15 provides the clock signals received through the body clock terminal 31*c* to the four toner clock terminals 32*c* and the drum memory 151. The common body clock terminal 31*c* reduces the number of body terminals 31.

The signal relay lines 33*d* include body signal relay lines 331*d*, toner signal relay lines 332*d*, and a drum signal line 333*d*. The signal relay lines 33*d* in the present embodiment include a plurality of, or specifically four body signal relay lines 331*d*, a plurality of, or specifically four toner signal relay lines 332*d*, and a single drum signal line 333*d*. The body signal relay lines 331*d* each electrically connect the body signal terminals 31*d* to the multiplexer 34. The toner signal relay lines 332*d* each electrically connect the multiplexer 34 to the corresponding toner signal terminals 32*d*. The drum signal line 333*d* electrically connects the multiplexer 34 to the drum memory 151.

2-4. Multiplexer

The multiplexer 34 is a switch circuit for switching between signal lines. The body signal terminals 31*d* include body address signal terminals and a body data signal terminal. In the present embodiment, the body terminals 31 include four body signal terminals 31*d*. More specifically, the body signal terminals 31*d* include three body address signal terminals and a single body data signal terminal.

The multiplexer 34 receives an address signal from the controller 102 through the body address signal terminals. The address signal specifies the communication destination. The multiplexer 34 selects the communication to the drum memory 151 or to the communication to a toner signal terminal 32*d* in accordance with the address signal received through the body address signal terminals.

The multiplexer 34 also receives a data signal from the controller 102 through the body data signal terminal. The data signal represents various sets of information to be transmitted to the communication destination. The multiplexer 34 outputs the data signal received through the body data signal terminal to the drum memory 151 or to a toner signal terminal 32*d*.

In this manner, the multiplexer 34 selects the drum memory 151 or a toner memory 241 as a communication destination from the drum memory 151 and the four toner memories 241, and outputs a data signal to the communication destination. This structure eliminates the need to prepare body signal terminals 31*d* separately for the drum memory 151 and for the toner signal terminals 32*d*, and thus reduces the number of body signal terminals 31*d*. The controller 102 may also have fewer signal terminals 104*d*.

More specifically, although the body terminals 31 in the first embodiment shown in FIG. 6 include the five body signal terminals 31*d*, the body terminals 31 in the present embodiment shown in FIG. 15 include the four body signal terminals 31*d*. Although the controller 102 in the first embodiment shown in FIG. 6 includes the five signal terminals 104*d*, the controller 102 in the present embodiment shown in FIG. 15 includes the four signal terminals 104*d*.

2-5. Information Relay Through Drum Circuit Board

The drum circuit board 15 in the present embodiment also interfaces between the controller 102 and the toner circuit boards 24. The drum circuit board 15 thus has fewer terminals than when the drum circuit board 15 and the toner circuit boards 24 are directly connected to the controller 102. As shown in FIG. 15, for example, the single body voltage terminal 31*a* can provide the power supply voltage to the drum memory 151 in the drum circuit board 15 and the toner memories 241 in the toner circuit boards 24. As shown in FIG. 15, the single body grounding terminal 31*b* can provide the grounding voltage to the drum memory 151 of the drum circuit board 15 and the toner memories 241 of the toner circuit boards 24. As shown in FIG. 15, the single body clock terminal 31*c* can provide the clock signal to the drum memory 151 of the drum circuit board 15 and the toner memories 241 of the toner circuit boards 24. The controller 102 thus has fewer terminals 104.

In particular, when a plurality of toner circuit boards 24 are used as in the present embodiment, the drum circuit board 15 that interfaces between the controller 102 and the toner circuit boards 24 can have fewer terminals. As shown in FIG. 15, for example, the single body voltage terminal 31*a* can provide the power supply voltage to the four toner circuit boards 24. As shown in FIG. 15, the single body grounding terminal 31*b* can provide the grounding voltage to the four toner circuit boards 24. As shown in FIG. 15, the single body clock terminal 31*c* can provide the clock signal to the four toner circuit boards 24. The controller 102 thus has still fewer terminals 104.

3. Third Embodiment

Figure 16:
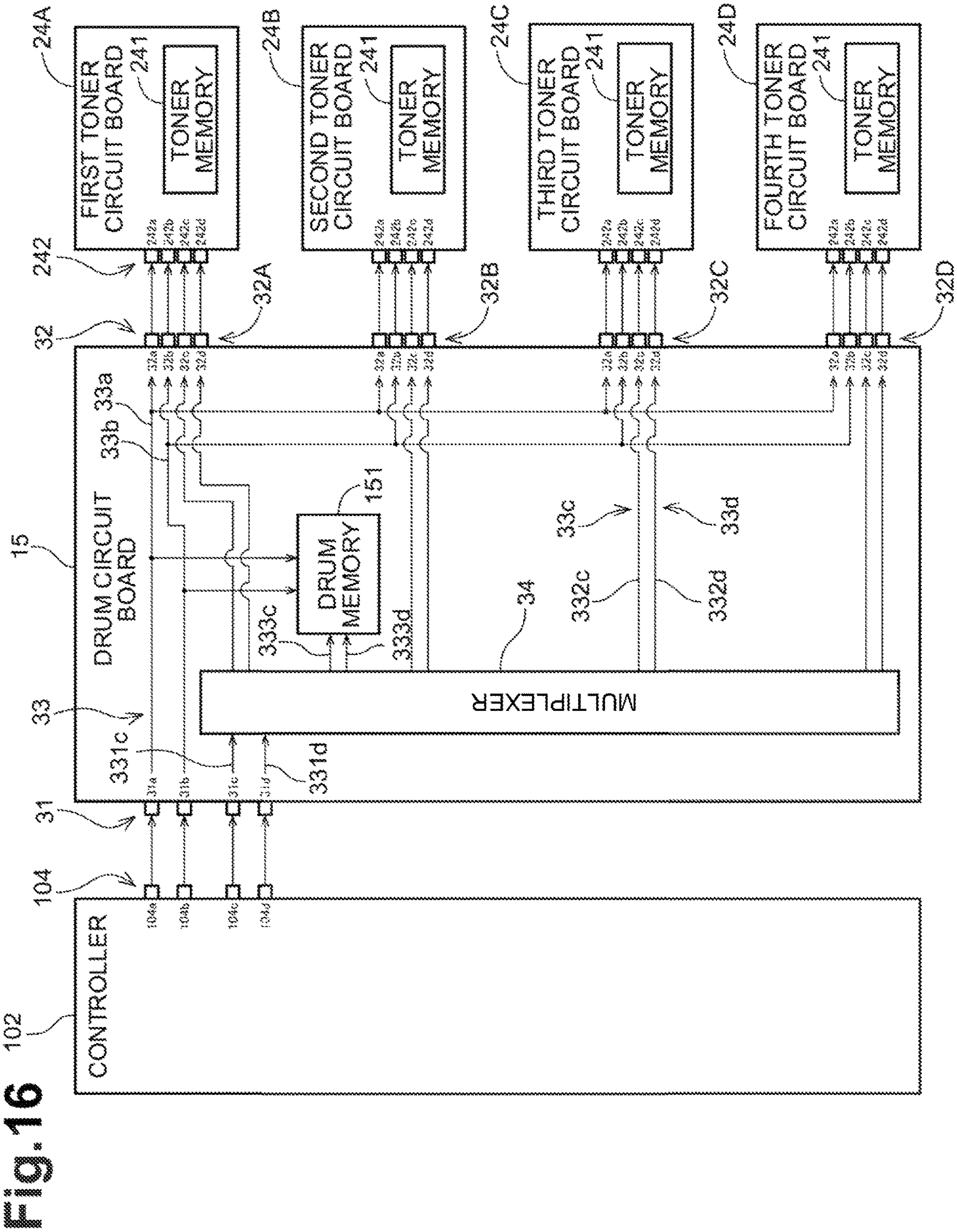
FIG. 16 is a block diagram showing electrical connection between a controller, a drum circuit board, and toner circuit boards according to a third embodiment.

FIG. 16 is a block diagram showing electrical connection between a controller 102, a drum circuit board 15, and four toner circuit boards 24 according to a third embodiment. In the example shown in FIG. 16, the drum cartridge 1 includes the drum circuit board 15, a drum memory 151, and a multiplexer 34. The drum circuit board 15 includes body terminals 31, toner terminals 32, and relay lines 33. The drum memory 151 and the multiplexer 34 are located at the drum circuit board 15. The drum memory 151 and the multiplexer 34 may not be located at the drum circuit board 15. The drum memory 151 may specifically be located at the surface of the frame 12.

3-1. Body Terminal

The body terminals 31 are electrically connected to terminals 104 on the controller 102 through the first electric terminal unit 13 described above in the image forming apparatus 100 having the drum cartridge 1 attached to the body casing 101. This electrically connects the drum circuit board 15 and the controller 102. As shown in FIG. 16, the drum circuit board 15 in the present embodiment includes a plurality of, or specifically four body terminals 31. More specifically, the body terminals 31 include a single body voltage terminal 31*a*, a single body grounding terminal 31*b*, a single body clock terminal 31*c*, and a single body signal terminal 31*d*.

When the drum cartridge 1 is attached to the body casing 101 of the image forming apparatus 100, the body voltage terminal 31*a* is electrically connected to a voltage terminal 104*a* of the terminals 104 of the controller 102, providing a power supply voltage from the controller 102 to the drum circuit board 15.

When the drum cartridge 1 is attached to the body casing 101 of the image forming apparatus 100, the body grounding terminal 31*b* is electrically connected to a grounding terminal 104*b* of the terminals 104 of the controller 102, providing a grounding voltage from the controller 102 to the drum circuit board 15.

When the drum cartridge 1 is attached to the body casing 101 of the image forming apparatus 100, the body clock terminal 31*c* is electrically connected to a clock terminal 104*c* of the terminals 104 on the controller 102, providing a clock signal from the controller 102 to the drum circuit board 15 at fixed time intervals.

When the drum cartridge 1 is attached to the body casing 101 of the image forming apparatus 100, the body signal terminal 31*d* is electrically connected to a signal terminal 104*d* of the terminals 104 of the controller 102, allowing exchange of signals carrying various sets of information between the controller 102 and the drum circuit board 15.

3-2. Toner Terminal

When the toner cartridges 2 is attached to the frame 12 of the drum cartridge 1, the toner terminals 32 are electrically connected to the toner circuit boards 24 of the toner cartridges 2 through the second electric terminal units 14 described above. This electrically connects the drum circuit board 15 and the toner circuit boards 24. As shown in FIG. 16, the drum circuit board 15 in the present embodiment includes a plurality of, or specifically sixteen toner terminals 32.

The toner terminals 32 include a first group 32A of four toner terminals 32, a second group 32B of four toner terminals 32, a third group 32C of four toner terminals 32, and a fourth group 32D of four toner terminals 32.

When the first toner cartridge 2A is attached to the frame 12 of the drum cartridge 1, the toner terminals 32 of the first group 32A are electrically connected to the first toner circuit board 24A. When the second toner cartridge 2B is attached to the frame 12 of the drum cartridge 1, the toner terminals 32 of the second group 32B are electrically connected to the second toner circuit board 24B. When the third toner cartridge 2C is attached to the frame 12 of the drum cartridge 1, the toner terminals 32 of the third group 32C are electrically connected to the third toner circuit board 24C. When the fourth toner cartridge 2D is attached to the frame 12 of the drum cartridge 1, the toner terminals 32 of the fourth group 32D are electrically connected to the fourth toner circuit board 24D.

The toner terminals 32 in each group include a toner voltage terminal 32*a*, a toner grounding terminal 32*b*, a toner clock terminal 32*c*, and a toner signal terminal 32*d*.

The toner voltage terminals 32*a* are electrically connected to the body voltage terminal 31*a* through a voltage relay line 33*a* (described later). When the toner cartridges 2 is attached to the frame 12 of the drum cartridge 1, the toner voltage terminals 32*a* are electrically connected to voltage terminals 242*a* of the terminals 242 on the toner circuit boards 24, providing a power supply voltage from the controller 102 to the toner circuit boards 24 through the drum circuit board 15.

The toner grounding terminals 32*b* are electrically connected to the body grounding terminal 31*b* through a grounding relay line 33*b* (described later). When the toner cartridges 2 is attached to the frame 12 of the drum cartridge 1, the toner grounding terminals 32*b* are electrically connected to grounding terminals 242*b* included of the terminals 242 of the toner circuit boards 24, providing a grounding voltage from the controller 102 to the toner circuit boards 24 through the drum circuit board 15.

The toner clock terminals 32*c* are electrically connected to the multiplexer 34 through clock relay lines 33*c* (described later). When the toner cartridges 2 are attached to the frame 12 of the drum cartridge 1, the toner clock terminals 32*c* are electrically connected to clock terminals 242*c* of the terminals 242 of the toner circuit boards 24.

The toner signal terminals 32*d* are electrically connected to the multiplexer 34 through signal relay lines 33*d* (described later). When the toner cartridges 2 are attached to the frame 12 of the drum cartridge 1, the toner signal terminals 32*d* are electrically connected to signal terminals 242*d* of the terminals 242 of the toner circuit boards 24.

3-3. Relay Line

As shown in FIG. 16, the relay lines 33 in the present embodiment include the voltage relay line 33*a*, the grounding relay line 33*b*, the clock relay lines 33*c*, and the signal relay lines 33*d*.

The voltage relay line 33*a* has one end electrically connected to the body voltage terminal 31*a*, and the other end split in five ends. More specifically, the voltage relay line 33*a* has the other ends including a first end, a second end, a third end, a fourth end, and a fifth end. The first end of the voltage relay line 33*a* is electrically connected to the toner voltage terminal 32*a* of the first group 32A. The second end is electrically connected to the toner voltage terminal 32*a* of the second group 32B. The third end is electrically connected to the toner voltage terminal 32*a* of the third group 32C. The fourth end is electrically connected to the toner voltage terminal 32*a* of the fourth group 32D. The fifth end is electrically connected to the drum memory 151. Thus, the drum circuit board 15 provides the power supply voltage received through the body voltage terminal 31*a* to the four toner voltage terminals 32*a* and the drum memory 151. The common body voltage terminal 31*a* reduces the number of body terminals 31.

The grounding relay line 33*b* has one end electrically connected to the body grounding terminal 31*b*, and the other end split in five ends. More specifically, the grounding relay line 33*b* has the other ends including a first end, a second end, a third end, a fourth end, and a fifth end. The first end of the grounding relay line 33*b* is electrically connected to the toner grounding terminal 32*b* of the first group 32A. The second end is electrically connected to the toner grounding terminal 32*b* of the second group 32B. The third end is electrically connected to the toner grounding terminal 32*b* of the third group 32C. The fourth end is electrically connected to the toner grounding terminal 32*b* of the fourth group 32D. The fifth end is electrically connected to the drum memory 151. Thus, the drum circuit board 15 provides the grounding voltage received through the body grounding terminal 31*b* to the four toner grounding terminals 32*b* and the drum memory 151. The common body grounding terminal 31*b* reduces the number of body terminals 31.

The clock relay lines 33*c* include a body clock relay line 331*c*, toner clock relay lines 332*c*, and a drum clock line 333*c*. The clock relay lines 33*c* in the present embodiment include a single body clock relay line 331*c*, a plurality of, or specifically four toner clock relay lines 332*c*, and a single drum clock line 333*c*. The body clock relay line 331*c* electrically connects the body clock terminal 31*c* to the multiplexer 34. The toner clock relay lines 332*c* each electrically connect the multiplexer 34 to the corresponding toner clock terminals 32*c*. The drum clock line 333*c* electrically connects the multiplexer 34 to the drum memory 151.

The signal relay lines 33*d* include a body signal relay line 331*d*, toner signal relay lines 332*d*, and a drum signal line 333*d*. The signal relay lines 33*d* in the present embodiment include a single body signal relay line 331*d*, a plurality of, or specifically four toner signal relay lines 332*d*, and a single drum signal line 333*d*. The body signal relay line 331*d* electrically connects the body signal terminals 31*d* to the multiplexer 34. The toner signal relay lines 332*d* each electrically connect the multiplexer 34 to the corresponding toner signal terminals 32*d*. The drum signal line 333*d* electrically connects the multiplexer 34 to the drum memory 151.

3-4. Multiplexer

The multiplexer 34 is a switch circuit for switching between signal lines. The multiplexer 34 receives a clock signal from the controller 102 through the body clock terminal 31*c*. The multiplexer 34 provides the obtained clock signal to the toner circuit boards 24 and the drum memory 151 through the toner clock terminals 32*c*. In other words, the drum circuit board 15 provides the clock signals received through the body clock terminal 31*c* to the four toner clock terminals 32*c* and the drum memory 151. The common body clock terminal 31*c* reduces the number of body terminals 31.

The multiplexer 34 also receives an address signal and a data signal from the controller 102 through the body signal terminal 31*d*. The address signal specifies the communication destination. The data signal represents various sets of information to be transmitted to the communication destination. The multiplexer 34 selects the communication to the drum memory 151 or to the communication to a toner signal terminal 32*d* in accordance with the received address signal. The multiplexer 34 also outputs the received data signal to the drum memory 151 or to a toner signal terminal 32*d*.

In this manner, the multiplexer 34 selects the drum memory 151 or a toner memory 241 as a communication destination from the drum memory 151 and the four toner memories 241, and outputs a data signal to the communication destination. This structure eliminates the need to prepare body signal terminals 31*d* separately for the drum memory 151 and for the four toner signal terminals 32*d*, and thus reduces the number of body signal terminals 31*d*. The controller 102 may also have fewer signal terminals 104*d*.

In particular, the multiplexer 34 in the present embodiment receives an address signal and a data signal through the single body signal terminal 31*d*. This further reduces the number of body signal terminals 31*d*. The controller 102 may also have still fewer signal terminals 104*d*.

More specifically, although the body terminals 31 in the first embodiment shown in FIG. 6 include the five body signal terminals 31*d*, the body terminals 31 in the present embodiment shown in FIG. 16 include the single body signal terminal 31*d*. Although the controller 102 in the first embodiment shown in FIG. 6 includes the five signal terminals 104*d*, the controller 102 in the present embodiment shown in FIG. 16 includes the single signal terminal 104*d*.

3-5. Information Relay Through Drum Circuit Board

The drum circuit board 15 in the present embodiment also interfaces between the controller 102 and the toner circuit boards 24. The drum circuit board 15 thus has fewer terminals than when the drum circuit board 15 and the toner circuit boards 24 are directly connected to the controller 102. As shown in FIG. 16, for example, the single body voltage terminal 31*a* can provide the power supply voltage to the drum memory 151 of the drum circuit board 15 and the toner memories 241 of the toner circuit boards 24. As shown in FIG. 16, the single body grounding terminal 31*b* can provide the grounding voltage to the drum memory 151 of the drum circuit board 15 and the toner memories 241 of the toner circuit boards 24. As shown in FIG. 16, the single body clock terminal 31*c* can provide the clock signal to the drum memory 151 of the drum circuit board 15 and the toner memories 241 of the toner circuit boards 24. The controller 102 thus has fewer terminals 104.

In particular, when a plurality of toner circuit boards 24 are used as in the present embodiment, the drum circuit board 15 that interfaces between the controller 102 and the toner circuit boards 24 can have fewer terminals. As shown in FIG. 16, for example, the single body voltage terminal 31*a* can provide the power supply voltage to the four toner circuit boards 24. As shown in FIG. 16, the single body grounding terminal 31*b* can provide the grounding voltage to the four toner circuit boards 24. As shown in FIG. 16, the single body clock terminal 31*c* can provide the clock signal to the four toner circuit boards 24. The controller 102 thus has still fewer terminals 104.

4. Fourth Embodiment

Figure 17:
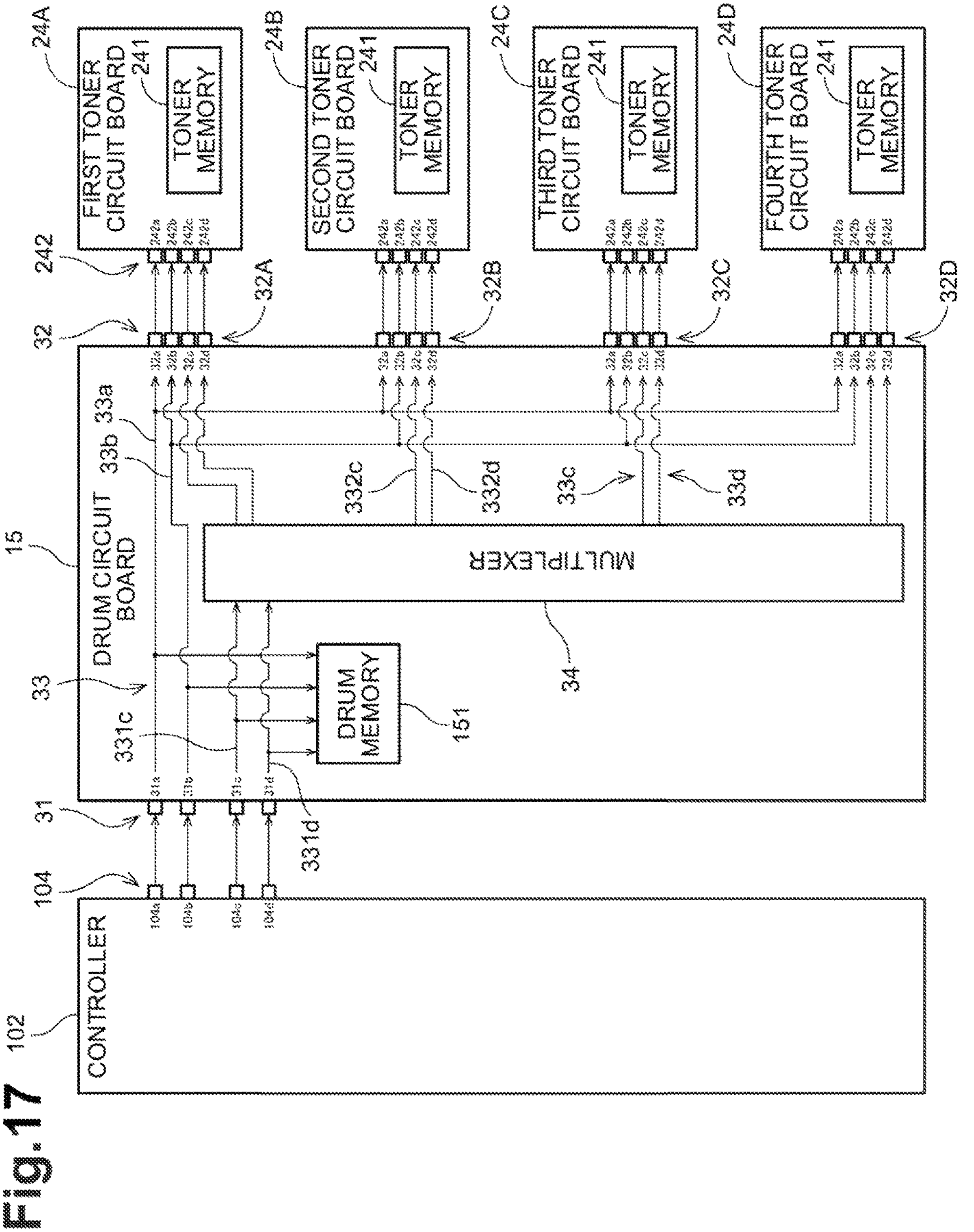
FIG. 17 is a block diagram showing electrical connection between a controller, a drum circuit board, and toner circuit boards according to a fourth embodiment.

FIG. 17 is a block diagram showing electrical connection between a controller 102, a drum circuit board 15, and four toner circuit boards 24 according to a fourth embodiment. In the example shown in FIG. 17, the drum cartridge 1 includes the drum circuit board 15, a drum memory 151, and a multiplexer 34. The drum circuit board 15 includes a plurality of body terminals 31, a plurality of toner terminals 32, and a plurality of relay lines 33. The drum memory 151 and the multiplexer 34 are located at the drum circuit board 15. The drum memory 151 may not be located at the drum circuit board 15. The drum memory 151 may specifically be located at the surface of the frame 12.

4-1. Body Terminal

The body terminals 31 are electrically connected to terminals 104 on the controller 102 through the first electric terminal unit 13 described above in the image forming apparatus 100 having the drum cartridge 1 attached to the body casing 101. This electrically connects the drum circuit board 15 and the controller 102. As shown in FIG. 17, the drum circuit board 15 in the present embodiment includes a plurality of, or specifically four body terminals 31. More specifically, the body terminals 31 include a single body voltage terminal 31*a*, a single body grounding terminal 31*b*, a single body clock terminal 31*c*, and a single body signal terminal 31*d*.

When the drum cartridge 1 is attached to the body casing 101 of the image forming apparatus 100, the body voltage terminal 31*a* is electrically connected to a voltage terminal 104*a* of the terminals 104 of the controller 102, providing a power supply voltage from the controller 102 to the drum circuit board 15.

When the drum cartridge 1 is attached to the body casing 101 of the image forming apparatus 100, the body grounding terminal 31*b* is electrically connected to a grounding terminal 104*b* of the terminals 104 of the controller 102, providing a grounding voltage from the controller 102 to the drum circuit board 15.

When the drum cartridge 1 is attached to the body casing 101 of the image forming apparatus 100, the body clock terminal 31*c* is electrically connected to a clock terminal 104*c* of the terminals 104 of the controller 102, providing a clock signal from the controller 102 to the drum circuit board 15 at fixed time intervals.

When the drum cartridge 1 is attached to the body casing 101 of the image forming apparatus 100, the body signal terminal 31*d* is electrically connected to a signal terminal 104*d* of the terminals 104 of the controller 102, allowing exchange of signals carrying various sets of information between the controller 102 and the drum circuit board 15.

4-2. Toner Terminal

When the four toner cartridges 2 are attached to the frame 12 of the drum cartridge 1, the toner terminals 32 are electrically connected to the toner circuit boards 24 of the toner cartridges 2 through the second electric terminal units 14 described above. This electrically connects the drum circuit board 15 and the toner circuit boards 24. As shown in FIG. 17, the drum circuit board 15 in the present embodiment includes a plurality of, or specifically sixteen toner terminals 32.

The toner terminals 32 include a first group 32A of four toner terminals 32, a second group 32B of four toner terminals 32, a third group 32C of four toner terminals 32, and a fourth group 32D of four toner terminals 32.

When the first toner cartridge 2A is attached to the frame 12 of the drum cartridge 1, the toner terminals 32 of the first group 32A are electrically connected to the first toner circuit board 24A. When the second toner cartridge 2B is attached to the frame 12 of the drum cartridge 1, the toner terminals 32 of the second group 32B are electrically connected to the second toner circuit board 24B. When the third toner cartridge 2C is attached to the frame 12 of the drum cartridge 1, the toner terminals 32 of the third group 32C are electrically connected to the third toner circuit board 24C. When the fourth toner cartridge 2D is attached to the frame 12 of the drum cartridge 1, the toner terminals 32 of the fourth group 32D are electrically connected to the fourth toner circuit board 24D.

The toner terminals 32 in each group include a toner voltage terminal 32*a*, a toner grounding terminal 32*b*, a toner clock terminal 32*c*, and a toner signal terminal 32*d*.

The toner voltage terminals 32*a* are electrically connected to the body voltage terminal 31*a* through a voltage relay line 33*a* (described later). When the toner cartridges 2 are attached to the frame 12 of the drum cartridge 1, the toner voltage terminals 32*a* are electrically connected to voltage terminals 242*a* of the terminals 242 of the toner circuit boards 24, providing a power supply voltage from the controller 102 to the toner circuit boards 24 through the drum circuit board 15.

The toner grounding terminals 32*b* are electrically connected to the body grounding terminal 31*b* through a grounding relay line 33*b* (described later). When the toner cartridges 2 are attached to the frame 12 of the drum cartridge 1, the toner grounding terminals 32*b* are electrically connected to grounding terminals 242*b* of the terminals 242 on the toner circuit boards 24, providing a grounding voltage from the controller 102 to the toner circuit boards 24 through the drum circuit board 15.

The toner clock terminals 32*c* are electrically connected to the multiplexer 34 through clock relay lines 33*c* (described later). When the toner cartridges 2 are attached to the frame 12 of the drum cartridge 1, the toner clock terminals 32*c* are electrically connected to clock terminals 242*c* of the terminals 242 of the toner circuit boards 24.

The toner signal terminals 32*d* are electrically connected to the multiplexer 34 through signal relay lines 33*d* (described later). When the toner cartridges 2 are attached to the frame 12 of the drum cartridge 1, the toner signal terminals 32*d* are electrically connected to signal terminals 242*d* of the terminals 242 on the toner circuit boards 24.

4-3. Relay Line

As shown in FIG. 17, the relay lines 33 in the present embodiment include the voltage relay line 33*a*, the grounding relay line 33*b*, the clock relay lines 33*c*, and the signal relay lines 33*d*. More specifically, the relay lines 33 include a single voltage relay line 33*a*, a single grounding relay line 33*b*, a plurality of clock relay lines 33*c*, and a plurality of signal relay lines 33*d*.

The voltage relay line 33*a* has one end electrically connected to the body voltage terminal 31*a*, and the other end split in five ends. More specifically, the voltage relay line 33*a* has the other ends including a first end, a second end, a third end, a fourth end, and a fifth end. The first end of the voltage relay line 33*a* is electrically connected to the toner voltage terminal 32*a* of the first group 32A. The second end is electrically connected to the toner voltage terminal 32*a* of the second group 32B. The third end is electrically connected to the toner voltage terminal 32*a* of the third group 32C. The fourth end is electrically connected to the toner voltage terminal 32*a* of the fourth group 32D. The fifth end is electrically connected to the drum memory 151. Thus, the drum circuit board 15 provides the power supply voltage received through the body voltage terminal 31*a* to the four toner voltage terminals 32*a* and the drum memory 151. The common body voltage terminal 31*a* reduces the number of body terminals 31.

The grounding relay line 33*b* has one end electrically connected to the body grounding terminal 31*b*, and the other end split in five ends. More specifically, the grounding relay line 33*b* has the other ends including a first end, a second end, a third end, a fourth end, and a fifth end. The first end of the grounding relay line 33*b* is electrically connected to the toner grounding terminal 32*b* of the first group 32A. The second end is electrically connected to the toner grounding terminal 32*b* of the second group 32B. The third end is electrically connected to the toner grounding terminal 32*b* of the third group 32C. The fourth end is electrically connected to the toner grounding terminal 32*b* of the fourth group 32D. The fifth end is electrically connected to the drum memory 151. Thus, the drum circuit board 15 provides the grounding voltage received through the body grounding terminal 31*b* to the four toner grounding terminals 32*b* and the drum memory 151. The common body grounding terminal 31*b* reduces the number of body terminals 31.

The clock relay lines 33*c* include a body clock relay line 331*c* and toner clock relay lines 332*c*. The clock relay lines 33*c* in the present embodiment include a single body clock relay line 331*c* and a plurality of, or specifically four toner clock relay lines 332*c*. The body clock relay line 331*c* has one end electrically connected to the body clock terminal 31*c*, and the other end split in two ends. More specifically, the body clock relay line 331*c* has the other ends including a first end and a second end. The first end of the body clock relay line 331*c* is electrically connected to the drum memory 151. The second end of the body clock relay line 331*c* is electrically connected to the multiplexer 34. The toner clock relay lines 332*c* each electrically connect the multiplexer 34 to the corresponding toner clock terminals 32*c*.

The signal relay lines 33*d* include a body signal relay line 331*d* and toner signal relay lines 332*d*. The signal relay lines 33*d* in the present embodiment include a single body signal relay line 331*d* and a plurality of, or specifically four toner signal relay lines 332*d*. The body signal relay line 331*d* has one end electrically connected to the body signal terminal 31*d*, and the other end split in two ends. More specifically, the body signal relay line 331*d* has the other ends including a first end and a second end. The first end of the body signal relay line 331*d* is electrically connected to the drum memory 151. The second end of the body signal relay line 331*d* is electrically connected to the multiplexer 34. The toner signal relay lines 332*d* each electrically connect the multiplexer 34 to the corresponding toner signal terminals 32*d*.

In other words, the drum memory 151 in the present embodiment is connected to the body clock terminal 31*c* without through the multiplexer 34. The drum memory 151 thus receives a clock signal input from the controller 102 through the body clock terminal 31*c* without through the multiplexer 34. The drum memory 151 in the present embodiment is also connected to the body signal terminal 31*d* without through the multiplexer 34. The drum memory 151 thus receives a data signal input from the controller 102 through the body signal terminal 31*d* without through the multiplexer 34.

4-4. Multiplexer

The multiplexer 34 is a switch circuit for switching between signal lines. The multiplexer 34 receives a clock signal from the controller 102 through the body clock terminal 31*c*. The multiplexer 34 provides the obtained clock signal to the toner circuit boards 24 through the toner clock terminals 32*c*. In other words, the drum circuit board 15 provides the clock signals received through the body clock terminal 31*c* to the four toner clock terminals 32*c* and the drum memory 151. The common body clock terminal 31*c* reduces the number of body terminals 31.

The multiplexer 34 also receives an address signal and a data signal from the controller 102 through the body signal terminal 31*d*. The address signal specifies the communication destination. The data signal represents various sets of information to be transmitted to the communication destination. The multiplexer 34 selects a toner signal terminal 32*d* as a communication destination from the four toner signal terminals 32*d* in accordance with the received address signal. The multiplexer 34 also outputs the received data signal to the toner signal terminal 32*d* selected as the communication destination.

In this manner, the multiplexer 34 selects a toner memory 241 as a communication destination from the four toner memories 241, and outputs a data signal to the communication destination. This structure eliminates the need to prepare body signal terminals 31*d* separately for the four toner signal terminals 32*d*, and thus reduces the number of body signal terminals 31*d*. The controller 102 may also have fewer signal terminals 104*d*.

In particular, the multiplexer 34 in the present embodiment receives an address signal and a data signal through the single body signal terminal 31*d*. This further reduces the number of body signal terminals 31*d*. The controller 102 may also have still fewer signal terminals 104*d*.

More specifically, although the body terminals 31 in the first embodiment shown in FIG. 6 include the five body signal terminals 31*d*, the body terminals 31 in the present embodiment shown in FIG. 17 include the single body signal terminal 31*d*. Although the controller 102 in the first embodiment shown in FIG. 6 includes the five signal terminals 104*d*, the controller 102 in the present embodiment shown in FIG. 17 includes the single signal terminal 104*d*.

4-5. Information Relay Through Drum Circuit Board

The drum circuit board 15 in the present embodiment also interfaces between the controller 102 and the toner circuit boards 24. The drum circuit board 15 thus has fewer terminals than when the drum circuit board 15 and the toner circuit boards 24 are directly connected to the controller 102. As shown in FIG. 17, for example, the single body voltage terminal 31*a* can provide the power supply voltage to the drum memory 151 of the drum circuit board 15 and the toner memories 241 of the toner circuit boards 24. As shown in FIG. 17, the single body grounding terminal 31*b* can provide the grounding voltage to the drum memory 151 of the drum circuit board 15 and the toner memories 241 of the toner circuit boards 24. As shown in FIG. 17, the single body clock terminal 31*c* can provide the clock signal to the drum memory 151 of the drum circuit board 15 and the toner memories 241 of the toner circuit boards 24. The controller 102 thus has fewer terminals 104.

In particular, when a plurality of toner circuit boards 24 are used as in the present embodiment, the drum circuit board 15 that interfaces between the controller 102 and the toner circuit boards 24 can have fewer terminals. As shown in FIG. 17, for example, the single body voltage terminal 31*a* can provide the power supply voltage to the four toner circuit boards 24. As shown in FIG. 17, the single body grounding terminal 31*b* can provide the grounding voltage to the four toner circuit boards 24. As shown in FIG. 17, the single body clock terminal 31*c* can provide the clock signal to the four toner circuit boards 24. The controller 102 thus has still fewer terminals 104.

4-6. Abnormality Isolation

When no response is provided from the drum memory 151 to the authentication information transmitted from the controller 102 to the drum memory 151 in the third embodiment described above (FIG. 16), it cannot be easily determined whether an abnormality is in the drum memory 151 or in the communication path including the multiplexer 34.

In the present embodiment, the drum memory 151 is connected to the body clock terminal 31*c* and the body signal terminal 31*d* without through the multiplexer 34. More specifically, the body clock relay line 331*c* electrically connects the body clock terminal 31*c* to the multiplexer 34, and also electrically connects the body clock terminal 31*c* to the drum memory 151. The body signal relay line 331*d* electrically connects the body signal terminal 31*d* to the multiplexer 34, and also electrically connects the body signal terminal 31*d* to the drum memory 151.

Figure 18:
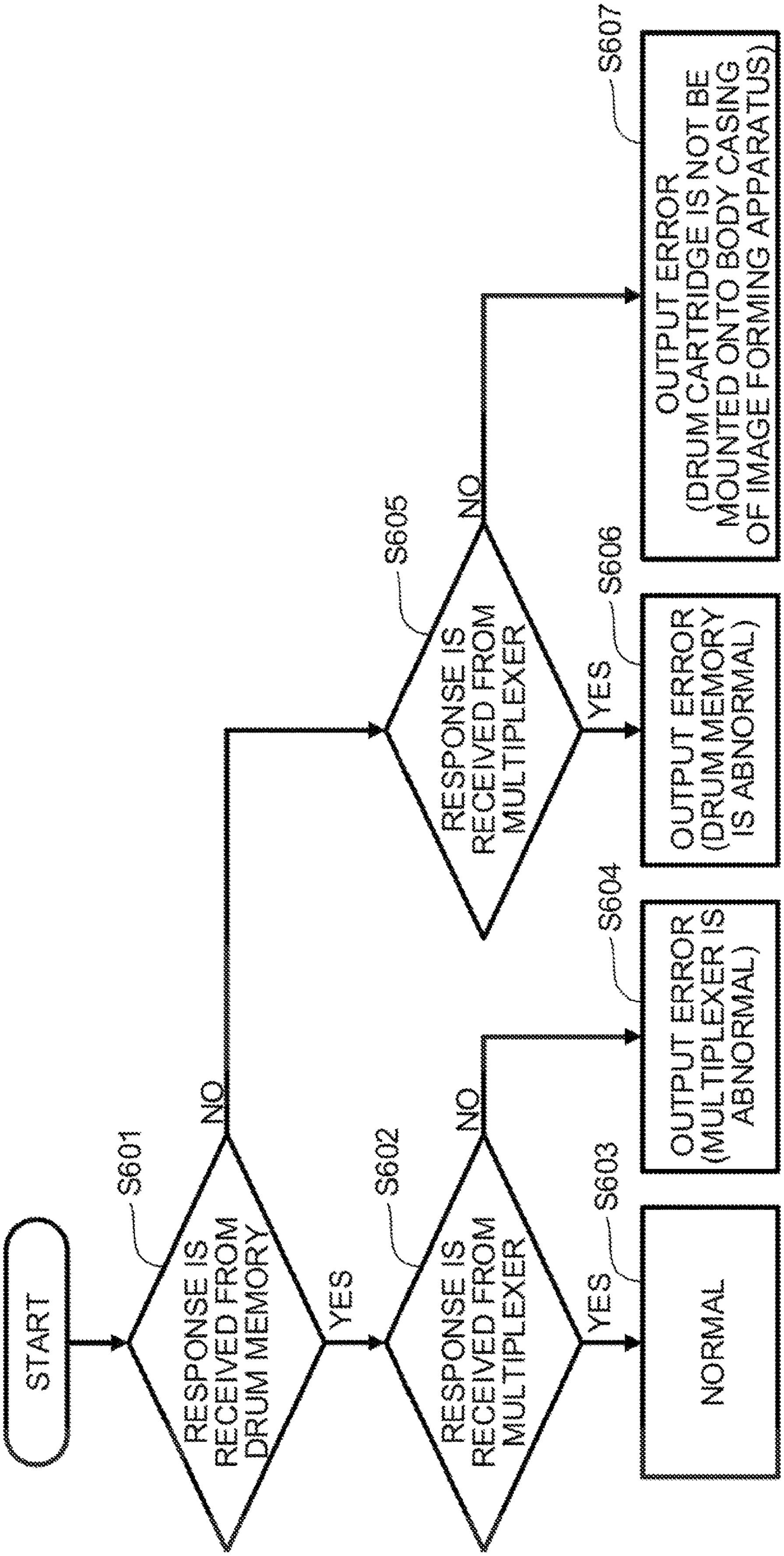
FIG. 18 is a flowchart showing an abnormality determination process in the fourth embodiment.

This structure allows easy determination of an abnormality after the authentication information is transmitted from the controller 102 to the drum memory 151. FIG. 18 is a flowchart showing the procedure of abnormality determination after the authentication information is transmitted from the controller 102 to the drum memory 151.

After the processor 105 in the controller 102 transmits the authentication information to the drum memory 151 in step S14 in FIG. 8 described above, the processor 105 determines whether a response is received from the drum memory 151 (step S601).

When a response is received from the drum memory 151 (yes in step S601), the processor 105 determines whether a response is received from the multiplexer 34 (step S602).

When a response is received from the multiplexer 34 (yes in step S602), both the drum memory 151 and the multiplexer 34 are normal (step S603). In this case, the processor 105 advances to the processing in step S17 and the subsequent steps in FIG. 8.

In step S602, when no response is received from the multiplexer 34 (no in step S602), the drum memory 151 is normal, and the multiplexer 34 is abnormal. In this case, the processor 105 outputs an error (step S604). More specifically, for example, the processor 105 reads a drum communication path error message stored in the body memory 106. The processor 105 displays the read drum communication path error message on the display 103.

In step S601, when no response is received from the drum memory 151 (no in step S601), the processor 105 determines whether a response is received from the multiplexer 34 (step S605).

When a response is received from the multiplexer 34 (yes in step S605), the drum memory 151 is abnormal, and the multiplexer 34 is normal. In this case, the processor 105 outputs an error (step S606). More specifically, for example, the processor 105 reads a drum memory error message stored in the body memory 106. The processor 105 displays the read drum memory error message on the display 103.

In step S605, when no response is received from the multiplexer 34 (no in step S605), both the drum memory 151 and the multiplexer 34 may be abnormal or any drum cartridge 1 may not be attached to the body casing 101 of the image forming apparatus 100. In this case, the processor 105 outputs an error (step S607). The drum memory 151 and the multiplexer 34 are less likely to have trouble at the same time, and thus the processor 105 in step S607, for example, reads a drum cartridge attaching error message stored in the body memory 106. The processor 105 displays the read drum cartridge attaching error message on the display 103.

5. Fifth Embodiment

Figure 19:
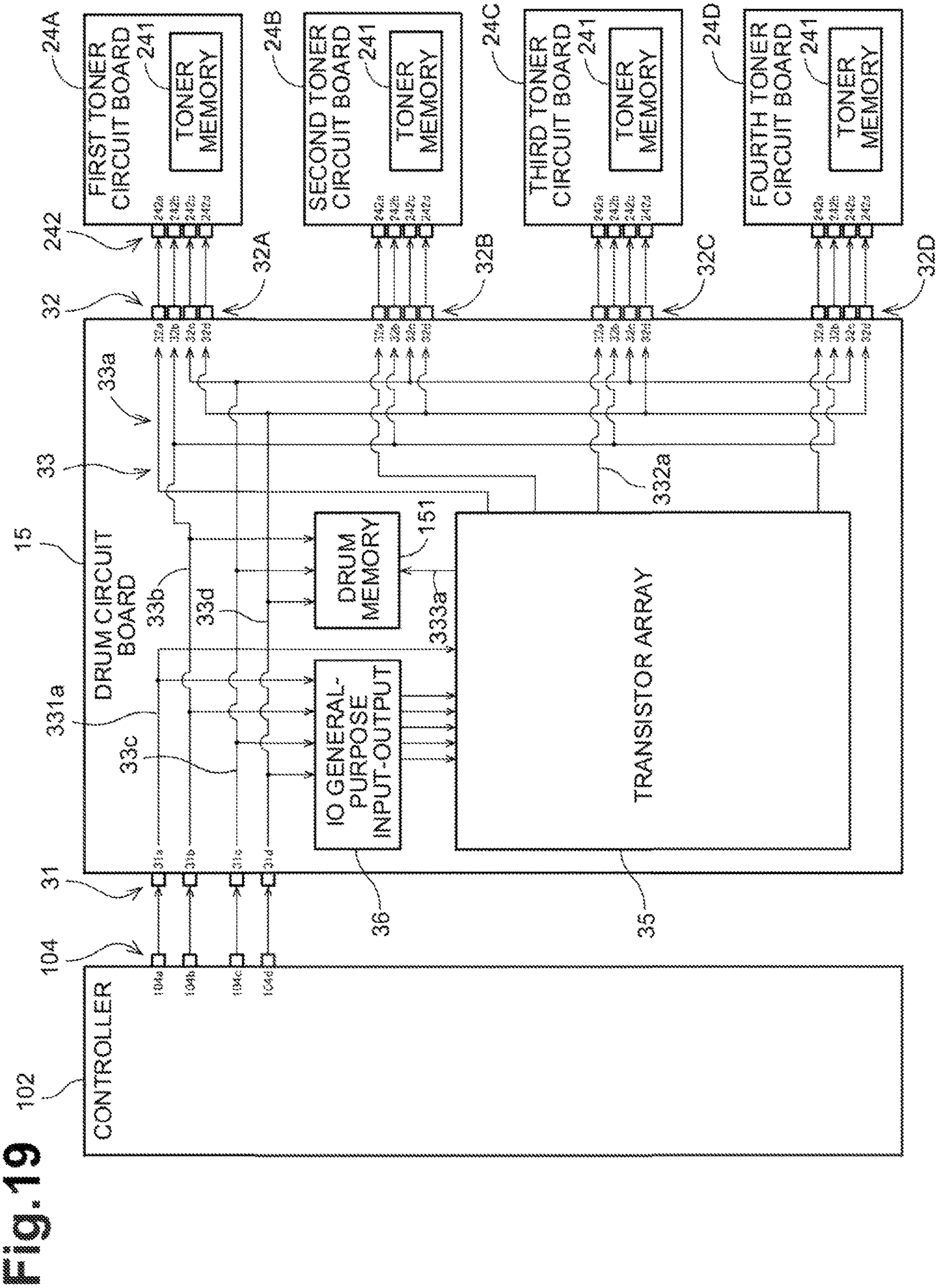
FIG. 19 is a block diagram showing electrical connection between a controller, a drum circuit board, and toner circuit boards according to a fifth embodiment.

FIG. 19 is a block diagram showing electrical connection between a controller 102, a drum circuit board 15, and four toner circuit boards 24 according to a fifth embodiment. In the example shown in FIG. 19, the drum cartridge 1 includes the drum circuit board 15, a drum memory 151, a transistor array 35, and a general-purpose input-output port 36. The drum circuit board 15 includes a plurality of body terminals 31, a plurality of toner terminals 32, and a plurality of relay lines 33. The drum memory 151, the transistor array 35, and the general-purpose input-output port 36 are located at the drum circuit board 15. The drum memory 151 may not be located at the drum circuit board 15. The drum memory 151 may specifically be located at the surface of the frame 12.

5-1. Body Terminal

The body terminals 31 are electrically connected to terminals 104 on the controller 102 through the first electric terminal unit 13 described above in the image forming apparatus 100 having the drum cartridge 1 attached to the body casing 101. This electrically connects the drum circuit board 15 and the controller 102. As shown in FIG. 19, the drum circuit board 15 in the present embodiment includes a plurality of, or specifically four body terminals 31. More specifically, the body terminals 31 include a single body voltage terminal 31*a*, a single body grounding terminal 31*b*, a single body clock terminal 31*c*, and a single body signal terminal 31*d*.

When the drum cartridge 1 is attached to the body casing 101 of the image forming apparatus 100, the body voltage terminal 31*a* is electrically connected to a voltage terminal 104*a* of a plurality of terminals 104 of the controller 102, providing a power supply voltage from the controller 102 to the drum circuit board 15.

When the drum cartridge 1 is attached to the body casing 101 of the image forming apparatus 100, the body grounding terminal 31*b* is electrically connected to a grounding terminal 104*b* of the terminals 104 of the controller 102, providing a grounding voltage from the controller 102 to the drum circuit board 15.

When the drum cartridge 1 is attached to the body casing 101 of the image forming apparatus 100, the body clock terminal 31*c* is electrically connected to a clock terminal 104*c* of the terminals 104 of the controller 102, providing a clock signal from the controller 102 to the drum circuit board 15 at fixed time intervals.

When the drum cartridge 1 is attached to the body casing 101 of the image forming apparatus 100, the body signal terminal 31*d* is electrically connected to a signal terminal 104*d* of the terminals 104 of the controller 102, allowing exchange of signals representing various sets of information between the controller 102 and the drum circuit board 15.

5-2. Toner Terminal

When the four toner cartridges 2 are attached to the frame 12 of the drum cartridge 1, the toner terminals 32 are electrically connected to the toner circuit boards 24 in the toner cartridges 2 through the second electric terminal units 14 described above. This electrically connects the drum circuit board 15 and the toner circuit boards 24. As shown in FIG. 19, the drum circuit board 15 in the present embodiment includes a plurality of, or specifically sixteen toner terminals 32.

The sixteen toner terminals 32 include a first group 32A of four toner terminals 32, a second group 32B of other four toner terminals 32, a third group 32C of other four toner terminals 32, and a fourth group 32D of other four toner terminals 32.

When the first toner cartridge 2A is attached to the frame 12 of the drum cartridge 1, the four toner terminals 32 of the first group 32A are electrically connected to the first toner circuit board 24A. When the second toner cartridge 2B is attached to the frame 12 of the drum cartridge 1, the four toner terminals 32 of the second group 32B are electrically connected to the second toner circuit board 24B. When the third toner cartridge 2C is attached to the frame 12 of the drum cartridge 1, the four toner terminals 32 of the third group 32C are electrically connected to the third toner circuit board 24C. When the fourth toner cartridge 2D is attached to the frame 12 of the drum cartridge 1, the four toner terminals 32 of the fourth group 32D are electrically connected to the fourth toner circuit board 24D.

The four toner terminals 32 in each group include a single toner voltage terminal 32*a*, a single toner grounding terminal 32*b*, a single toner clock terminal 32*c*, and a single toner signal terminal 32*d*.

The toner voltage terminals 32*a* are electrically connected to the transistor array 35 through voltage relay lines 33*a* (described later). When the toner cartridges 2 are attached to the frame 12 of the drum cartridge 1, the toner voltage terminals 32*a* are electrically connected to voltage terminals 242*a* of the four terminals 242 of the toner circuit boards 24.

The toner grounding terminals 32*b* are electrically connected to the body grounding terminal 31*b* through a grounding relay line 33*b* (described later). When the toner cartridges 2 are attached to the frame 12 of the drum cartridge 1, the toner grounding terminals 32*b* are electrically connected to grounding terminals 242*b* of the four terminals 242 of the toner circuit boards 24, providing a grounding voltage from the controller 102 to the toner circuit boards 24 through the drum circuit board 15.

The toner clock terminals 32*c* are electrically connected to the body clock terminal 31*c* through a clock relay line 33*c* (described later). When the toner cartridges 2 are attached to the frame 12 of the drum cartridge 1, the toner clock terminals 32*c* are electrically connected to clock terminals 242*c* of the four terminals 242 of the toner circuit boards 24, providing a clock signal from the controller 102 to the toner circuit boards 24 through the drum circuit board 15 at fixed time intervals.

The toner signal terminals 32*d* are electrically connected to the body signal terminal 31*d* through a signal relay line 33*d* (described later). When the toner cartridges 2 are attached to the frame 12 of the drum cartridge 1, the toner signal terminals 32*d* are electrically connected to signal terminals 242*d* of the four terminals 242 of the toner circuit boards 24, allowing exchange of signals carrying various sets of information between the controller 102 and the toner circuit boards 24 through the drum circuit board 15.

5-3. Relay Line

As shown in FIG. 19, the relay lines 33 in the present embodiment include the voltage relay lines 33*a*, the grounding relay line 33*b*, the clock relay line 33*c*, and the signal relay line 33*d*. More specifically, the relay lines 33 include a plurality of voltage relay lines 33*a*, a single grounding relay line 33*b*, a single clock relay line 33*c*, and a single relay line 33*d*.

The voltage relay lines 33*a* include a body voltage relay line 331*a*, toner voltage relay lines 332*a*, and a drum voltage line 333*a*. The voltage relay lines 33*a* in the present embodiment include a single body voltage relay line 331*a*, a plurality of, or specifically four toner voltage relay lines 332*a*, and a single drum voltage line 333*a*. The body voltage relay line 331*a* has one end electrically connected to the body voltage terminal 31*a*, and the other end split in two ends. More specifically, the body voltage relay line 331*a* has the other ends including a first end and a second end. The first end of the body voltage relay line 331*a* is electrically connected to the transistor array 35. The second end of the body voltage relay line 331*a* is electrically connected to the general-purpose input-output port 36. The toner voltage relay lines 332*a* each electrically connect the transistor array 35 to the corresponding toner voltage terminals 32*a*. The drum voltage line 333*a* electrically connects the transistor array 35 to the drum memory 151.

The grounding relay line 33*b* has one end electrically connected to the body grounding terminal 31*b*, and the other end split in six ends. More specifically, the grounding relay line 33*b* has the other ends including a first end, a second end, a third end, a fourth end, a fifth end, and a sixth end. The first end of the grounding relay line 33*b* is electrically connected to the toner grounding terminal 32*b* of the first group 32A. The second end is electrically connected to the toner grounding terminal 32*b* of the second group 32B. The third end is electrically connected to the toner grounding terminal 32*b* of the third group 32C. The fourth end is electrically connected to the toner grounding terminal 32*b* of the fourth group 32D. The fifth end is electrically connected to the drum memory 151. The sixth end is electrically connected to the general-purpose input-output port 36. Thus, the drum circuit board 15 provides the grounding voltage received through the body grounding terminal 31*b* to the four toner grounding terminals 32*b*, the drum memory 151, and the general-purpose input-output port 36. The common body grounding terminal 31*b* reduces the number of body terminals 31.

The clock relay line 33*c* has one end electrically connected to the body clock terminal 31*c*, and the other end split in six ends. More specifically, the clock relay line 33*c* has the other ends including a first end, a second end, a third end, a fourth end, a fifth end, and a sixth end. The first end of the clock relay line 33*c* is electrically connected to the toner clock terminal 32*c* of the first group 32A. The second end is electrically connected to the toner clock terminal 32*c* of the second group 32B. The third end is electrically connected to the toner clock terminal 32*c* of the third group 32C. The fourth end is electrically connected to the toner clock terminal 32*c* of the fourth group 32D. The fifth end is electrically connected to the drum memory 151. The sixth end is electrically connected to the general-purpose input-output port 36. Thus, the drum circuit board 15 provides the clock signals received through the body clock terminal 31*c* to the four toner clock terminals 32*c*, the drum memory 151, and the general-purpose input-output port 36. The common body clock terminal 31*c* reduces the number of body terminals 31.

The signal relay line 33*d* has one end electrically connected to the body signal terminal 31*d*, and the other end split in six ends. More specifically, the signal relay line 33*d* has the other ends including a first end, a second end, a third end, a fourth end, a fifth end, and a sixth end. The first end of the signal relay line 33*d* is electrically connected to the toner signal terminal 32*d* of the first group 32A. The second end is electrically connected to the toner signal terminal 32*d* of the second group 32B. The third end is electrically connected to the toner signal terminal 32*d* of the third group 32C. The fourth end is electrically connected to the toner signal terminal 32*d* of the fourth group 32D. The fifth end is electrically connected to the drum memory 151. The sixth end is electrically connected to the general-purpose input-output port 36. Thus, the drum circuit board 15 provides the signal received through the body signal terminal 31*d* to the four toner signal terminals 32*d*, the drum memory 151, and the general-purpose input-output port 36. The common body signal terminal 31*d* reduces the number of body terminals 31.

5-4. Transistor Array

The transistor array 35 is a switch circuit for switching between voltage lines. The transistor array 35 receives a power supply voltage from the controller 102 through the body voltage terminal 31*a*. The transistor array 35 also receives an address signal from the controller 102 through the body signal terminal 31*d* and the general-purpose input-output port 36. The address signal specifies the communication destination. The transistor array 35 selects the drum memory 151 or a toner signal terminal 32*d* as a communication destination from the drum memory 151 and the four toner signal terminals 32*d* in accordance with the received address signal. The transistor array 35 provides the power supply voltage to the drum memory 151 or to the toner signal terminal 32*d* selected as the communication destination.

More specifically, the transistor array 35 provides the power supply voltage to the drum memory 151 or to the toner memory 241 specified as the communication destination from the drum memory 151 and the four toner memories 241. The drum memory 151 and the four toner memories 241 each receive a data signal input through the corresponding signal terminal 242*d* upon receipt of a power supply voltage. This allows an intended data signal to be transmitted to the communication destination specified from the drum memory 151 and the four toner memories 241. This structure eliminates the need to prepare body signal terminals 31*d* separately for the four toner signal terminals 32*d*, and thus reduces the number of body signal terminals 31*d*. The controller 102 may also have fewer signal terminals 104*d*.

In particular, the drum circuit board 15 in the present embodiment receives an address signal and a data signal through the single body signal terminal 31*d*. This further reduces the number of body signal terminals 31*d*. The controller 102 may also have still fewer signal terminals 104*d*.

More specifically, although the body terminals 31 in the first embodiment shown in FIG. 6 include the five body signal terminals 31*d*, the body terminals 31 in the present embodiment shown in FIG. 19 include the single body signal terminal 31*d*. Although the controller 102 in the first embodiment shown in FIG. 6 includes the five signal terminals 104*d*, the controller 102 in the present embodiment shown in FIG. 19 includes the single signal terminal 104*d*.

5-5. Information Relay Through Drum Circuit Board

The drum circuit board 15 in the present embodiment also interfaces between the controller 102 and the toner circuit boards 24. The drum circuit board 15 thus has fewer terminals than when the drum circuit board 15 and the toner circuit boards 24 are directly connected to the controller 102. As shown in FIG. 19, for example, the single body voltage terminal 31*a* can provide the power supply voltage to the drum memory 151 of the drum circuit board 15 and the toner memories 241 of the toner circuit boards 24. As shown in FIG. 19, the single body grounding terminal 31*b* can provide the grounding voltage to the drum memory 151 of the drum circuit board 15 and the toner memories 241 of the toner circuit boards 24. As shown in FIG. 19, the single body clock terminal 31*c* can provide the clock signal to the drum memory 151 of the drum circuit board 15 and the toner memories 241 of the toner circuit boards 24. The controller 102 thus has fewer terminals 104.

In particular, when a plurality of toner circuit boards 24 are used as in the present embodiment, the drum circuit board 15 that interfaces between the controller 102 and the toner circuit boards 24 can have fewer terminals. As shown in FIG. 19, for example, the single body voltage terminal 31*a* can provide the power supply voltage to the four toner circuit boards 24. As shown in FIG. 19, the single body grounding terminal 31*b* can provide the grounding voltage to the four toner circuit boards 24. As shown in FIG. 19, the single body clock terminal 31*c* can provide the clock signal to the four toner circuit boards 24. The controller 102 thus has still fewer terminals 104.

6. Sixth Embodiment

Figure 20:
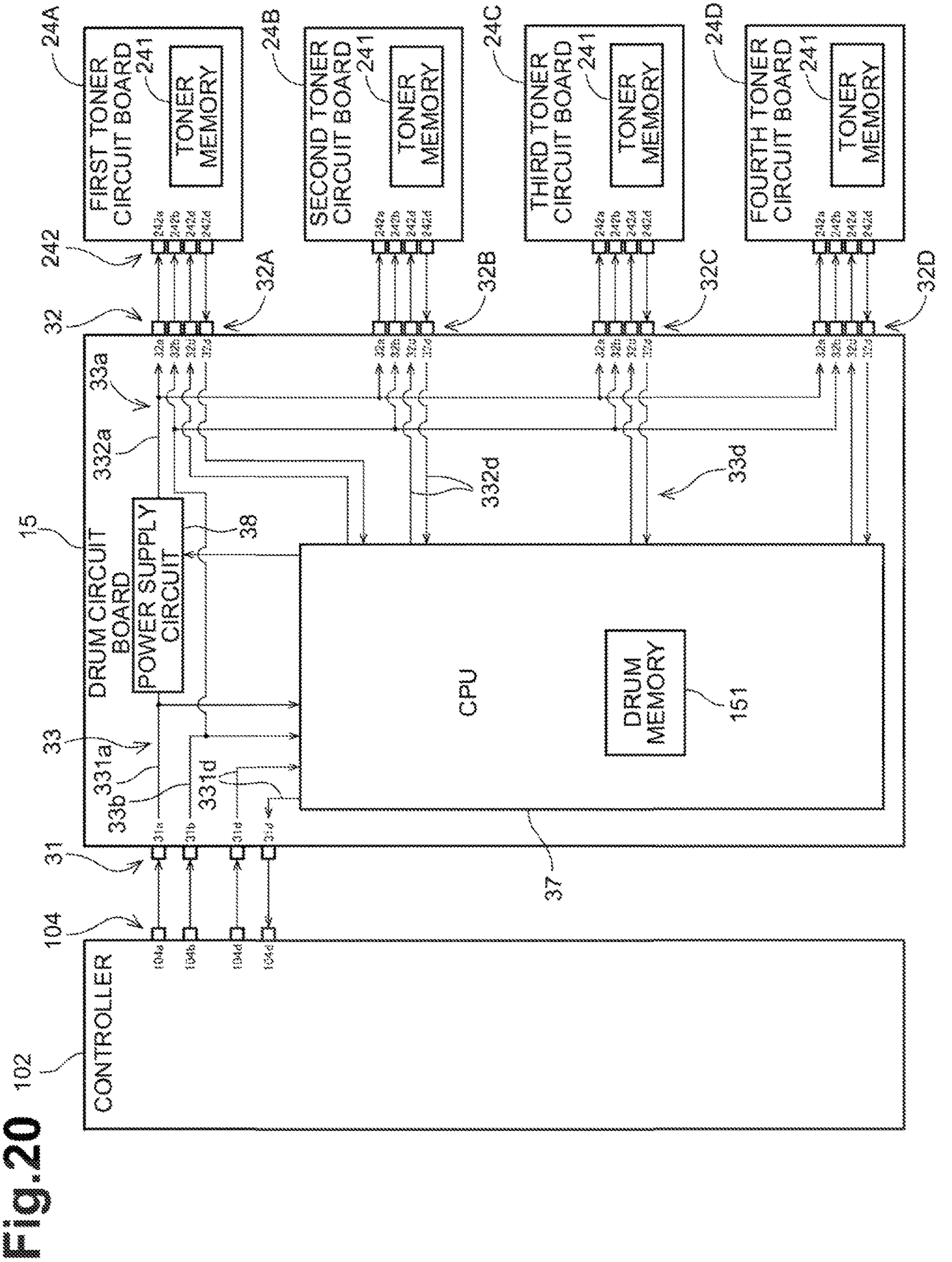
FIG. 20 is a block diagram showing electrical connection between a controller, a drum circuit board, and toner circuit boards according to a sixth embodiment.

FIG. 20 is a block diagram showing electrical connection between a controller 102, a drum circuit board 15, and four toner circuit boards 24 according to a sixth embodiment. In the example shown in FIG. 20, the drum cartridge 1 includes the drum circuit board 15 and a CPU 37. The drum circuit board 15 includes a plurality of body terminals 31, a plurality of toner terminals 32, and a plurality of relay lines 33. The CPU 37 is located at the drum circuit board 15.

6-1. Body Terminal

The body terminals 31 are electrically connected to terminals 104 on the controller 102 through the first electric terminal unit 13 described above in the image forming apparatus 100 having the drum cartridge 1 attached to the body casing 101. This electrically connects the drum circuit board 15 and the controller 102. As shown in FIG. 20, the drum circuit board 15 in the present embodiment includes a plurality of, or specifically four body terminals 31. More specifically, the body terminals 31 include a single body voltage terminal 31*a*, a single body grounding terminal 31*b*, and two body signal terminals 31*d*.

When the drum cartridge 1 is attached to the body casing 101 of the image forming apparatus 100, the body voltage terminal 31*a* is electrically connected to a voltage terminal 104*a* of a plurality of terminals 104 on the controller 102, providing a power supply voltage from the controller 102 to the drum circuit board 15.

When the drum cartridge 1 is attached to the body casing 101 of the image forming apparatus 100, the body grounding terminal 31*b* is electrically connected to a grounding terminal 104*b* of the terminals 104 of the controller 102, providing a grounding voltage from the controller 102 to the drum circuit board 15.

When the drum cartridge 1 is attached to the body casing 101 of the image forming apparatus 100, the two body signal terminals 31*d* are electrically connected to signal terminals 104*d* of the terminals 104 of the controller 102, allowing exchange of signals carrying various sets of information between the controller 102 and the drum circuit board 15.

One of the two body signal terminals 31*d* is a transmission terminal, and the other is a reception terminal. In the present embodiment, asynchronous serial communication is performed to transmit and receive information. This eliminates the body clock terminals for receiving clock signals, and thus further reduces the number of body terminals 31.

6-2. Toner Terminal

When the four toner cartridges 2 are attached to the frame 12 of the drum cartridge 1, the toner terminals 32 are electrically connected to the toner circuit boards 24 in the toner cartridges 2 through the second electric terminal units 14 described above. This electrically connects the drum circuit board 15 and the toner circuit boards 24. As shown in FIG. 20, the drum circuit board 15 in the present embodiment includes a plurality of, or specifically sixteen toner terminals 32.

The sixteen toner terminals 32 include a first group 32A of four toner terminals 32, a second group 32B of other four toner terminals 32, a third group 32C of other four toner terminals 32, and a fourth group 32D of other four toner terminals 32.

When the first toner cartridge 2A is attached to the frame 12 of the drum cartridge 1, the four toner terminals 32 of the first group 32A are electrically connected to the first toner circuit board 24A. When the second toner cartridge 2B is attached to the frame 12 of the drum cartridge 1, the four toner terminals 32 of the second group 32B are electrically connected to the second toner circuit board 24B. When the third toner cartridge 2C is attached to the frame 12 of the drum cartridge 1, the four toner terminals 32 of the third group 32C are electrically connected to the third toner circuit board 24C. When the fourth toner cartridge 2D is attached to the frame 12 of the drum cartridge 1, the four toner terminals 32 of the fourth group 32D are electrically connected to the fourth toner circuit board 24D.

The four toner terminals 32 in each group include a single toner voltage terminal 32*a*, a single toner grounding terminal 32*b*, and two toner signal terminals 32*d*.

The toner voltage terminals 32*a* are electrically connected to the body voltage terminal 31*a* through voltage relay lines 33*a* (described later), the CPU 37, and a power supply circuit 38. When the toner cartridges 2 are attached to the frame 12 of the drum cartridge 1, the toner voltage terminals 32*a* are electrically connected to voltage terminals 242*a* of the four terminals 242 of the toner circuit boards 24, providing a grounding voltage from the controller 102 to the toner circuit boards 24 through the drum circuit board 15.

The toner grounding terminals 32*b* are electrically connected to the body grounding terminal 31*b* through a grounding relay line 33*b* (described later). When the toner cartridges 2 is attached to the frame 12 of the drum cartridge 1, the toner grounding terminals 32*b* are electrically connected to grounding terminals 242*b* of the four terminals 242 on the toner circuit boards 24, providing a grounding voltage from the controller 102 to the toner circuit boards 24 through the drum circuit board 15.

The toner signal terminals 32*d* are electrically connected to the CPU 37 through signal relay lines 33*d* (described later). When the toner cartridges 2 are attached to the frame 12 of the drum cartridge 1, the toner signal terminals 32*d* are electrically connected to signal terminals 242*d* of the four terminals 242 of the toner circuit boards 24.

One of the two toner signal terminals 32*d* among the four toner terminals in each group is a transmission terminal, and the other is a reception terminal. In the present embodiment as described above, asynchronous serial communication is performed to transmit and receive information. This eliminates the toner clock terminals for outputting clock signals.

6-3. Relay Line

As shown in FIG. 20, the relay lines 33 in the present embodiment include the voltage relay lines 33*a*, the grounding relay line 33*b*, and the signal relay lines 33*d*. More specifically, the relay lines 33 include a plurality of voltage relay lines 33*a*, a single grounding relay line 33*b*, and a plurality of signal relay lines 33*d*.

The voltage relay lines 33*a* include a body voltage relay line 331*a* and a toner voltage relay line 332*a*. The voltage relay lines 33*a* in the present embodiment include a single body voltage relay line 331*a* and a single toner voltage relay line 332*a*. The body voltage relay line 331*a* has one end electrically connected to the body voltage terminal 31*a*, and the other end split in two ends. More specifically, the body voltage relay line 331*a* has the other ends including a first end and a second end. The first end of the body voltage relay line 331*a* is electrically connected to the CPU 37. The second end of the body voltage relay line 331*a* is electrically connected to the power supply circuit 38. Thus, the drum circuit board 15 provides the power supply voltage received through the body voltage terminal 31*a* to the CPU 37 and the power supply circuit 38.

The CPU 37 is electrically connected to the power supply circuit 38. The toner voltage relay line 332*a* has one end electrically connected to the power supply circuit 38, and the other end split in four ends. More specifically, the toner voltage relay line 332*a* has the other ends including a first end, a second end, a third end, and a fourth end. The first end of the toner voltage relay line 332*a* is electrically connected to the toner voltage terminal 32*a* of the first group 32A. The second end is electrically connected to the toner voltage terminal 32*a* of the second group 32B. The third end is electrically connected to the toner voltage terminal 32*a* of the third group 32C. The fourth end is electrically connected to the toner voltage terminal 32*a* of the fourth group 32D. Thus, the drum circuit board 15 provides the power supply voltage output from the power supply circuit 38 to the four toner voltage terminals 32*a*.

The grounding relay line 33*b* has one end electrically connected to the body grounding terminal 31*b*, and the other end split in five ends. More specifically, the grounding relay line 33*b* has the other ends including a first end, a second end, a third end, a fourth end, and a fifth end. The first end of the grounding relay line 33*b* is electrically connected to the toner grounding terminal 32*b* of the first group 32A. The second end is electrically connected to the toner grounding terminal 32*b* of the second group 32B. The third end is electrically connected to the toner grounding terminal 32*b* of the third group 32C. The fourth end is electrically connected to the toner grounding terminal 32*b* of the fourth group 32D. The fifth end is electrically connected to the CPU 37. Thus, the drum circuit board 15 provides the grounding voltage received through the body grounding terminal 31*b* to the four toner grounding terminals 32*b* and the CPU 37. The common body grounding terminal 31*b* reduces the number of body terminals 31.

The signal relay lines 33*d* include body signal relay lines 331*d* and toner signal relay lines 332*d*. The signal relay lines 33*d* in the present embodiment include a plurality of, or specifically two body signal relay lines 331*d* and a plurality of, or specifically eight toner signal relay lines 332*d*. The body signal relay line 331*d* has one end electrically connected to the body signal terminal 31*d*, and the other end electrically connected to the CPU 37. The toner signal relay lines 332*d* each have one end electrically connected to the CPU 37, and the other end electrically connected to the corresponding toner signal terminals 32*d*.

6-4. CPU

The CPU 37 is a processor that switches between signal lines in accordance with a program. In the present embodiment, the CPU 37 and the drum memory 151 are integral as a single chip. In some embodiments, the CPU 37 and the drum memory 151 may be separate components. The drum memory (memory) 151 stores programs readable by the CPU 37. The programs may be stored in the drum memory 151 before the drum cartridge 1 is shipped as a product. In other embodiments, the programs may be stored in the body memory 106 of the image forming apparatus 100. When the image forming apparatus 100 is powered on, the programs may be read from the body memory 106 and stored into the drum memory 151.

The CPU 37 receives a data signal from the controller 102 through the body signal terminal 31*d*. The data signal represents various sets of information to be transmitted to the communication destination. The CPU 37 selects the drum memory 151 or a toner signal terminal 32*d* as a communication destination from the drum memory 151 and the four toner signal terminals 32*d* in accordance with the program read from the drum memory 151. The CPU 37 also outputs the received data signal to the drum memory 151 or to the toner signal terminal 32*d* selected as the communication destination.

In this manner, the CPU 37 selects the drum memory 151 or a toner memory 241 as a communication destination from the drum memory 151 and the four toner memories 241, and outputs a data signal. This structure eliminates the need to prepare body signal terminals 31*d* separately for the drum memory 151 and for the four toner signal terminals 32*d*, and thus reduces the number of body signal terminals 31*d*. The controller 102 may also have fewer signal terminals 104*d*.

More specifically, although the body terminals 31 in the first embodiment shown in FIG. 6 include the five body signal terminals 31*d*, the body terminals 31 in the present embodiment shown in FIG. 20 include the two body signal terminals 31*d*. Although the controller 102 in the first embodiment shown in FIG. 6 includes the five signal terminals 104*d*, the controller 102 in the present embodiment shown in FIG. 20 includes the two signal terminals 104*d*.

6-5. Information Relay Through Drum Circuit Board

The drum circuit board 15 in the present embodiment also interfaces between the controller 102 and the toner circuit boards 24. The drum circuit board 15 thus has fewer terminals than when the drum circuit board 15 and the toner circuit boards 24 are directly connected to the controller 102. As shown in FIG. 20, for example, the single body voltage terminal 31*a* can provide the power supply voltage to the drum memory 151 of the drum circuit board 15 and the toner memories 241 of the toner circuit boards 24. As shown in FIG. 20, the single body grounding terminal 31*b* can provide the grounding voltage to the drum memory 151 of the drum circuit board 15 and the toner memories 241 of the toner circuit boards 24.

In particular, when a plurality of toner circuit boards 24 are used as in the present embodiment, the drum circuit board 15 that interfaces between the controller 102 and the toner circuit boards 24 can have fewer terminals. As shown in FIG. 20, for example, the single body voltage terminal 31*a* can provide the power supply voltage to the four toner circuit boards 24. As shown in FIG. 20, the single body grounding terminal 31*b* can provide the grounding voltage to the four toner circuit boards 24.

7. Seventh Embodiment

Figure 21:
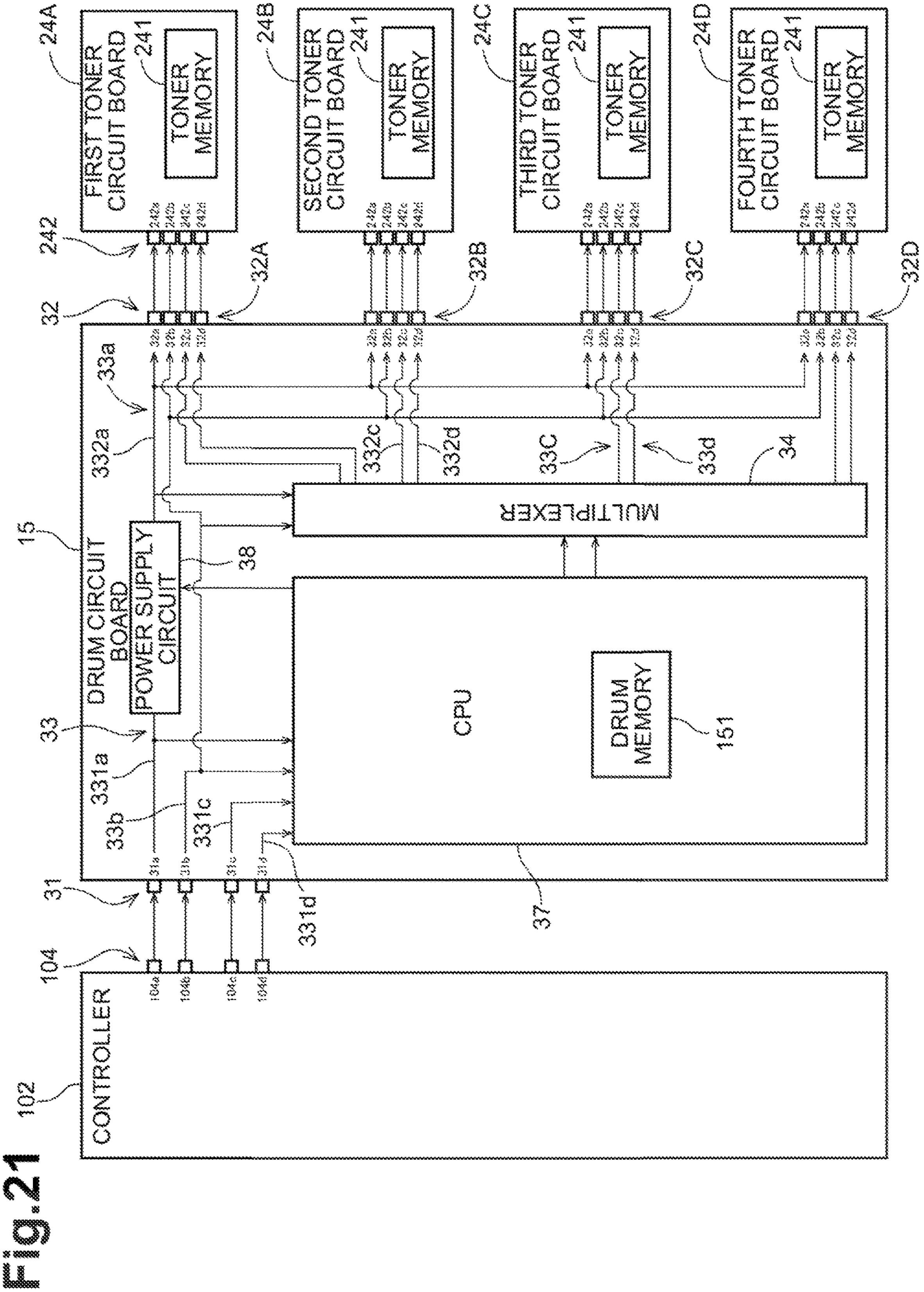
FIG. 21 is a block diagram showing electrical connection between a controller, a drum circuit board, and toner circuit boards according to a seventh embodiment.

FIG. 21 is a block diagram showing electrical connection between a controller 102, a drum circuit board 15, and four toner circuit boards 24 according to a seventh embodiment. In the example shown in FIG. 21, the drum cartridge 1 includes the drum circuit board 15, a multiplexer 34, and a CPU 37. The drum circuit board 15 includes a plurality of body terminals 31, a plurality of toner terminals 32, and a plurality of relay lines 33. The multiplexer 34 and the CPU 37 are located at the drum circuit board 15.

7-1. Body Terminal

The body terminals 31 are electrically connected to terminals 104 on the controller 102 through the first electric terminal unit 13 described above in the image forming apparatus 100 having the drum cartridge 1 attached to the body casing 101. This electrically connects the drum circuit board 15 and the controller 102. As shown in FIG. 21, the drum circuit board 15 in the present embodiment includes a plurality of, or specifically four body terminals 31. More specifically, the body terminals 31 include a single body voltage terminal 31*a*, a single body grounding terminal 31*b*, a single body clock terminal 31*c*, and a single body signal terminal 31*d*.

When the drum cartridge 1 is attached to the body casing 101 of the image forming apparatus 100, the body voltage terminal 31*a* is electrically connected to a voltage terminal 104*a* of a plurality of terminals 104 of the controller 102, providing a power supply voltage from the controller 102 to the drum circuit board 15.

When the drum cartridge 1 is attached to the body casing 101 of the image forming apparatus 100, the body grounding terminal 31*b* is electrically connected to a grounding terminal 104*b* of the terminals 104 of the controller 102, providing a grounding voltage from the controller 102 to the drum circuit board 15.

When the drum cartridge 1 is attached to the body casing 101 of the image forming apparatus 100, the body clock terminal 31*c* is electrically connected to a clock terminal 104*c* of the terminals 104 of the controller 102, providing a clock signal from the controller 102 to the drum circuit board 15 at fixed time intervals.

When the drum cartridge 1 is attached to the body casing 101 of the image forming apparatus 100, the body signal terminal 31*d* is electrically connected to a signal terminal 104*d* of the terminals 104 of the controller 102, allowing exchange of signals carrying various sets of information between the controller 102 and the drum circuit board 15.

7-2. Toner Terminal

When the four toner cartridges 2 are attached to the frame 12 of the drum cartridge 1, the toner terminals 32 are electrically connected to the toner circuit boards 24 in the toner cartridges 2 through the second electric terminal units 14 described above. This electrically connects the drum circuit board 15 and the toner circuit boards 24. As shown in FIG. 21, the drum circuit board 15 in the present embodiment includes a plurality of, or specifically sixteen toner terminals 32.

The sixteen toner terminals 32 include a first group 32A of four toner terminals 32, a second group 32B of other four toner terminals 32, a third group 32C of other four toner terminals 32, and a fourth group 32D of other four toner terminals 32.

When the first toner cartridge 2A is attached to the frame 12 of the drum cartridge 1, the four toner terminals 32 of the first group 32A are electrically connected to the first toner circuit board 24A. When the second toner cartridge 2B is attached to the frame 12 of the drum cartridge 1, the four toner terminals 32 of the second group 32B are electrically connected to the second toner circuit board 24B. When the third toner cartridge 2C is attached to the frame 12 of the drum cartridge 1, the four toner terminals 32 of the third group 32C are electrically connected to the third toner circuit board 24C. When the fourth toner cartridge 2D is attached to the frame 12 of the drum cartridge 1, the four toner terminals 32 of the fourth group 32D are electrically connected to the fourth toner circuit board 24D.

The four toner terminals 32 in each group include a single toner voltage terminal 32*a*, a single toner grounding terminal 32*b*, a single toner clock terminal 32*c*, and a single toner signal terminal 32*d*.

The toner voltage terminals 32*a* are electrically connected to the body voltage terminal 31*a* through voltage relay lines 33*a* (described later), the CPU 37, and the power supply circuit 38. When the toner cartridges 2 are attached to the frame 12 of the drum cartridge 1, the toner voltage terminals 32*a* are electrically connected to voltage terminals 242*a* of the four terminals 242 of the toner circuit boards 24, providing a grounding voltage from the controller 102 to the toner circuit boards 24 through the drum circuit board 15.

The toner grounding terminals 32*b* are electrically connected to the body grounding terminal 31*b* through a grounding relay line 33*b* (described later). When the toner cartridges 2 are attached to the frame 12 of the drum cartridge 1, the toner grounding terminals 32*b* are electrically connected to grounding terminals 242*b* of the four terminals 242 of the toner circuit boards 24, providing a grounding voltage from the controller 102 to the toner circuit boards 24 through the drum circuit board 15.

The toner clock terminals 32*c* are electrically connected to the multiplexer 34 through clock relay lines 33*c* (described later). When the toner cartridges 2 are attached to the frame 12 of the drum cartridge 1, the toner clock terminals 32*c* are electrically connected to clock terminals 242*c* of the four terminals 242 of the toner circuit boards 24.

The toner signal terminals 32*d* are electrically connected to the multiplexer 34 through signal relay lines 33*d* (described later). When the toner cartridges 2 are attached to the frame 12 of the drum cartridge 1, the toner signal terminals 32*d* are electrically connected to signal terminals 242*d* of the four terminals 242 of the toner circuit boards 24.

7-3. Relay Line

As shown in FIG. 21, the relay lines 33 in the present embodiment include the voltage relay lines 33*a*, the grounding relay line 33*b*, the clock relay lines 33*c*, and the signal relay lines 33*d*. More specifically, the relay lines 33 include a plurality of voltage relay lines 33*a*, a single grounding relay line 33*b*, a plurality of clock relay lines 33*c*, and a plurality of signal relay lines 33*d*.

The voltage relay lines 33*a* include a body voltage relay line 331*a* and a toner voltage relay line 332*a*. The voltage relay lines 33*a* in the present embodiment include a single body voltage relay line 331*a* and a single toner voltage relay line 332*a*. The body voltage relay line 331*a* has one end electrically connected to the body voltage terminal 31*a*, and the other end split in two ends. More specifically, the body voltage relay line 331*a* has the other ends including a first end and a second end. The first end of the body voltage relay line 331*a* is electrically connected to the CPU 37. The second end of the body voltage relay line 331*a* is electrically connected to the power supply circuit 38. Thus, the drum circuit board 15 provides the power supply voltage received through the body voltage terminal 31*a* to the CPU 37 and the power supply circuit 38.

The CPU 37 is electrically connected to the power supply circuit 38. The toner voltage relay line 332*a* has one end electrically connected to the power supply circuit 38, and the other end split in five ends. More specifically, the toner voltage relay line 332*a* has the other ends including a first end, a second end, a third end, a fourth end, and a fifth end. The first end of the toner voltage relay line 332*a* is electrically connected to the toner voltage terminal 32*a* of the first group 32A. The second end is electrically connected to the toner voltage terminal 32*a* of the second group 32B. The third end is electrically connected to the toner voltage terminal 32*a* of the third group 32C. The fourth end is electrically connected to the toner voltage terminal 32*a* of the fourth group 32D. The fifth end is electrically connected to the multiplexer 34. Thus, the drum circuit board 15 provides the power supply voltage output from the power supply circuit 38 to the four toner voltage terminals 32*a* and the multiplexer 34.

The grounding relay line 33*b* has one end electrically connected to the body grounding terminal 31*b*, and the other end split in six ends. More specifically, the grounding relay line 33*b* has the other ends including a first end, a second end, a third end, a fourth end, a fifth end, and a sixth end. The first end of the grounding relay line 33*b* is electrically connected to the toner grounding terminal 32*b* of the first group 32A. The second end is electrically connected to the toner grounding terminal 32*b* of the second group 32B. The third end is electrically connected to the toner grounding terminal 32*b* of the third group 32C. The fourth end is electrically connected to the toner grounding terminal 32*b* of the fourth group 32D. The fifth end is electrically connected to the CPU 37. The sixth end is electrically connected to the multiplexer 34. Thus, the drum circuit board 15 provides the grounding voltage received through the body grounding terminal 31*b* to the four toner grounding terminals 32*b*, the CPU 37, and the multiplexer 34. The common body grounding terminal 31*b* reduces the number of body terminals 31.

The clock relay lines 33*c* include a body clock relay line 331*c* and toner clock relay lines 332*c*. The clock relay lines 33*c* in the present embodiment include a single body clock relay line 331*c* and a plurality of, or specifically four toner clock relay lines 332*c*. The body clock relay line 331*c* has one end electrically connected to the body clock terminal 31*c*, and the other end electrically connected to the CPU 37. The toner clock relay lines 332*c* each have one end electrically connected to the multiplexer 34, and the other end electrically connected to the corresponding toner clock terminals 32*c*.

The signal relay lines 33*d* include a body signal relay line 331*d* and toner signal relay lines 332*d*. The signal relay lines 33*d* in the present embodiment include a single body signal relay line 331*d* and a plurality of, or specifically four toner signal relay lines 332*d*. The body signal relay line 331*d* has one end electrically connected to the body signal terminal 31*d*, and the other end electrically connected to the CPU 37. The toner signal relay lines 332*d* each have one end electrically connected to the multiplexer 34, and the other end electrically connected to the corresponding toner signal terminals 32*d*.

The CPU 37 is electrically connected to the multiplexer 34.

7-4. CPU and Multiplexer

The CPU 37 is a processor that outputs an address signal in accordance with a program. In the present embodiment, the CPU 37 and the drum memory 151 are integral as a single chip. In some embodiments, the CPU 37 and the drum memory 151 may be separate components. The drum memory 151 stores programs readable by the CPU 37. The programs may be stored in the drum memory 151 before the drum cartridge 1 is shipped as a product. In other embodiments, the programs may be stored in the body memory 106 of the image forming apparatus 100. When the image forming apparatus 100 is powered on, the programs may be read from the body memory 106 and stored into the drum memory 151.

The CPU 37 receives a data signal from the controller 102 through the body signal terminal 31*d*. The CPU 37 also transmits the received data signal to the multiplexer 34. The data signal represents various sets of information to be transmitted to the communication destination. The CPU 37 generates an address signal in accordance with a program read from the drum memory 151, and transmits the generated address signal to the multiplexer 34. The address signal specifies the communication destination.

The multiplexer 34 is a switch circuit for switching between signal lines. The multiplexer 34 receives an address signal from the CPU 37. The multiplexer 34 then selects a toner signal terminal 32*d* as a communication destination from the four toner signal terminals 32*d* in accordance with the received address signal. In other words, the multiplexer 34 is controlled by the CPU 37. The multiplexer 34 also receives a data signal from the CPU 37, and outputs the received data signal to the toner signal terminal 32*d* selected as the communication destination.

In this manner, the CPU 37 and the multiplexer 34 selects a toner memory 241 as a communication destination from the four toner memories 241, and outputs a data signal to the communication destination. This structure eliminates the need to prepare body signal terminals 31*d* separately for the four toner signal terminals 32*d*, and thus reduces the number of body signal terminals 31*d*. The controller 102 may also have fewer signal terminals 104*d*.

More specifically, although the body terminals 31 in the first embodiment shown in FIG. 6 include the five body signal terminals 31*d*, the body terminals 31 in the present embodiment shown in FIG. 21 include the single body signal terminal 31*d*. Although the controller 102 in the first embodiment shown in FIG. 6 includes the five signal terminals 104*d*, the controller 102 in the present embodiment shown in FIG. 21 includes the single signal terminal 104*d*.

7-5. Information Relay Through Drum Circuit Board

The drum circuit board 15 in the present embodiment also interfaces between the controller 102 and the toner circuit boards 24. The drum circuit board 15 thus has fewer terminals than when the drum circuit board 15 and the toner circuit boards 24 are directly connected to the controller 102. As shown in FIG. 21, for example, the single body voltage terminal 31*a* can provide the power supply voltage to the drum memory 151 of the drum circuit board 15 and the toner memories 241 of the toner circuit boards 24. As shown in FIG. 21, the single body grounding terminal 31*b* can provide the grounding voltage to the drum memory 151 of the drum circuit board 15 and the toner memories 241 of the toner circuit boards 24. As shown in FIG. 21, the single body clock terminal 31*c* can provide the clock signal to the drum memory 151 of the drum circuit board 15 and the toner memories 241 of the toner circuit boards 24. The controller 102 thus has fewer terminals 104.

In particular, when a plurality of toner circuit boards 24 are used as in the present embodiment, the drum circuit board 15 that interfaces between the controller 102 and the toner circuit boards 24 can have fewer terminals. As shown in FIG. 21, for example, the single body voltage terminal 31*a* can provide the power supply voltage to the four toner circuit boards 24. As shown in FIG. 21, the single body grounding terminal 31*b* can provide the grounding voltage to the four toner circuit boards 24. As shown in FIG. 21, the single body clock terminal 31*c* can provide the clock signal to the four toner circuit boards 24. The controller 102 thus has still fewer terminals 104.

8. Eighth Embodiment

Figure 22:
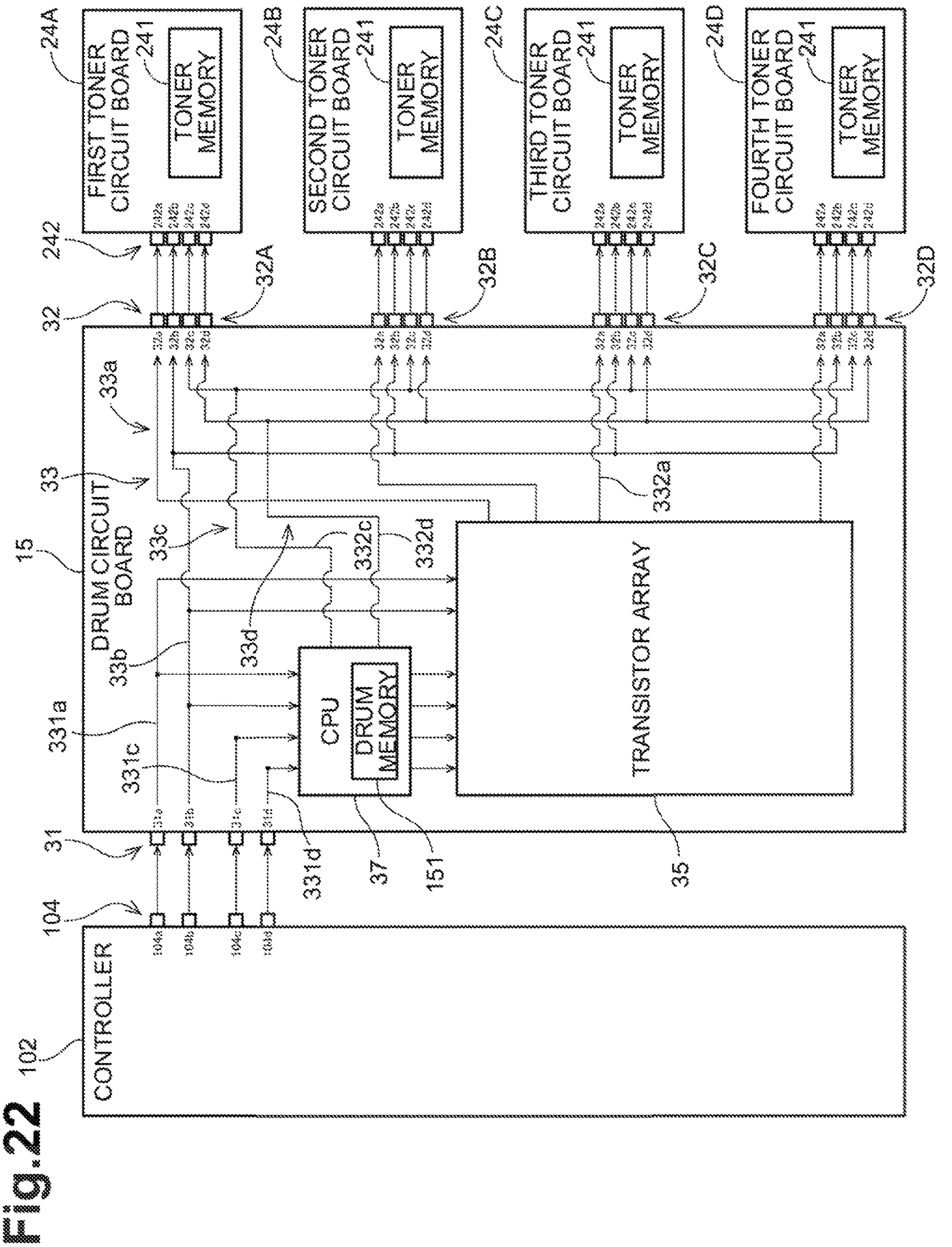
FIG. 22 is a block diagram showing electrical connection between a controller, a drum circuit board, and toner circuit boards according to an eighth embodiment.

FIG. 22 is a block diagram showing electrical connection between a controller 102, a drum circuit board 15, and four toner circuit boards 24 according to an eighth embodiment. In the example shown in FIG. 22, the drum cartridge 1 includes the drum circuit board 15, a transistor array 35, and a CPU 37. The drum circuit board 15 includes a plurality of body terminals 31, a plurality of toner terminals 32, and a plurality of relay lines 33. The transistor array 35 and the CPU 37 are located at the drum circuit board 15.

8-1. Body Terminal

The body terminals 31 are electrically connected to terminals 104 on the controller 102 through the first electric terminal unit 13 described above in the image forming apparatus 100 having the drum cartridge 1 attached to the body casing 101. This electrically connects the drum circuit board 15 and the controller 102. As shown in FIG. 22, the drum circuit board 15 in the present embodiment includes a plurality of, or specifically four body terminals 31. More specifically, the body terminals 31 include a single body voltage terminal 31*a*, a single body grounding terminal 31*b*, a single body clock terminal 31*c*, and a single body signal terminal 31*d*.

When the drum cartridge 1 is attached to the body casing 101 of the image forming apparatus 100, the body voltage terminal 31*a* is electrically connected to a voltage terminal 104*a* of a plurality of terminals 104 of the controller 102, providing a power supply voltage from the controller 102 to the drum circuit board 15.

When the drum cartridge 1 is attached to the body casing 101 of the image forming apparatus 100, the body grounding terminal 31*b* is electrically connected to a grounding terminal 104*b* of the terminals 104 of the controller 102, providing a grounding voltage from the controller 102 to the drum circuit board 15.

When the drum cartridge 1 is attached to the body casing 101 of the image forming apparatus 100, the body clock terminal 31*c* is electrically connected to a clock terminal 104*c* of the terminals 104 of the controller 102, providing a clock signal from the controller 102 to the drum circuit board 15 at fixed time intervals.

When the drum cartridge 1 is attached to the body casing 101 of the image forming apparatus 100, the body signal terminal 31*d* is electrically connected to a signal terminal 104*d* of the terminals 104 of the controller 102, allowing exchange of signals carrying various sets of information between the controller 102 and the drum circuit board 15.

8-2. Toner Terminal

When the four toner cartridges 2 are attached to the frame 12 of the drum cartridge 1, the toner terminals 32 are electrically connected to the toner circuit boards 24 in the toner cartridges 2 through the second electric terminal units 14 described above. This electrically connects the drum circuit board 15 and the toner circuit boards 24. As shown in FIG. 22, the drum circuit board 15 in the present embodiment includes a plurality of, or specifically sixteen toner terminals 32.

The sixteen toner terminals 32 include a first group 32A of four toner terminals 32, a second group 32B of other four toner terminals 32, a third group 32C of other four toner terminals 32, and a fourth group 32D of other four toner terminals 32.

When the first toner cartridge 2A is attached to the frame 12 of the drum cartridge 1, the four toner terminals 32 of the first group 32A are electrically connected to the first toner circuit board 24A. When the second toner cartridge 2B is attached to the frame 12 of the drum cartridge 1, the four toner terminals 32 of the second group 32B are electrically connected to the second toner circuit board 24B. When the third toner cartridge 2C is attached to the frame 12 of the drum cartridge 1, the four toner terminals 32 of the third group 32C are electrically connected to the third toner circuit board 24C. When the fourth toner cartridge 2D is attached to the frame 12 of the drum cartridge 1, the four toner terminals 32 of the fourth group 32D are electrically connected to the fourth toner circuit board 24D.

The four toner terminals 32 in each group include a single toner voltage terminal 32*a*, a single toner grounding terminal 32*b*, a single toner clock terminal 32*c*, and a single toner signal terminal 32*d*.

The toner voltage terminals 32*a* are electrically connected to the transistor array 35 through voltage relay lines 33*a* (described later). When the toner cartridges 2 is attached to the frame 12 of the drum cartridge 1, the toner voltage terminals 32*a* are electrically connected to voltage terminals 242*a* of the four terminals 242 on the toner circuit boards 24.

The toner grounding terminals 32*b* are electrically connected to the body grounding terminal 31*b* through a grounding relay line 33*b* (described later). When the toner cartridges 2 is attached to the frame 12 of the drum cartridge 1, the toner grounding terminals 32*b* are electrically connected to grounding terminals 242*b* of the four terminals 242 on the toner circuit boards 24, providing a grounding voltage from the controller 102 to the toner circuit boards 24 through the drum circuit board 15.

The toner clock terminals 32*c* are electrically connected to the CPU 37 through clock relay lines 33*c* (described later). When the toner cartridges 2 is attached to the frame 12 of the drum cartridge 1, the toner clock terminals 32*c* are electrically connected to clock terminals 242*c* of the four terminals 242 on the toner circuit boards 24.

The toner signal terminals 32*d* are electrically connected to the CPU 37 through signal relay lines 33*d* (described later). When the toner cartridges 2 is attached to the frame 12 of the drum cartridge 1, the toner signal terminals 32*d* are electrically connected to signal terminals 242*d* of the four terminals 242 on the toner circuit boards 24, allowing exchange of signals carrying various sets of information between the controller 102 and the toner circuit boards 24 through the drum circuit board 15.

8-3. Relay Line

As shown in FIG. 22, the relay lines 33 in the present embodiment include the voltage relay lines 33*a*, the grounding relay line 33*b*, the clock relay lines 33*c*, and the signal relay lines 33*d*. More specifically, the relay lines 33 include a plurality of voltage relay lines 33*a*, a single grounding relay line 33*b*, a plurality of clock relay lines 33*c*, and a plurality of signal relay lines 33*d*.

The voltage relay lines 33*a* include a body voltage relay line 331*a* and toner voltage relay lines 332*a*. The voltage relay lines 33*a* in the present embodiment include a single body voltage relay line 331*a* and a plurality of, or specifically four toner voltage relay lines 332*a*. The body voltage relay line 331*a* has one end electrically connected to the body voltage terminal 31*a*, and the other end split in two ends. More specifically, the body voltage relay line 331*a* has the other ends including a first end and a second end. The first end of the body voltage relay line 331*a* is electrically connected to the CPU 37. The second end of the body voltage relay line 331*a* is electrically connected to the transistor array 35. Thus, the drum circuit board 15 provides the power supply voltage received through the body voltage terminal 31*a* to the CPU 37 and the transistor array 35. The toner voltage relay lines 332*a* each have one end electrically connected to the transistor array 35, and the other end electrically connected to the corresponding toner voltage terminals 32*a*. The CPU 37 is electrically connected to the transistor array 35.

The grounding relay line 33*b* has one end electrically connected to the body grounding terminal 31*b*, and the other end split in six ends. More specifically, the grounding relay line 33*b* has the other ends including a first end, a second end, a third end, a fourth end, a fifth end, and a sixth end. The first end of the grounding relay line 33*b* is electrically connected to the toner grounding terminal 32*b* of the first group 32A. The second end is electrically connected to the toner grounding terminal 32*b* of the second group 32B. The third end is electrically connected to the toner grounding terminal 32*b* of the third group 32C. The fourth end is electrically connected to the toner grounding terminal 32*b* of the fourth group 32D. The fifth end is electrically connected to the CPU 37. The sixth end is electrically connected to the transistor array 35. Thus, the drum circuit board 15 provides the grounding voltage received through the body grounding terminal 31*b* to the four toner grounding terminals 32*b*, the CPU 37, and the transistor array 35. The common body grounding terminal 31*b* reduces the number of body terminals 31.

The clock relay lines 33*c* include a body clock relay line 331*c* and a toner clock relay line 332*c*. The clock relay lines 33*c* in the present embodiment include a single body clock relay line 331*c* and a single toner clock relay line 332*c*. The body clock relay line 331*c* has one end electrically connected to the body clock terminal 31*c*, and the other end electrically connected to the CPU 37. The toner clock relay line 332*c* has one end electrically connected to the CPU 37, and the other end split in four ends. More specifically, the toner clock relay line 332*c* has the other ends including a first end, a second end, a third end, and a fourth end. The first end of the toner clock relay line 332*c* is electrically connected to the toner clock terminal 32*c* of the first group 32A. The second end is electrically connected to the toner clock terminal 32*c* of the second group 32B. The third end is electrically connected to the toner clock terminal 32*c* of the third group 32C. The fourth end is electrically connected to the toner clock terminal 32*c* of the fourth group 32D. Thus, the drum circuit board 15 provides the clock signals received through the body clock terminal 31*c* to the four toner clock terminals 32*c* through the CPU 37. The common body clock terminal 31*c* reduces the number of body terminals 31.

The signal relay lines 33*d* include a body signal relay line 331*d* and a toner signal relay line 332*d*. The signal relay lines 33*d* in the present embodiment include a single body signal relay line 331*d* and a single toner signal relay line 332*d*. The body signal relay line 331*d* has one end electrically connected to the body signal terminal 31*d*, and the other end electrically connected to the CPU 37. The toner signal relay line 332*d* has one end electrically connected to the CPU 37, and the other end split in four ends. More specifically, the toner signal relay line 332*d* has the other ends including a first end, a second end, a third end, and a fourth end. The first end of the toner signal relay line 332*d* is electrically connected to the toner signal terminal 32*d* of the first group 32A. The second end is electrically connected to the toner signal terminal 32*d* of the second group 32B. The third end is electrically connected to the toner signal terminal 32*d* of the third group 32C. The fourth end is electrically connected to the toner signal terminal 32*d* of the fourth group 32D. Thus, the drum circuit board 15 provides the signal received through the single body signal terminal 31*d* to the four toner signal terminals 32*d* through the CPU 37. The common body signal terminal 31*d* reduces the number of body terminals 31.

8-4. CPU and Transistor Array

The CPU 37 is a processor that outputs an address signal in accordance with a program. In the present embodiment, the CPU 37 and the drum memory 151 are integral as a single chip. In some embodiments, the CPU 37 and the drum memory 151 may be separate components. The drum memory 151 stores programs readable by the CPU 37. The programs may be stored in the drum memory 151 before the drum cartridge 1 is shipped as a product. In other embodiments, the programs may be stored in the body memory 106 of the image forming apparatus 100. When the image forming apparatus 100 is powered on, the programs may be read from the body memory 106 and stored into the drum memory 151.

The CPU 37 receives a data signal from the controller 102 through the body signal terminal 31*d*. The CPU 37 also transmits the received data signal to the four toner signal terminals 32*d*. The data signal represents various sets of information to be transmitted to the communication destination. The CPU 37 generates an address signal in accordance with a program read from the drum memory 151, and transmits the generated address signal to the transistor array 35. The address signal specifies the communication destination.

The transistor array 35 is a switch circuit for switching between voltage lines. The transistor array 35 receives a power supply voltage from the controller 102 through the body voltage terminal 31*a*. The transistor array 35 also receives an address signal from the CPU 37. The address signal specifies the communication destination. The transistor array 35 selects a toner signal terminal 32*d* as a communication destination from the four toner signal terminals 32*d* in accordance with the received address signal. The transistor array 35 provides the power supply voltage to the toner signal terminal 32*d* selected as the communication destination.

More specifically, the transistor array 35 provides the power supply voltage to the toner memory 241 specified as the communication destination from the four toner memories 241. The four toner memories 241 each receive a data signal transmitted from the CPU 37 upon receipt of a power supply voltage. This allows an intended data signal to be transmitted to the communication destination specified from the four toner memories 241. This structure eliminates the need to prepare body signal terminals 31*d* separately for the four toner signal terminals 32*d*, and thus reduces the number of body signal terminals 31*d*. The controller 102 may also have fewer signal terminals 104*d*.

In particular, the drum circuit board 15 in the present embodiment receives an address signal and a data signal through the single body signal terminal 31*d*. This further reduces the number of body signal terminals 31*d*. The controller 102 may also have still fewer signal terminals 104*d*.

More specifically, although the body terminals 31 in the first embodiment shown in FIG. 6 include the five body signal terminals 31*d*, the body terminals 31 in the present embodiment shown in FIG. 22 include the single body signal terminal 31*d*. Although the controller 102 in the first embodiment shown in FIG. 6 includes the five signal terminals 104*d*, the controller 102 in the present embodiment shown in FIG. 22 includes the single signal terminal 104*d*.

8-5. Information Relay Through Drum Circuit Board

The drum circuit board 15 in the present embodiment also interfaces between the controller 102 and the toner circuit boards 24. The drum circuit board 15 thus has fewer terminals than when the drum circuit board 15 and the toner circuit boards 24 are directly connected to the controller 102. As shown in FIG. 22, for example, the single body voltage terminal 31*a* can provide the power supply voltage to the drum memory 151 in the drum circuit board 15 and the toner memories 241 in the toner circuit boards 24. As shown in FIG. 22, the single body grounding terminal 31*b* can provide the grounding voltage to the drum memory 151 of the drum circuit board 15 and the toner memories 241 of the toner circuit boards 24. As shown in FIG. 22, the single body clock terminal 31*c* can provide the clock signal to the drum memory 151 of the drum circuit board 15 and the toner memories 241 of the toner circuit boards 24. The controller 102 thus has fewer terminals 104.

In particular, when a plurality of toner circuit boards 24 are used as in the present embodiment, the drum circuit board 15 that interfaces between the controller 102 and the toner circuit boards 24 can have fewer terminals. As shown in FIG. 22, for example, the single body voltage terminal 31*a* can provide the power supply voltage to the four toner circuit boards 24. As shown in FIG. 22, the single body grounding terminal 31*b* can provide the grounding voltage to the four toner circuit boards 24. As shown in FIG. 22, the single body clock terminal 31*c* can provide the clock signal to the four toner circuit boards 24. The controller 102 thus has still fewer terminals 104.

9. Ninth Embodiment

Figure 23:
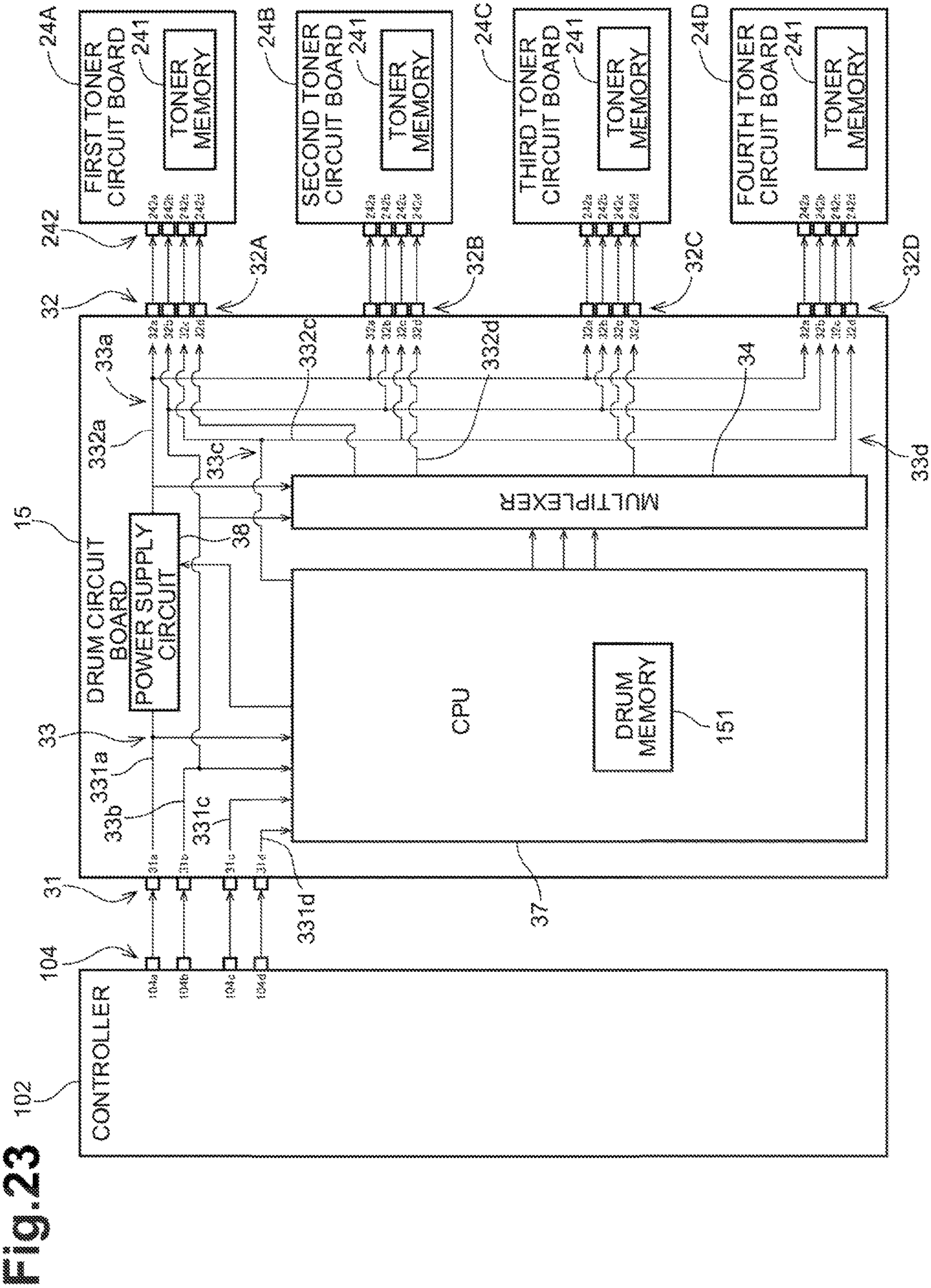
FIG. 23 is a block diagram showing electrical connection between a controller, a drum circuit board, and toner circuit boards according to a ninth embodiment.

FIG. 23 is a block diagram showing electrical connection between a controller 102, a drum circuit board 15, and four toner circuit boards 24 according to a ninth embodiment. In the example shown in FIG. 23, the drum cartridge 1 includes the drum circuit board 15, a multiplexer 34, and a CPU 37. The drum circuit board 15 includes a plurality of body terminals 31, a plurality of toner terminals 32, a plurality of relay lines 33, the multiplexer 34, and the CPU 37. The multiplexer 34 and the CPU 37 are located at the drum circuit board 15.

9-1. Body Terminal

The body terminals 31 are electrically connected to terminals 104 on the controller 102 through the first electric terminal unit 13 described above in the image forming apparatus 100 having the drum cartridge 1 attached to the body casing 101. This electrically connects the drum circuit board 15 and the controller 102. As shown in FIG. 23, the drum circuit board 15 in the present embodiment includes a plurality of, or specifically four body terminals 31. More specifically, the body terminals 31 include a single body voltage terminal 31*a*, a single body grounding terminal 31*b*, a single body clock terminal 31*c*, and a single body signal terminal 31*d*.

When the drum cartridge 1 is attached to the body casing 101 of the image forming apparatus 100, the body voltage terminal 31*a* is electrically connected to a voltage terminal 104*a* of a plurality of terminals 104 of the controller 102, providing a power supply voltage from the controller 102 to the drum circuit board 15.

When the drum cartridge 1 is attached to the body casing 101 of the image forming apparatus 100, the body grounding terminal 31*b* is electrically connected to a grounding terminal 104*b* of the terminals 104 of the controller 102, providing a grounding voltage from the controller 102 to the drum circuit board 15.

When the drum cartridge 1 is attached to the body casing 101 of the image forming apparatus 100, the body clock terminal 31*c* is electrically connected to a clock terminal 104*c* of the terminals 104 of the controller 102, providing a clock signal from the controller 102 to the drum circuit board 15 at fixed time intervals.

When the drum cartridge 1 is attached to the body casing 101 of the image forming apparatus 100, the body signal terminal 31*d* is electrically connected to a signal terminal 104*d* of the terminals 104 of the controller 102, allowing exchange of signals carrying various sets of information between the controller 102 and the drum circuit board 15.

9-2. Toner Terminal

When the four toner cartridges 2 are attached to the frame 12 of the drum cartridge 1, the toner terminals 32 are electrically connected to the toner circuit boards 24 in the toner cartridges 2 through the second electric terminal units 14 described above. This electrically connects the drum circuit board 15 and the toner circuit boards 24. As shown in FIG. 23, the drum circuit board 15 in the present embodiment includes a plurality of, or specifically sixteen toner terminals 32.

The sixteen toner terminals 32 include a first group 32A of four toner terminals 32, a second group 32B of other four toner terminals 32, a third group 32C of other four toner terminals 32, and a fourth group 32D of other four toner terminals 32.

When the first toner cartridge 2A is attached to the frame 12 of the drum cartridge 1, the four toner terminals 32 of the first group 32A are electrically connected to the first toner circuit board 24A. When the second toner cartridge 2B is attached to the frame 12 of the drum cartridge 1, the four toner terminals 32 of the second group 32B are electrically connected to the second toner circuit board 24B. When the third toner cartridge 2C is attached to the frame 12 of the drum cartridge 1, the four toner terminals 32 of the third group 32C are electrically connected to the third toner circuit board 24C. When the fourth toner cartridge 2D is attached to the frame 12 of the drum cartridge 1, the four toner terminals 32 of the fourth group 32D are electrically connected to the fourth toner circuit board 24D.

The four toner terminals 32 in each group include a single toner voltage terminal 32*a*, a single toner grounding terminal 32*b*, a single toner clock terminal 32*c*, and a single toner signal terminal 32*d*.

The toner voltage terminals 32*a* are electrically connected to the body voltage terminal 31*a* through voltage relay lines 33*a* (described later), the CPU 37, and the power supply circuit 38. When the toner cartridges 2 are attached to the frame 12 of the drum cartridge 1, the toner voltage terminals 32*a* are electrically connected to voltage terminals 242*a* of the four terminals 242 on the toner circuit boards 24, providing a grounding voltage from the controller 102 to the toner circuit boards 24 through the drum circuit board 15.

The toner grounding terminals 32*b* are electrically connected to the body grounding terminal 31*b* through a grounding relay line 33*b* (described later). When the toner cartridges 2 are attached to the frame 12 of the drum cartridge 1, the toner grounding terminals 32*b* are electrically connected to grounding terminals 242*b* of the four terminals 242 of the toner circuit boards 24, providing a grounding voltage from the controller 102 to the toner circuit boards 24 through the drum circuit board 15.

The toner clock terminals 32*c* are electrically connected to the CPU 37 through clock relay lines 33*c* (described later). When the toner cartridges 2 are attached to the frame 12 of the drum cartridge 1, the toner clock terminals 32*c* are electrically connected to clock terminals 242*c* of the four terminals 242 of the toner circuit boards 24.

The toner signal terminals 32*d* are electrically connected to the multiplexer 34 through signal relay lines 33*d* (described later). When the toner cartridges 2 are attached to the frame 12 of the drum cartridge 1, the toner signal terminals 32*d* are electrically connected to signal terminals 242*d* of the four terminals 242 of the toner circuit boards 24.

9-3. Relay Line

As shown in FIG. 23, the relay lines 33 in the present embodiment include the voltage relay lines 33*a*, the grounding relay line 33*b*, the clock relay lines 33*c*, and the signal relay lines 33*d*. More specifically, the relay lines 33 include a plurality of voltage relay lines 33*a*, a single grounding relay line 33*b*, a plurality of clock relay lines 33*c*, and a plurality of signal relay lines 33*d*.

The voltage relay lines 33*a* include a body voltage relay line 331*a* and toner voltage relay lines 332*a*. The voltage relay lines 33*a* in the present embodiment include a single body voltage relay line 331*a* and a single toner voltage relay line 332*a*. The body voltage relay line 331*a* has one end electrically connected to the body voltage terminal 31*a*, and the other end split in two ends. More specifically, the body voltage relay line 331*a* has the other ends including a first end and a second end. The first end of the body voltage relay line 331*a* is electrically connected to the CPU 37. The second end of the body voltage relay line 331*a* is electrically connected to the power supply circuit 38. Thus, the drum circuit board 15 provides the power supply voltage received through the body voltage terminal 31*a* to the CPU 37 and the power supply circuit 38.

The CPU 37 is electrically connected to the power supply circuit 38. The toner voltage relay line 332*a* has one end electrically connected to the power supply circuit 38, and the other end split in five ends. More specifically, the toner voltage relay line 332*a* has the other ends including a first end, a second end, a third end, a fourth end, and a fifth end. The first end of the toner voltage relay line 332*a* is electrically connected to the toner voltage terminal 32*a* of the first group 32A. The second end is electrically connected to the toner voltage terminal 32*a* of the second group 32B. The third end is electrically connected to the toner voltage terminal 32*a* of the third group 32C. The fourth end is electrically connected to the toner voltage terminal 32*a* of the fourth group 32D. The fifth end is electrically connected to the multiplexer 34. Thus, the drum circuit board 15 provides the power supply voltage output from the power supply circuit 38 to the four toner voltage terminals 32*a* and the multiplexer 34.

The grounding relay line 33*b* has one end electrically connected to the body grounding terminal 31*b*, and the other end split in six ends. More specifically, the grounding relay line 33*b* has the other ends including a first end, a second end, a third end, a fourth end, a fifth end, and a sixth end. The first end of the grounding relay line 33*b* is electrically connected to the toner grounding terminal 32*b* of the first group 32A. The second end is electrically connected to the toner grounding terminal 32*b* of the second group 32B. The third end is electrically connected to the toner grounding terminal 32*b* of the third group 32C. The fourth end is electrically connected to the toner grounding terminal 32*b* of the fourth group 32D. The fifth end is electrically connected to the CPU 37. The sixth end is electrically connected to the multiplexer 34. Thus, the drum circuit board 15 provides the grounding voltage received through the body grounding terminal 31*b* to the four toner grounding terminals 32*b*, the CPU 37, and the multiplexer 34. The common body grounding terminal 31*b* reduces the number of body terminals 31.

The clock relay lines 33*c* include a body clock relay line 331*c* and a toner clock relay line 332*c*. The clock relay lines 33*c* in the present embodiment include a single body clock relay line 331*c* and a single toner clock relay line 332*c*. The body clock relay line 331*c* has one end electrically connected to the body clock terminal 31*c*, and the other end electrically connected to the CPU 37. The toner clock relay line 332*c* has one end electrically connected to the CPU 37, and the other end split in four ends. More specifically, the toner clock relay line 332*c* has the other ends including a first end, a second end, a third end, and a fourth end. The first end of the toner clock relay line 332*c* is electrically connected to the toner clock terminal 32*c* of the first group 32A. The second end is electrically connected to the toner clock terminal 32*c* of the second group 32B. The third end is electrically connected to the toner clock terminal 32*c* of the third group 32C. The fourth end is electrically connected to the toner clock terminal 32*c* of the fourth group 32D. Thus, the drum circuit board 15 provides the clock signals output from the CPU 37 to the four toner clock terminals 32*c*.

The signal relay lines 33*d* include a body signal relay line 331*d* and toner signal relay lines 332*d*. The signal relay lines 33*d* in the present embodiment include a single body signal relay line 331*d* and a plurality of, or specifically four toner signal relay lines 332*d*. The body signal relay line 331*d* has one end electrically connected to the body signal terminal 31*d*, and the other end electrically connected to the CPU 37. The toner signal relay lines 332*d* each have one end electrically connected to the multiplexer 34, and the other electrically connected to the corresponding toner signal terminals 32*d*.

The CPU 37 is electrically connected to the multiplexer 34.

9-4. CPU and Multiplexer

The CPU 37 is a processor that outputs an address signal in accordance with a program. In the present embodiment, the CPU 37 and the drum memory 151 are integral as a single chip. In some embodiments, the CPU 37 and the drum memory 151 may be separate components. The drum memory 151 stores programs readable by the CPU 37. The programs may be stored in the drum memory 151 before the drum cartridge 1 is shipped as a product. In other embodiments, the programs may be stored in the body memory 106 of the image forming apparatus 100. When the image forming apparatus 100 is powered on, the programs may be read from the body memory 106 and stored into the drum memory 151.

The CPU 37 receives a data signal from the controller 102 through the body signal terminal 31*d*. The CPU 37 also transmits the received data signal to the multiplexer 34. The data signal represents various sets of information to be transmitted to the communication destination. The CPU 37 generates an address signal in accordance with a program read from the drum memory 151, and transmits the generated address signal to the multiplexer 34. The address signal specifies the communication destination.

The multiplexer 34 is a switch circuit for switching between signal lines. The multiplexer 34 receives an address signal from the CPU 37. The multiplexer 34 then selects a toner signal terminal 32*d* as a communication destination from the four toner signal terminals 32*d* in accordance with the received address signal. In other words, the multiplexer 34 is controlled by the CPU 37. The multiplexer 34 also receives a data signal from the CPU 37, and outputs the received data signal to the toner signal terminal 32*d* selected as the communication destination.

In this manner, the CPU 37 and the multiplexer 34 selects a toner memory 241 as a communication destination from the four toner memories 241, and outputs a data signal to the communication destination. This structure eliminates the need to prepare body signal terminals 31*d* separately for the four toner signal terminals 32*d*, and thus reduces the number of body signal terminals 31*d*. The controller 102 may also have fewer signal terminals 104*d*.

More specifically, although the body terminals 31 in the first embodiment shown in FIG. 6 include the five body signal terminals 31*d*, the body terminals 31 in the present embodiment shown in FIG. 23 include the single body signal terminal 31*d*. Although the controller 102 in the first embodiment shown in FIG. 6 includes the five signal terminals 104*d*, the controller 102 in the present embodiment shown in FIG. 23 includes the single signal terminal 104*d*.

9-5. Information Relay Through Drum Circuit Board

The drum circuit board 15 in the present embodiment also interfaces between the controller 102 and the toner circuit boards 24. The drum circuit board 15 thus has fewer terminals than when the drum circuit board 15 and the toner circuit boards 24 are directly connected to the controller 102. As shown in FIG. 23, for example, the single body voltage terminal 31*a* can provide the power supply voltage to the drum memory 151 of the drum circuit board 15 and the toner memories 241 of the toner circuit boards 24. As shown in FIG. 23, the single body grounding terminal 31*b* can provide the grounding voltage to the drum memory 151 in the drum circuit board 15 and the toner memories 241 in the toner circuit boards 24. As shown in FIG. 23, the single body clock terminal 31*c* can provide the clock signal to the drum memory 151 of the drum circuit board 15 and the toner memories 241 of the toner circuit boards 24. The controller 102 thus has fewer terminals 104.

In particular, when a plurality of toner circuit boards 24 are used as in the present embodiment, the drum circuit board 15 that interfaces between the controller 102 and the toner circuit boards 24 can have fewer terminals. As shown in FIG. 23, for example, the single body voltage terminal 31*a* can provide the power supply voltage to the four toner circuit boards 24. As shown in FIG. 23, the single body grounding terminal 31*b* can provide the grounding voltage to the four toner circuit boards 24. As shown in FIG. 23, the single body clock terminal 31*c* can provide the clock signal to the four toner circuit boards 24. The controller 102 thus has still fewer terminals 104.

10. Modifications

Although the first to ninth embodiments of the present invention is described above, the present invention is not limited to the above embodiments.

The structure, the circuit configuration, and the procedures in each embodiment are mere examples. The components described in the above embodiments may be replaced with known other components without departing from the spirit and scope of the present disclosure. Additionally, the components described in the above embodiments may be combined, unless any contradiction arises.

In the above embodiments, the drum circuit board relays the information stored in each toner memory to the controller. In some embodiments, the drum circuit board may not relay the information stored in each toner memory to the controller. For example, the controller in the image forming apparatus and a toner memory may be electrically connected to each other without through the drum memory.

What is claimed is:

1. A drum cartridge attachable to an image forming apparatus including a controller, the drum cartridge comprising:

a frame to which a toner cartridge is detachably attachable, the toner cartridge including a toner memory configured to store information regarding the toner cartridge;

a photosensitive drum; and a drum circuit board configured to relay the information stored in the toner memory to the controller when the toner cartridge is attached to the frame, the drum circuit board configured to exchange information with the controller and the toner memory.

2. The drum cartridge according to claim 1, wherein the drum circuit board includes:

a first terminal electrically connectable to the controller of the image forming apparatus, and a second terminal electrically connectable to the toner memory, the second terminal being electrically connected to the first terminal.

3. The drum cartridge according to claim 2, wherein the drum circuit board includes a relay line electrically connecting the first terminal and the second terminal.

4. The drum cartridge according to claim 2, wherein the second terminal is directly connected to a toner terminal of the toner cartridge when the toner cartridge is attached to the frame.

5. The drum cartridge according to claim 1, wherein the drum circuit board includes;

a plurality of first terminals, at least one of the plurality of first terminals being electrically connectable to the controller of the image forming apparatus, and a plurality of second terminals, at least one of the plurality of second terminals being electrically connectable to the toner memory.

6. The drum cartridge according to claim 5, wherein each of the at least one of the plurality of second terminals is electrically connected to a corresponding one of the plurality of first terminals.

7. The drum cartridge according to claim 5, wherein the plurality of first terminals includes a first grounding terminal, wherein the plurality of second terminals includes a second grounding terminal, wherein the first grounding terminal is electrically connectable to a third grounding terminal of the image forming apparatus, and wherein the second grounding terminal is electrically connectable to a fourth grounding terminal of the toner cartridge.

8. The drum cartridge according to claim 7, wherein the second grounding terminal is electrically connected to the first grounding terminal.

9. The drum cartridge according to claim 7, wherein the plurality of first terminals includes a first voltage terminal, wherein the plurality of second terminals includes a second voltage terminal, wherein the first voltage terminal is electrically connectable to a third voltage terminal of the image forming apparatus, and wherein the second voltage terminal is electrically connectable to a fourth voltage terminal of the toner cartridge.

10. The drum cartridge according to claim 9, wherein the second voltage terminal is electrically connected to the first voltage terminal.

* * * * *